US010769735B2

(12) United States Patent
Bentz et al.

(10) Patent No.: US 10,769,735 B2
(45) Date of Patent: Sep. 8, 2020

(54) THERMOSTAT WITH USER INTERFACE FEATURES

(71) Applicant: Johnson Controls Technology Company, Plymouth, MI (US)

(72) Inventors: Jedidiah O. Bentz, Wichita, KS (US); Brian D. Rigg, Douglass, KS (US); Theresa N. Gillette, Wichita, KS (US); Tom R. Tasker, Andover, KS (US); Tyler McCune, El Dorado, KS (US); John W. Uerkvitz, Valley Center, KS (US); Shaun B. Atchison, Wichita, KS (US); Daniel S. Middleton, Wichita, KS (US); Aneek Muhammad Noor, Wichita, KS (US)

(73) Assignee: Johnson Controls Technology Company, Auburn Hills, MI (US)

(*) Notice: Subject to any disclaimer, the term of this patent is extended or adjusted under 35 U.S.C. 154(b) by 109 days.

(21) Appl. No.: 15/260,299

(22) Filed: Sep. 8, 2016

(65) Prior Publication Data

US 2017/0075568 A1 Mar. 16, 2017

Related U.S. Application Data

(60) Provisional application No. 62/367,621, filed on Jul. 27, 2016, provisional application No. 62/367,597, (Continued)

(51) Int. Cl.
*G06F 3/048* (2013.01)
*G06Q 50/06* (2012.01)
(Continued)

(52) U.S. Cl.
CPC ........... *G06Q 50/06* (2013.01); *F24F 1/0003* (2013.01); *F24F 11/30* (2018.01); *G05B 15/02* (2013.01);
(Continued)

(58) Field of Classification Search
CPC ...... F24F 11/00; F24F 11/001; F24F 11/0009; F24F 11/0012; F24F 2011/0057;
(Continued)

(56) References Cited

U.S. PATENT DOCUMENTS 4,107,464 A 8/1978 Lynch et al.
4,873,649 A 10/1989 Grald et al.
(Continued)

FOREIGN PATENT DOCUMENTS

CA 2466854 C 4/2008
CA 2633200 C 1/2011
(Continued)

OTHER PUBLICATIONS

Office Action for U.S. Appl. No. 15/146,749, dated Mar. 19, 2018, 11 pages.
(Continued)

*Primary Examiner* — Alex Olshannikov
(74) *Attorney, Agent, or Firm* — Foley & Lardner LLP

(57) ABSTRACT

A thermostat for a building space includes an electronic display, a frame, a touch sensitive interface, and a processing circuit. The touch-sensitive interface has a first portion that overlays the electronic display and a second portion that overlays the frame. The touch-sensitive interface is configured to receive touch-based input via both the first portion and the second portion. The processing circuit is configured to define one or more locations within the second portion that correspond to touch-sensitive buttons. The locations of the touch-sensitive buttons are customizable and can be changed by a user. The thermostat further including at least one of a sticker and a skin that covers at least part of the second portion and visually marks the locations of the touch-sensitive buttons.

22 Claims, 36 Drawing Sheets

Related U.S. Application Data filed on Jul. 27, 2016, provisional application No. 62/367,297, filed on Jul. 27, 2016, provisional application No. 62/367,614, filed on Jul. 27, 2016, provisional application No. 62/367,291, filed on Jul. 27, 2016, provisional application No. 62/367,315, filed on Jul. 27, 2016, provisional application No. 62/217,791, filed on Sep. 11, 2015, provisional application No. 62/217,789, filed on Sep. 11, 2015, provisional application No. 62/217,790, filed on Sep. 11, 2015, provisional application No. 62/217,788, filed on Sep. 11, 2015.

(51) Int. Cl.

| | | |
|---|---|---|
| *F24F 11/30* | (2018.01) | |
| *H04W 4/80* | (2018.01) | |
| *G06F 3/0484* | (2013.01) | |
| *G06F 3/0488* | (2013.01) | |
| *G07F 17/00* | (2006.01) | |
| *G06Q 20/12* | (2012.01) | |
| *G06Q 20/14* | (2012.01) | |
| *G05B 15/02* | (2006.01) | |
| *G05B 19/042* | (2006.01) | |
| *G06F 3/01* | (2006.01) | |
| *G06F 3/0481* | (2013.01) | |
| *G06F 3/16* | (2006.01) | |
| *G06K 9/00* | (2006.01) | |
| *F24F 1/0003* | (2019.01) | |
| *G06Q 20/10* | (2012.01) | |
| *F24F 120/10* | (2018.01) | |
| *F24F 110/10* | (2018.01) | |
| *F24F 11/58* | (2018.01) | |
| *G06Q 50/00* | (2012.01) | |
| *H04L 12/28* | (2006.01) | |
| *H04L 12/58* | (2006.01) | |
| *G10L 17/08* | (2013.01) | |
| *H04B 5/00* | (2006.01) | |

(52) U.S. Cl.
CPC ........... *G05B 19/042* (2013.01); *G06F 3/017* (2013.01); *G06F 3/0481* (2013.01); *G06F 3/0488* (2013.01); *G06F 3/04845* (2013.01); *G06F 3/04847* (2013.01); *G06F 3/04883* (2013.01); *G06F 3/04886* (2013.01); *G06F 3/167* (2013.01); *G06K 9/00288* (2013.01); *G06K 9/00885* (2013.01); *G06Q 20/102* (2013.01); *G06Q 20/127* (2013.01); *G06Q 20/145* (2013.01); *G07F 17/0014* (2013.01); *H04W 4/80* (2018.02); *F24F 11/58* (2018.01); *F24F 2110/10* (2018.01); *F24F 2120/10* (2018.01); *G05B 2219/2642* (2013.01); *G06F 3/0484* (2013.01); *G06F 3/04817* (2013.01); *G06F 2203/0383* (2013.01); *G06F 2203/04803* (2013.01); *G06Q 50/01* (2013.01); *G10L 17/08* (2013.01); *H04B 5/0031* (2013.01); *H04L 12/2816* (2013.01); *H04L 51/32* (2013.01)

(58) Field of Classification Search
CPC ........... F24F 11/0086; F24F 2011/0068; F24F 2011/0086; F24F 2011/00; F24F 2011/0091; F24F 2221/32; G06F 3/04847; G05D 23/00; G05D 23/1902; G05D 23/1951; B60H 1/00642; B60H 1/0065; B60H 1/00657; B60H 1/00985
USPC ......................................................... 715/763
See application file for complete search history.

(56) References Cited

U.S. PATENT DOCUMENTS

| | | |
|---|---|---|
| 4,942,613 A | 7/1990 | Lynch |
| 4,973,029 A | 11/1990 | Robbins, III |
| 5,052,186 A | 10/1991 | Dudley et al. |
| 5,062,276 A | 11/1991 | Dudley |
| 5,224,648 A | 7/1993 | Simon et al. |
| 5,555,927 A | 9/1996 | Shah |
| 5,797,729 A | 8/1998 | Rafuse et al. |
| 5,944,098 A | 8/1999 | Jackson |
| 6,121,885 A | 9/2000 | Masone et al. |
| 6,164,374 A | 12/2000 | Rhodes et al. |
| 6,169,937 B1 | 1/2001 | Peterson |
| 6,227,961 B1 | 5/2001 | Moore et al. |
| 6,260,765 B1 | 7/2001 | Natale et al. |
| 6,314,750 B1 | 11/2001 | Ishikawa et al. |
| 6,351,693 B1 | 2/2002 | Monie et al. |
| 6,435,418 B1 | 8/2002 | Toth et al. |
| 6,478,233 B1 | 11/2002 | Shah |
| 6,487,869 B1 | 12/2002 | Sulc et al. |
| 6,557,771 B2 | 5/2003 | Shah |
| 6,641,054 B2 | 11/2003 | Morey |
| 6,724,403 B1 | 4/2004 | Santoro et al. |
| 6,726,112 B1 | 4/2004 | Ho |
| 6,726,113 B2 | 4/2004 | Guo |
| 6,824,069 B2 | 11/2004 | Rosen |
| 6,851,621 B1 | 2/2005 | Wacker et al. |
| 6,874,691 B1 | 4/2005 | Hildebrand et al. |
| 6,888,441 B2 | 5/2005 | Carey |
| 6,912,429 B1 | 6/2005 | Bilger |
| 6,995,518 B2 | 2/2006 | Havlik et al. |
| 7,028,912 B1 | 4/2006 | Rosen |
| 7,083,109 B2 | 8/2006 | Pouchak |
| 7,099,748 B2 | 8/2006 | Rayburn |
| 7,140,551 B2 | 11/2006 | De Pauw et al. |
| 7,146,253 B2 | 12/2006 | Hoog et al. |
| 7,152,806 B1 | 12/2006 | Rosen |
| 7,156,317 B1 | 1/2007 | Moore |
| 7,156,318 B1 | 1/2007 | Rosen |
| 7,159,789 B2 | 1/2007 | Schwendinger et al. |
| 7,159,790 B2 | 1/2007 | Schwendinger et al. |
| 7,167,079 B2 | 1/2007 | Smyth et al. |
| 7,188,002 B2 | 3/2007 | Chapman et al. |
| 7,212,887 B2 | 5/2007 | Shah et al. |
| 7,225,054 B2 | 5/2007 | Amundson et al. |
| 7,232,075 B1 | 6/2007 | Rosen |
| 7,261,243 B2 | 8/2007 | Butler et al. |
| 7,274,972 B2 | 9/2007 | Amundson et al. |
| 7,287,709 B2 | 10/2007 | Proffitt et al. |
| 7,296,426 B2 | 11/2007 | Butler et al. |
| 7,299,996 B2 | 11/2007 | Garrett et al. |
| 7,306,165 B2 | 12/2007 | Shah |
| 7,308,384 B2 | 12/2007 | Shah et al. |
| 7,317,970 B2 | 1/2008 | Pienta et al. |
| 7,331,187 B2 | 2/2008 | Kates |
| 7,343,751 B2 | 3/2008 | Kates |
| 7,383,158 B2 | 6/2008 | Krocker et al. |
| RE40,437 E | 7/2008 | Rosen |
| 7,402,780 B2 | 7/2008 | Mueller et al. |
| 7,434,744 B2 | 10/2008 | Garozzo et al. |
| 7,442,012 B2 | 10/2008 | Moens |
| 7,469,550 B2 | 12/2008 | Chapman et al. |
| 7,475,558 B2 | 1/2009 | Perry |
| 7,475,828 B2 | 1/2009 | Bartlett et al. |
| 7,556,207 B2 | 7/2009 | Mueller et al. |
| 7,565,813 B2 | 7/2009 | Pouchak |
| 7,575,179 B2 | 8/2009 | Morrow et al. |
| 7,584,897 B2 | 9/2009 | Schultz et al. |
| 7,614,567 B2 | 11/2009 | Chapman et al. |
| 7,624,931 B2 | 12/2009 | Chapman et al. |
| 7,633,743 B2 | 12/2009 | Barton et al. |
| 7,636,604 B2 | 12/2009 | Bergman et al. |
| 7,638,739 B2 | 12/2009 | Rhodes et al. |
| 7,641,126 B2 | 1/2010 | Schultz et al. |
| 7,645,158 B2 | 1/2010 | Mulhouse et al. |
| 7,667,163 B2 | 2/2010 | Ashworth et al. |
| 7,726,581 B2 | 6/2010 | Naujok et al. |

(56) References Cited

U.S. PATENT DOCUMENTS

| | | |
|---|---|---|
| 7,731,096 B2 | 6/2010 | Lorenz et al. |
| 7,731,098 B2 | 6/2010 | Butler et al. |
| 7,740,184 B2 | 6/2010 | Schnell et al. |
| 7,748,225 B2 | 7/2010 | Butler et al. |
| 7,748,639 B2 | 7/2010 | Perry |
| 7,748,640 B2 | 7/2010 | Roher et al. |
| 7,755,220 B2 | 7/2010 | Sorg et al. |
| 7,765,826 B2 | 8/2010 | Nichols |
| 7,774,102 B2 | 8/2010 | Butler et al. |
| 7,775,452 B2 | 8/2010 | Shah et al. |
| 7,784,291 B2 | 8/2010 | Butler et al. |
| 7,784,704 B2 | 8/2010 | Harter |
| 7,802,618 B2 | 9/2010 | Simon et al. |
| 7,832,221 B2 | 11/2010 | Wijaya et al. |
| 7,832,652 B2 | 11/2010 | Barton et al. |
| 7,845,576 B2 | 12/2010 | Siddaramanna et al. |
| 7,861,941 B2 | 1/2011 | Schultz et al. |
| 7,867,646 B2 | 1/2011 | Rhodes |
| 7,904,209 B2 | 3/2011 | Podgorny et al. |
| 7,904,830 B2 | 3/2011 | Hoglund et al. |
| 7,918,406 B2 | 4/2011 | Rosen |
| 7,938,336 B2 | 5/2011 | Rhodes et al. |
| 7,941,294 B2 | 5/2011 | Shahi et al. |
| 7,954,726 B2 | 6/2011 | Siddaramanna et al. |
| 7,963,454 B2 | 6/2011 | Sullivan et al. |
| 7,979,164 B2 | 7/2011 | Garozzo et al. |
| 7,992,794 B2 | 8/2011 | Leen et al. |
| 8,010,237 B2 | 8/2011 | Cheung et al. |
| 8,032,254 B2 | 10/2011 | Amundson et al. |
| 8,078,326 B2 | 12/2011 | Harrod et al. |
| 8,083,154 B2 | 12/2011 | Schultz et al. |
| 8,089,032 B2 | 1/2012 | Beland et al. |
| 8,091,794 B2 | 1/2012 | Siddaramanna et al. |
| 8,108,076 B2 | 1/2012 | Imes et al. |
| 8,141,791 B2 | 3/2012 | Rosen |
| 8,167,216 B2 | 5/2012 | Schultz et al. |
| 8,180,492 B2 | 5/2012 | Steinberg |
| 8,190,296 B2 | 5/2012 | Alhilo |
| 8,195,313 B1 | 6/2012 | Fadell et al. |
| 8,196,185 B2 | 6/2012 | Geadelmann et al. |
| 8,209,059 B2 | 6/2012 | Stockton |
| 8,239,066 B2 | 8/2012 | Jennings et al. |
| 8,276,829 B2 | 10/2012 | Stoner et al. |
| 8,280,536 B1 | 10/2012 | Fadell et al. |
| 8,280,556 B2 | 10/2012 | Besore et al. |
| 8,289,226 B2 | 10/2012 | Takach et al. |
| 8,299,919 B2 | 10/2012 | Dayton et al. |
| 8,321,058 B2 | 11/2012 | Zhou et al. |
| 8,346,396 B2 | 1/2013 | Amundson et al. |
| 8,387,891 B1 | 3/2013 | Simon et al. |
| 8,412,382 B2 | 4/2013 | Imes et al. |
| 8,429,435 B1 | 4/2013 | Clayton et al. |
| 8,429,566 B2 | 4/2013 | Koushik et al. |
| 8,456,293 B1 | 6/2013 | Trundle et al. |
| 8,473,109 B1 | 6/2013 | Imes et al. |
| 8,476,964 B1 | 7/2013 | Atri |
| 8,489,243 B2 | 7/2013 | Fadell et al. |
| 8,498,749 B2 | 7/2013 | Imes et al. |
| 8,504,180 B2 | 8/2013 | Imes et al. |
| 8,510,255 B2 | 8/2013 | Fadell et al. |
| 8,511,576 B2 | 8/2013 | Warren et al. |
| 8,511,577 B2 | 8/2013 | Warren et al. |
| 8,517,088 B2 | 8/2013 | Moore et al. |
| 8,523,083 B2 | 9/2013 | Warren et al. |
| 8,523,084 B2 | 9/2013 | Siddaramanna et al. |
| 8,527,096 B2 | 9/2013 | Pavlak et al. |
| 8,532,827 B2 | 9/2013 | Stefanski et al. |
| 8,538,588 B2 | 9/2013 | Kasper |
| 8,544,285 B2 | 10/2013 | Stefanski et al. |
| 8,550,368 B2 | 10/2013 | Butler et al. |
| 8,554,374 B2 | 10/2013 | Lunacek et al. |
| 8,555,662 B2 | 10/2013 | Peterson et al. |
| 8,558,179 B2 | 10/2013 | Filson et al. |
| 8,560,127 B2 | 10/2013 | Leen et al. |
| 8,560,128 B2 | 10/2013 | Ruff et al. |
| 8,571,518 B2 | 10/2013 | Imes et al. |
| 8,581,439 B1 | 11/2013 | Clayton et al. |
| 8,594,850 B1 | 11/2013 | Gourlay et al. |
| 8,596,550 B2 | 12/2013 | Steinberg et al. |
| 8,600,564 B2 | 12/2013 | Imes et al. |
| 8,606,409 B2 | 12/2013 | Amundson et al. |
| 8,613,792 B2 | 12/2013 | Ragland et al. |
| 8,620,841 B1 | 12/2013 | Filson et al. |
| 8,622,314 B2 | 1/2014 | Fisher et al. |
| 8,630,741 B1 | 1/2014 | Matsuoka et al. |
| 8,630,742 B1 | 1/2014 | Stefanski et al. |
| 8,644,009 B2 | 2/2014 | Rylski et al. |
| 8,659,302 B1 | 2/2014 | Warren et al. |
| 8,671,702 B1 | 3/2014 | Shotey et al. |
| 8,674,816 B2 | 3/2014 | Trundle et al. |
| 8,689,572 B2 | 4/2014 | Evans et al. |
| 8,695,887 B2 | 4/2014 | Helt et al. |
| 8,706,270 B2 | 4/2014 | Fadell et al. |
| 8,708,242 B2 | 4/2014 | Conner et al. |
| 8,712,590 B2 | 4/2014 | Steinberg |
| 8,718,826 B2 | 5/2014 | Ramachandran et al. |
| 8,726,680 B2 | 5/2014 | Schenk et al. |
| 8,727,611 B2 | 5/2014 | Huppi et al. |
| 8,746,583 B2 | 6/2014 | Simon et al. |
| 8,752,771 B2 | 6/2014 | Warren et al. |
| 8,766,194 B2 | 7/2014 | Filson et al. |
| 8,770,490 B2 | 7/2014 | Drew |
| 8,770,491 B2 | 7/2014 | Warren et al. |
| 8,788,100 B2 | 7/2014 | Grohman et al. |
| 8,788,103 B2 | 7/2014 | Warren et al. |
| 8,802,981 B2 | 8/2014 | Wallaert et al. |
| 8,830,267 B2 | 9/2014 | Brackney |
| 8,850,348 B2 | 9/2014 | Fadell et al. |
| 8,868,219 B2 | 10/2014 | Fadell et al. |
| 8,870,086 B2 | 10/2014 | Tessier et al. |
| 8,870,087 B2 | 10/2014 | Pienta et al. |
| 8,880,047 B2 | 11/2014 | Konicek et al. |
| 8,893,032 B2 | 11/2014 | Bruck et al. |
| 8,903,552 B2 | 12/2014 | Amundson et al. |
| 8,918,219 B2 | 12/2014 | Sloo et al. |
| 8,942,853 B2 | 1/2015 | Stefanski et al. |
| 8,944,338 B2 | 2/2015 | Warren et al. |
| 8,950,686 B2 | 2/2015 | Matsuoka et al. |
| 8,950,687 B2 | 2/2015 | Bergman et al. |
| 8,961,005 B2 | 2/2015 | Huppi et al. |
| 8,978,994 B2 | 3/2015 | Moore et al. |
| 8,998,102 B2 | 4/2015 | Fadell et al. |
| 9,014,860 B2 | 4/2015 | Moore et al. |
| 9,020,647 B2 | 4/2015 | Johnson et al. |
| 9,026,232 B2 | 5/2015 | Fadell et al. |
| 9,033,255 B2 | 5/2015 | Tessier et al. |
| RE45,574 E | 6/2015 | Harter |
| 9,074,784 B2 | 7/2015 | Sullivan et al. |
| 9,075,419 B2 | 7/2015 | Sloo et al. |
| 9,077,055 B2 | 7/2015 | Yau |
| 9,080,782 B1 | 7/2015 | Sheikh |
| 9,081,393 B2 | 7/2015 | Lunacek et al. |
| 9,086,703 B2 | 7/2015 | Warren et al. |
| 9,092,039 B2 | 7/2015 | Fadell et al. |
| 9,116,529 B2 | 8/2015 | Warren et al. |
| 9,121,623 B2 | 9/2015 | Filson et al. |
| 9,127,853 B2 | 9/2015 | Filson et al. |
| 9,134,710 B2 | 9/2015 | Cheung et al. |
| 9,134,715 B2 | 9/2015 | Geadelmann et al. |
| 9,146,041 B2 | 9/2015 | Novotny et al. |
| 9,151,510 B2 | 10/2015 | Leen |
| 9,154,001 B2 | 10/2015 | Dharwada et al. |
| 9,157,764 B2 | 10/2015 | Shetty et al. |
| 9,164,524 B2 | 10/2015 | Imes et al. |
| 9,175,868 B2 | 11/2015 | Fadell et al. |
| 9,175,871 B2 | 11/2015 | Gourlay et al. |
| 9,182,141 B2 | 11/2015 | Sullivan et al. |
| 9,189,751 B2 | 11/2015 | Matsuoka et al. |
| 9,194,597 B2 | 11/2015 | Steinberg et al. |
| 9,194,598 B2 | 11/2015 | Fadell et al. |
| 9,194,600 B2 | 11/2015 | Kates |
| 9,207,817 B2 | 12/2015 | Tu |
| 9,213,342 B2 | 12/2015 | Drake et al. |
| 9,215,281 B2 | 12/2015 | Iggulden et al. |

(56) References Cited

U.S. PATENT DOCUMENTS

| | | |
|---|---|---|
| 9,222,693 B2 | 12/2015 | Gourlay et al. |
| 9,223,323 B2 | 12/2015 | Matas et al. |
| 9,234,669 B2 | 1/2016 | Filson et al. |
| 9,244,445 B2 | 1/2016 | Finch et al. |
| 9,244,470 B2 | 1/2016 | Steinberg |
| 9,261,287 B2 | 2/2016 | Warren et al. |
| 9,268,344 B2 | 2/2016 | Warren et al. |
| 9,282,590 B2 | 3/2016 | Donlan |
| 9,285,134 B2 | 3/2016 | Bray et al. |
| 9,285,802 B2 | 3/2016 | Arensmeier |
| 9,291,359 B2 | 3/2016 | Fadell et al. |
| 9,292,022 B2 | 3/2016 | Ramachandran et al. |
| 9,298,196 B2 | 3/2016 | Matsuoka et al. |
| 9,298,197 B2 | 3/2016 | Matsuoka et al. |
| 9,319,234 B2 | 4/2016 | Davis et al. |
| 9,353,965 B1 | 5/2016 | Goyal et al. |
| D763,707 S | 8/2016 | Sinha et al. |
| 9,588,506 B1 | 3/2017 | Clayton |
| 9,589,459 B2 | 3/2017 | Davis et al. |
| D790,369 S | 6/2017 | Sinha et al. |
| 9,696,701 B2 | 7/2017 | Vasylyev |
| 9,727,063 B1 | 8/2017 | Shilts et al. |
| 9,762,408 B2 | 9/2017 | Davis et al. |
| 9,857,238 B2 | 1/2018 | Malhotra et al. |
| D810,591 S | 2/2018 | Ribbich et al. |
| 9,887,887 B2 | 2/2018 | Hunter et al. |
| D814,321 S | 4/2018 | Abdala et al. |
| 10,019,739 B1 | 7/2018 | Packer et al. |
| 10,031,534 B1 | 7/2018 | Devenish et al. |
| 2001/0015281 A1 | 8/2001 | Schiedegger et al. |
| 2002/0123843 A1 | 9/2002 | Hood |
| 2003/0034897 A1 | 2/2003 | Shamoon et al. |
| 2003/0034898 A1 | 2/2003 | Shamoon et al. |
| 2003/0136853 A1 | 7/2003 | Morey |
| 2003/0177012 A1 | 9/2003 | Drennan |
| 2003/0182394 A1 | 9/2003 | Ryngler et al. |
| 2004/0074978 A1 | 4/2004 | Rosen |
| 2004/0125940 A1 | 7/2004 | Turcan et al. |
| 2004/0249479 A1 | 12/2004 | Shorrock |
| 2004/0262410 A1 | 12/2004 | Hull |
| 2005/0083168 A1 | 4/2005 | Breitenbach |
| 2005/0119794 A1 | 6/2005 | Amundson et al. |
| 2005/0145705 A1 | 7/2005 | Shah et al. |
| 2005/0156049 A1 | 7/2005 | Van Ostrand et al. |
| 2005/0194456 A1 | 9/2005 | Tessier et al. |
| 2005/0270735 A1 | 12/2005 | Chen |
| 2006/0038025 A1 | 2/2006 | Lee |
| 2006/0113398 A1 | 6/2006 | Ashworth |
| 2006/0186214 A1 | 8/2006 | Simon et al. |
| 2006/0192022 A1 | 8/2006 | Barton et al. |
| 2006/0226970 A1 | 10/2006 | Saga et al. |
| 2006/0238517 A1* | 10/2006 | King ............... G06F 3/03547 |
| | | 345/173 |
| 2006/0260334 A1 | 11/2006 | Carey et al. |
| 2006/0265489 A1 | 11/2006 | Moore |
| 2007/0013532 A1 | 1/2007 | Ehlers |
| 2007/0045431 A1 | 3/2007 | Chapman et al. |
| 2007/0050732 A1 | 3/2007 | Chapman et al. |
| 2007/0057079 A1 | 3/2007 | Stark et al. |
| 2007/0198099 A9 | 8/2007 | Shah |
| 2007/0228182 A1 | 10/2007 | Wagner et al. |
| 2007/0228183 A1 | 10/2007 | Kennedy et al. |
| 2007/0241203 A1 | 10/2007 | Wagner et al. |
| 2008/0015740 A1 | 1/2008 | Osann, Jr. |
| 2008/0048046 A1 | 2/2008 | Wagner et al. |
| 2008/0054084 A1 | 3/2008 | Olson |
| 2008/0073440 A1 | 3/2008 | Butler et al. |
| 2008/0120446 A1 | 5/2008 | Butler et al. |
| 2008/0161978 A1 | 7/2008 | Shah |
| 2008/0216495 A1 | 9/2008 | Kates |
| 2008/0221714 A1 | 9/2008 | Schoettle |
| 2008/0223051 A1 | 9/2008 | Kates |
| 2008/0227430 A1 | 9/2008 | Polk |
| 2008/0277486 A1 | 11/2008 | Seem et al. |
| 2008/0280637 A1 | 11/2008 | Shaffer et al. |
| 2008/0289347 A1 | 11/2008 | Kadle et al. |
| 2008/0290183 A1 | 11/2008 | Laberge et al. |
| 2008/0294274 A1 | 11/2008 | Laberge et al. |
| 2008/0295030 A1 | 11/2008 | Laberge et al. |
| 2009/0065596 A1 | 3/2009 | Seem et al. |
| 2009/0122329 A1* | 5/2009 | Hegemier ............... G06T 11/60 |
| | | 358/1.9 |
| 2009/0140065 A1 | 6/2009 | Juntunen et al. |
| 2009/0143880 A1 | 6/2009 | Amundson et al. |
| 2009/0143918 A1 | 6/2009 | Amundson et al. |
| 2009/0144015 A1 | 6/2009 | Bedard |
| 2009/0251422 A1 | 10/2009 | Wu et al. |
| 2009/0276096 A1 | 11/2009 | Proffitt et al. |
| 2010/0070092 A1 | 3/2010 | Winter et al. |
| 2010/0084482 A1 | 4/2010 | Kennedy et al. |
| 2010/0106334 A1 | 4/2010 | Grohman et al. |
| 2010/0107076 A1 | 4/2010 | Grohman et al. |
| 2010/0131884 A1 | 5/2010 | Shah |
| 2010/0145536 A1 | 6/2010 | Masters et al. |
| 2010/0163635 A1 | 7/2010 | Ye |
| 2010/0171889 A1 | 7/2010 | Pantel et al. |
| 2010/0182743 A1 | 7/2010 | Roher |
| 2010/0190479 A1 | 7/2010 | Scott et al. |
| 2010/0204834 A1 | 8/2010 | Comerford et al. |
| 2010/0212879 A1 | 8/2010 | Schnell et al. |
| 2010/0250707 A1 | 9/2010 | Dalley et al. |
| 2010/0262298 A1 | 10/2010 | Johnson et al. |
| 2010/0304841 A1 | 12/2010 | Sammon et al. |
| 2011/0006887 A1 | 1/2011 | Shaull et al. |
| 2011/0046798 A1* | 2/2011 | Imes ..................... F24F 11/006 |
| | | 700/286 |
| 2011/0067851 A1 | 3/2011 | Terlson et al. |
| 2011/0087988 A1 | 4/2011 | Ray et al. |
| 2011/0088416 A1 | 4/2011 | Koethler |
| 2011/0128378 A1 | 6/2011 | Raji |
| 2011/0132991 A1 | 6/2011 | Moody et al. |
| 2011/0137467 A1 | 6/2011 | Leen et al. |
| 2011/0153090 A1 | 6/2011 | Besore et al. |
| 2011/0181412 A1 | 7/2011 | Alexander et al. |
| 2011/0209097 A1* | 8/2011 | Hinckley ............... G06F 3/0483 |
| | | 715/863 |
| 2011/0238224 A1 | 9/2011 | Schnell et al. |
| 2011/0264279 A1 | 10/2011 | Poth |
| 2011/0290893 A1 | 12/2011 | Steinberg |
| 2012/0001873 A1 | 1/2012 | Wu et al. |
| 2012/0007555 A1 | 1/2012 | Bukow |
| 2012/0046859 A1 | 2/2012 | Imes et al. |
| 2012/0048955 A1 | 3/2012 | Lin et al. |
| 2012/0061480 A1 | 3/2012 | Deligiannis et al. |
| 2012/0067561 A1 | 3/2012 | Bergman et al. |
| 2012/0093141 A1 | 4/2012 | Imes et al. |
| 2012/0095601 A1 | 4/2012 | Abraham et al. |
| 2012/0101637 A1 | 4/2012 | Imes et al. |
| 2012/0123594 A1 | 5/2012 | Finch et al. |
| 2012/0126020 A1 | 5/2012 | Filson et al. |
| 2012/0126021 A1 | 5/2012 | Warren et al. |
| 2012/0130547 A1 | 5/2012 | Fadell et al. |
| 2012/0131504 A1 | 5/2012 | Fadell et al. |
| 2012/0165993 A1 | 6/2012 | Whitehouse |
| 2012/0179727 A1 | 7/2012 | Esser |
| 2012/0181010 A1 | 7/2012 | Schultz et al. |
| 2012/0191257 A1 | 7/2012 | Corcoran et al. |
| 2012/0229521 A1 | 9/2012 | Hales et al. |
| 2012/0230661 A1 | 9/2012 | Alhilo |
| 2012/0239207 A1 | 9/2012 | Fadell et al. |
| 2012/0252430 A1 | 10/2012 | Imes et al. |
| 2012/0259469 A1 | 10/2012 | Ward et al. |
| 2012/0259470 A1 | 10/2012 | Nijhawan et al. |
| 2012/0290230 A1 | 11/2012 | Berges Gonzalez et al. |
| 2012/0303165 A1 | 11/2012 | Qu et al. |
| 2012/0310418 A1 | 12/2012 | Harrod et al. |
| 2012/0315848 A1 | 12/2012 | Smith et al. |
| 2013/0024187 A1 | 1/2013 | Chang et al. |
| 2013/0030600 A1 | 1/2013 | Shetty et al. |
| 2013/0054758 A1 | 2/2013 | Imes et al. |
| 2013/0057381 A1 | 3/2013 | Kandhasamy |
| 2013/0073093 A1 | 3/2013 | Songkakul |
| 2013/0087628 A1 | 4/2013 | Nelson et al. |
| 2013/0090767 A1 | 4/2013 | Bruck et al. |

(56) References Cited

U.S. PATENT DOCUMENTS

| | | |
|---|---|---|
| 2013/0099008 A1 | 4/2013 | Aljabari et al. |
| 2013/0099009 A1 | 4/2013 | Filson et al. |
| 2013/0123991 A1 | 5/2013 | Richmond |
| 2013/0138250 A1 | 5/2013 | Mowery et al. |
| 2013/0144443 A1 | 6/2013 | Casson et al. |
| 2013/0151016 A1 | 6/2013 | Bias et al. |
| 2013/0151018 A1 | 6/2013 | Bias et al. |
| 2013/0158721 A1 | 6/2013 | Somasundaram et al. |
| 2013/0163300 A1 | 6/2013 | Zhao et al. |
| 2013/0166075 A1 | 6/2013 | Castillo et al. |
| 2013/0180700 A1 | 7/2013 | Aycock |
| 2013/0190932 A1 | 7/2013 | Schuman |
| 2013/0190940 A1 | 7/2013 | Sloop et al. |
| 2013/0204408 A1 | 8/2013 | Thiruvengada et al. |
| 2013/0204441 A1 | 8/2013 | Sloo et al. |
| 2013/0204442 A1 | 8/2013 | Modi et al. |
| 2013/0211600 A1 | 8/2013 | Dean-Hendricks et al. |
| 2013/0215058 A1 | 8/2013 | Brazell et al. |
| 2013/0221117 A1 | 8/2013 | Warren et al. |
| 2013/0228633 A1 | 9/2013 | Toth et al. |
| 2013/0234840 A1 | 9/2013 | Trundle et al. |
| 2013/0243032 A1 | 9/2013 | Arunasalam et al. |
| 2013/0245838 A1* | 9/2013 | Zywicki ............ G05D 23/1905 700/278 |
| 2013/0268125 A1 | 10/2013 | Matsuoka |
| 2013/0268129 A1 | 10/2013 | Fadell et al. |
| 2013/0271670 A1 | 10/2013 | Sakata et al. |
| 2013/0292481 A1 | 11/2013 | Filson et al. |
| 2013/0297078 A1 | 11/2013 | Kolavennu |
| 2013/0318444 A1 | 11/2013 | Imes et al. |
| 2013/0325190 A1 | 12/2013 | Imes et al. |
| 2013/0332000 A1 | 12/2013 | Imes et al. |
| 2013/0338837 A1 | 12/2013 | Hublou et al. |
| 2013/0338839 A1 | 12/2013 | Rogers et al. |
| 2013/0340993 A1 | 12/2013 | Siddaramanna et al. |
| 2013/0345882 A1 | 12/2013 | Dushane et al. |
| 2014/0002461 A1 | 1/2014 | Wang |
| 2014/0031989 A1 | 1/2014 | Bergman et al. |
| 2014/0034284 A1 | 2/2014 | Butler et al. |
| 2014/0039692 A1 | 2/2014 | Leen et al. |
| 2014/0041846 A1 | 2/2014 | Leen et al. |
| 2014/0048608 A1 | 2/2014 | Frank |
| 2014/0052300 A1 | 2/2014 | Matsuoka et al. |
| 2014/0058806 A1 | 2/2014 | Guenette et al. |
| 2014/0070919 A1 | 3/2014 | Jackson et al. |
| 2014/0114706 A1 | 4/2014 | Blakely |
| 2014/0117103 A1 | 5/2014 | Rossi et al. |
| 2014/0118285 A1 | 5/2014 | Poplawski |
| 2014/0129034 A1 | 5/2014 | Stefanski et al. |
| 2014/0149270 A1 | 5/2014 | Lombard et al. |
| 2014/0151456 A1 | 6/2014 | McCurnin et al. |
| 2014/0152631 A1 | 6/2014 | Moore et al. |
| 2014/0156087 A1 | 6/2014 | Amundson |
| 2014/0158338 A1 | 6/2014 | Kates |
| 2014/0163746 A1 | 6/2014 | Drew et al. |
| 2014/0165612 A1 | 6/2014 | Qu et al. |
| 2014/0175181 A1 | 6/2014 | Warren et al. |
| 2014/0188288 A1 | 7/2014 | Fisher et al. |
| 2014/0191848 A1 | 7/2014 | Imes et al. |
| 2014/0207291 A1 | 7/2014 | Golden et al. |
| 2014/0207292 A1 | 7/2014 | Ramagem et al. |
| 2014/0214212 A1 | 7/2014 | Leen et al. |
| 2014/0216078 A1 | 8/2014 | Ladd |
| 2014/0217185 A1 | 8/2014 | Bicknell |
| 2014/0217186 A1 | 8/2014 | Kramer et al. |
| 2014/0228983 A1 | 8/2014 | Groskreutz et al. |
| 2014/0231530 A1 | 8/2014 | Warren et al. |
| 2014/0244047 A1 | 8/2014 | Oh et al. |
| 2014/0250397 A1 | 9/2014 | Kannan et al. |
| 2014/0250399 A1 | 9/2014 | Gaherwar |
| 2014/0262196 A1 | 9/2014 | Frank et al. |
| 2014/0262484 A1 | 9/2014 | Khoury et al. |
| 2014/0263679 A1 | 9/2014 | Conner et al. |
| 2014/0267008 A1 | 9/2014 | Jain et al. |
| 2014/0277762 A1 | 9/2014 | Drew |
| 2014/0277769 A1 | 9/2014 | Matsuoka et al. |
| 2014/0277770 A1 | 9/2014 | Aljabari et al. |
| 2014/0297001 A1 | 10/2014 | Silverman |
| 2014/0299670 A1 | 10/2014 | Ramachandran et al. |
| 2014/0309792 A1 | 10/2014 | Drew |
| 2014/0312131 A1 | 10/2014 | Tousignant et al. |
| 2014/0312694 A1 | 10/2014 | Tu et al. |
| 2014/0316585 A1 | 10/2014 | Boesveld et al. |
| 2014/0316586 A1 | 10/2014 | Boesveld et al. |
| 2014/0316587 A1 | 10/2014 | Imes et al. |
| 2014/0317029 A1 | 10/2014 | Matsuoka et al. |
| 2014/0319231 A1 | 10/2014 | Matsuoka et al. |
| 2014/0319236 A1 | 10/2014 | Novotny et al. |
| 2014/0320282 A1 | 10/2014 | Zhang |
| 2014/0321011 A1 | 10/2014 | Bisson et al. |
| 2014/0324232 A1 | 10/2014 | Modi et al. |
| 2014/0330435 A1 | 11/2014 | Stoner et al. |
| 2014/0346239 A1 | 11/2014 | Fadell et al. |
| 2014/0358295 A1 | 12/2014 | Warren et al. |
| 2014/0367475 A1 | 12/2014 | Fadell et al. |
| 2014/0376747 A1 | 12/2014 | Mullet et al. |
| 2015/0001361 A1 | 1/2015 | Gagne et al. |
| 2015/0002165 A1 | 1/2015 | Juntunen et al. |
| 2015/0025693 A1 | 1/2015 | Wu et al. |
| 2015/0039137 A1 | 2/2015 | Perry et al. |
| 2015/0041551 A1 | 2/2015 | Tessier et al. |
| 2015/0045976 A1 | 2/2015 | Li |
| 2015/0046162 A1 | 2/2015 | Aley-Raz et al. |
| 2015/0052253 A1 | 2/2015 | Johnson et al. |
| 2015/0052258 A1 | 2/2015 | Johnson et al. |
| 2015/0053779 A1 | 2/2015 | Adamek et al. |
| 2015/0053780 A1 | 2/2015 | Nelson et al. |
| 2015/0053781 A1 | 2/2015 | Nelson et al. |
| 2015/0058779 A1 | 2/2015 | Bruck et al. |
| 2015/0061859 A1 | 3/2015 | Matsuoka et al. |
| 2015/0066215 A1 | 3/2015 | Buduri |
| 2015/0066220 A1 | 3/2015 | Sloo et al. |
| 2015/0081106 A1 | 3/2015 | Buduri |
| 2015/0081568 A1 | 3/2015 | Land |
| 2015/0082225 A1 | 3/2015 | Shearer |
| 2015/0088272 A1 | 3/2015 | Drew |
| 2015/0088318 A1 | 3/2015 | Amundson et al. |
| 2015/0088982 A1 | 3/2015 | Johnson et al. |
| 2015/0100166 A1 | 4/2015 | Baynes et al. |
| 2015/0100167 A1 | 4/2015 | Sloo et al. |
| 2015/0115045 A1 | 4/2015 | Tu et al. |
| 2015/0115046 A1 | 4/2015 | Warren et al. |
| 2015/0124853 A1 | 5/2015 | Huppi et al. |
| 2015/0127176 A1 | 5/2015 | Bergman et al. |
| 2015/0140994 A1 | 5/2015 | Partheesh et al. |
| 2015/0142180 A1 | 5/2015 | Matsuoka et al. |
| 2015/0144706 A1 | 5/2015 | Robideau et al. |
| 2015/0145653 A1 | 5/2015 | Katingari et al. |
| 2015/0148963 A1 | 5/2015 | Klein et al. |
| 2015/0153060 A1 | 6/2015 | Stefanski et al. |
| 2015/0159893 A1 | 6/2015 | Daubman et al. |
| 2015/0159899 A1 | 6/2015 | Bergman et al. |
| 2015/0159902 A1 | 6/2015 | Quam et al. |
| 2015/0159903 A1 | 6/2015 | Marak et al. |
| 2015/0159904 A1 | 6/2015 | Barton |
| 2015/0160691 A1 | 6/2015 | Kadah et al. |
| 2015/0163945 A1 | 6/2015 | Barton et al. |
| 2015/0167995 A1 | 6/2015 | Fadell et al. |
| 2015/0168002 A1 | 6/2015 | Plitkins et al. |
| 2015/0168003 A1 | 6/2015 | Stefanski et al. |
| 2015/0168933 A1 | 6/2015 | Klein et al. |
| 2015/0170171 A1 | 6/2015 | McCurnin et al. |
| 2015/0176854 A1 | 6/2015 | Butler et al. |
| 2015/0176855 A1 | 6/2015 | Geadelmann et al. |
| 2015/0198346 A1 | 7/2015 | Vedpathak |
| 2015/0198347 A1 | 7/2015 | Tessier et al. |
| 2015/0204558 A1 | 7/2015 | Sartain et al. |
| 2015/0204561 A1 | 7/2015 | Sadwick et al. |
| 2015/0204563 A1 | 7/2015 | Imes et al. |
| 2015/0204564 A1 | 7/2015 | Shah |
| 2015/0204565 A1 | 7/2015 | Amundson et al. |
| 2015/0204569 A1 | 7/2015 | Lorenz et al. |
| 2015/0204570 A1 | 7/2015 | Adamik et al. |
| 2015/0205310 A1 | 7/2015 | Amundson et al. |

(56) References Cited

U.S. PATENT DOCUMENTS

| | | |
|---|---|---|
| 2015/0219357 A1 | 8/2015 | Stefanski et al. |
| 2015/0233594 A1 | 8/2015 | Abe et al. |
| 2015/0233595 A1 | 8/2015 | Fadell et al. |
| 2015/0233596 A1 | 8/2015 | Warren et al. |
| 2015/0234369 A1 | 8/2015 | Wen et al. |
| 2015/0241078 A1 | 8/2015 | Matsuoka et al. |
| 2015/0241860 A1 | 8/2015 | Raid |
| 2015/0245189 A1 | 8/2015 | Nalluri et al. |
| 2015/0248118 A1 | 9/2015 | Li et al. |
| 2015/0260424 A1 | 9/2015 | Fadell et al. |
| 2015/0267935 A1 | 9/2015 | Devenish et al. |
| 2015/0268652 A1 | 9/2015 | Lunacek et al. |
| 2015/0276237 A1 | 10/2015 | Daniels et al. |
| 2015/0276238 A1 | 10/2015 | Matsuoka et al. |
| 2015/0276239 A1 | 10/2015 | Fadell et al. |
| 2015/0276254 A1 | 10/2015 | Nemcek et al. |
| 2015/0276266 A1 | 10/2015 | Warren et al. |
| 2015/0277463 A1 | 10/2015 | Hazzard et al. |
| 2015/0277492 A1 | 10/2015 | Chau et al. |
| 2015/0280935 A1 | 10/2015 | Poplawski et al. |
| 2015/0287310 A1 | 10/2015 | Deiiuliis et al. |
| 2015/0292765 A1 | 10/2015 | Matsuoka et al. |
| 2015/0293541 A1 | 10/2015 | Fadell et al. |
| 2015/0300672 A1 | 10/2015 | Fadell et al. |
| 2015/0312696 A1 | 10/2015 | Ribbich et al. |
| 2015/0316285 A1 | 11/2015 | Clifton et al. |
| 2015/0316286 A1 | 11/2015 | Roher |
| 2015/0316902 A1 | 11/2015 | Wenzel et al. |
| 2015/0323212 A1 | 11/2015 | Warren et al. |
| 2015/0327010 A1 | 11/2015 | Gottschalk et al. |
| 2015/0327375 A1 | 11/2015 | Bick et al. |
| 2015/0330654 A1 | 11/2015 | Matsuoka |
| 2015/0330658 A1 | 11/2015 | Filson et al. |
| 2015/0330660 A1 | 11/2015 | Filson et al. |
| 2015/0332150 A1 | 11/2015 | Thompson |
| 2015/0338117 A1 | 11/2015 | Henneberger et al. |
| 2015/0345818 A1 | 12/2015 | Oh et al. |
| 2015/0348554 A1 | 12/2015 | Orr et al. |
| 2015/0354844 A1 | 12/2015 | Kates |
| 2015/0354846 A1 | 12/2015 | Hales et al. |
| 2015/0355371 A1 | 12/2015 | Ableitner et al. |
| 2015/0362208 A1 | 12/2015 | Novotny et al. |
| 2015/0362926 A1 | 12/2015 | Yarde et al. |
| 2015/0362927 A1 | 12/2015 | Giorgi |
| 2015/0364135 A1 | 12/2015 | Kolavennu et al. |
| 2015/0370270 A1 | 12/2015 | Pan et al. |
| 2015/0370272 A1 | 12/2015 | Reddy et al. |
| 2015/0372832 A1 | 12/2015 | Kortz et al. |
| 2016/0006274 A1 | 1/2016 | Tu et al. |
| 2016/0006577 A1 | 1/2016 | Logan |
| 2016/0010880 A1 | 1/2016 | Bravard et al. |
| 2016/0018122 A1 | 1/2016 | Frank et al. |
| 2016/0018127 A1 | 1/2016 | Gourlay et al. |
| 2016/0020590 A1 | 1/2016 | Roosli et al. |
| 2016/0036227 A1 | 2/2016 | Schultz et al. |
| 2016/0047569 A1 | 2/2016 | Fadell et al. |
| 2016/0054022 A1 | 2/2016 | Matas et al. |
| 2016/0054792 A1 | 2/2016 | Poupyrev |
| 2016/0054988 A1 | 2/2016 | Desire |
| 2016/0061471 A1 | 3/2016 | Eicher et al. |
| 2016/0061474 A1 | 3/2016 | Cheung et al. |
| 2016/0069582 A1 | 3/2016 | Buduri |
| 2016/0069583 A1 | 3/2016 | Fadell et al. |
| 2016/0073482 A1 | 3/2016 | Fok et al. |
| 2016/0077532 A1 | 3/2016 | Lagerstedt et al. |
| 2016/0087933 A1 | 3/2016 | Johnson et al. |
| 2016/0103457 A1 | 4/2016 | Maughan et al. |
| 2016/0107820 A1 | 4/2016 | MacVittie et al. |
| 2016/0112262 A1 | 4/2016 | Johnson et al. |
| 2016/0116177 A1 | 4/2016 | Sikora et al. |
| 2016/0131382 A1 | 5/2016 | Rosen |
| 2016/0138819 A1 | 5/2016 | Vega |
| 2016/0171289 A1 | 6/2016 | Lee et al. |
| 2016/0180663 A1 | 6/2016 | McMahan et al. |
| 2016/0187023 A1* | 6/2016 | Bevan ............... F24F 11/30 236/1 C |
| 2016/0223216 A1 | 8/2016 | Buda et al. |
| 2016/0249437 A1 | 8/2016 | Sun et al. |
| 2016/0261425 A1 | 9/2016 | Horton et al. |
| 2016/0290671 A1 | 10/2016 | Schuster et al. |
| 2016/0327298 A1* | 11/2016 | Sinha ............... G05D 23/1917 |
| 2016/0327299 A1 | 11/2016 | Ribbich et al. |
| 2016/0327300 A1 | 11/2016 | Ribbich et al. |
| 2016/0327301 A1 | 11/2016 | Ribbich et al. |
| 2016/0327302 A1 | 11/2016 | Ribbich et al. |
| 2016/0327921 A1 | 11/2016 | Ribbich et al. |
| 2016/0330084 A1 | 11/2016 | Hunter et al. |
| 2016/0344745 A1 | 11/2016 | Johnson et al. |
| 2016/0364114 A1* | 12/2016 | Von Dehsen ....... H04L 12/2807 |
| 2016/0377306 A1 | 12/2016 | Drees et al. |
| 2017/0041454 A1 | 2/2017 | Nicholls et al. |
| 2017/0059197 A1 | 3/2017 | Goyal et al. |
| 2017/0074536 A1 | 3/2017 | Bentz et al. |
| 2017/0074537 A1 | 3/2017 | Bentz et al. |
| 2017/0074539 A1 | 3/2017 | Bentz et al. |
| 2017/0074541 A1 | 3/2017 | Bentz et al. |
| 2017/0075510 A1 | 3/2017 | Bentz et al. |
| 2017/0075568 A1 | 3/2017 | Bentz et al. |
| 2017/0076263 A1 | 3/2017 | Bentz et al. |
| 2017/0102162 A1 | 4/2017 | Drees et al. |
| 2017/0102433 A1 | 4/2017 | Wenzel et al. |
| 2017/0102434 A1 | 4/2017 | Wenzel et al. |
| 2017/0102675 A1 | 4/2017 | Drees |
| 2017/0102723 A1 | 4/2017 | Smith et al. |
| 2017/0103483 A1 | 4/2017 | Drees et al. |
| 2017/0104332 A1 | 4/2017 | Wenzel et al. |
| 2017/0104336 A1 | 4/2017 | Elbsat et al. |
| 2017/0104337 A1 | 4/2017 | Drees |
| 2017/0104342 A1 | 4/2017 | Elbsat et al. |
| 2017/0104343 A1 | 4/2017 | Elbsat et al. |
| 2017/0104344 A1 | 4/2017 | Wenzel et al. |
| 2017/0104345 A1 | 4/2017 | Wenzel et al. |
| 2017/0104346 A1 | 4/2017 | Wenzel et al. |
| 2017/0104449 A1 | 4/2017 | Drees |
| 2017/0122613 A1 | 5/2017 | Sinha et al. |
| 2017/0122617 A1 | 5/2017 | Sinha et al. |
| 2017/0123391 A1 | 5/2017 | Ribbich et al. |
| 2017/0124838 A1 | 5/2017 | Sinha et al. |
| 2017/0124842 A1 | 5/2017 | Sinha et al. |
| 2017/0131825 A1 | 5/2017 | Moore et al. |
| 2017/0192402 A1 | 7/2017 | Karp et al. |
| 2017/0263111 A1 | 9/2017 | Deluliis et al. |
| 2017/0272316 A1 | 9/2017 | Johnson et al. |
| 2017/0277407 A1 | 9/2017 | Siravuri |
| 2017/0292731 A1 | 10/2017 | Matsuoka et al. |
| 2018/0023833 A1 | 1/2018 | Matsuoka et al. |
| 2018/0087795 A1 | 3/2018 | Okita et al. |
| 2018/0088605 A1 | 3/2018 | Matsuoka et al. |
| 2018/0123821 A1 | 5/2018 | Alberth, Jr. |
| 2018/0124178 A1 | 5/2018 | Alberth, Jr. |
| 2018/0181919 A1 | 6/2018 | Jobling et al. |
| 2018/0262388 A1 | 9/2018 | Johnson et al. |

FOREIGN PATENT DOCUMENTS

| | | |
|---|---|---|
| CA | 2633121 C | 8/2011 |
| CA | 2633121 C | 8/2011 |
| CA | 2818356 | 5/2012 |
| CA | 2853041 | 4/2013 |
| CA | 2853081 A1 | 4/2013 |
| CA | 2812567 | 5/2014 |
| CA | 2894359 A1 | 12/2015 |
| CA | 2894359 A1 | 12/2015 |
| DE | 10 2004 005 962 | 8/2005 |
| EP | 2283279 A2 | 2/2011 |
| EP | 2738478 | 6/2014 |
| EP | 2 897 018 A1 | 7/2015 |
| EP | 2897018 A1 | 7/2015 |
| EP | 2988188 A2 | 2/2016 |
| GB | 2519441 A | 4/2015 |
| WO | WO 00/22491 A1 | 4/2000 |
| WO | WO 2006/041599 A9 | 7/2006 |
| WO | WO-2009/006133 A1 | 1/2009 |

(56) References Cited

FOREIGN PATENT DOCUMENTS

| WO | WO 2009/006133 A1 | 1/2009 |
|---|---|---|
| WO | WO 2009/058127 A1 | 5/2009 |
| WO | WO 2009/036764 A3 | 1/2010 |
| WO | WO 2010/059143 A1 | 5/2010 |
| WO | WO 2010/088663 A1 | 8/2010 |
| WO | WO 2012/042232 | 4/2012 |
| WO | WO 2012/068436 A1 | 5/2012 |
| WO | WO 2012/068495 A1 | 5/2012 |
| WO | WO 2012/068503 A1 | 5/2012 |
| WO | WO-2012/068503 A1 | 5/2012 |
| WO | WO 2012/068507 A3 | 5/2012 |
| WO | WO 2012/068517 A1 | 5/2012 |
| WO | WO-2012/068517 A1 | 5/2012 |
| WO | WO 2013/033469 A1 | 3/2013 |
| WO | WO-2013/033469 A1 | 3/2013 |
| WO | WO 2013/052389 A1 | 4/2013 |
| WO | WO 2013/052905 A1 | 4/2013 |
| WO | WO-2013/058933 A1 | 4/2013 |
| WO | WO 2013/058933 A1 | 4/2013 |
| WO | WO 2013/058934 | 4/2013 |
| WO | WO 2013/058968 A1 | 4/2013 |
| WO | WO 2013/058969 A1 | 4/2013 |
| WO | WO 2013/059684 A1 | 4/2013 |
| WO | WO 2012/142477 A3 | 8/2013 |
| WO | WO 2013/153480 A3 | 12/2013 |
| WO | WO 2012/068437 A3 | 4/2014 |
| WO | WO 2012/068459 A3 | 4/2014 |
| WO | WO 2013/058932 | 4/2014 |
| WO | WO 2014/051632 A1 | 4/2014 |
| WO | WO 2014/051635 A1 | 4/2014 |
| WO | WO 2014/055059 A1 | 4/2014 |
| WO | WO 2013/052901 A3 | 5/2014 |
| WO | WO 2014/152301 A2 | 9/2014 |
| WO | WO 2014/152301 A3 | 9/2014 |
| WO | WO 2015/012449 | 1/2015 |
| WO | WO-2015/039178 A1 | 3/2015 |
| WO | WO 2015/039178 A1 | 3/2015 |
| WO | WO 2015/054272 A2 | 4/2015 |
| WO | WO-2015/057698 A1 | 4/2015 |
| WO | WO 2015/057698 A1 | 4/2015 |
| WO | WO 2015/099721 A1 | 7/2015 |
| WO | WO 2015/127499 A1 | 9/2015 |
| WO | WO-2015/127499 A1 | 9/2015 |
| WO | WO 2015/127566 A1 | 9/2015 |
| WO | WO-2017/044903 A1 | 3/2017 |

OTHER PUBLICATIONS

Office Action for U.S. Appl. No. 15/336,792, dated Mar. 29, 2018, 12 pages.
Written Opinion for Singapore Application No. 11201709002Y, dated Feb. 7, 2018, 5 pages.
Office Action for U.S. Appl. No. 15/260,294, dated Feb. 16, 2018, 19 pages.
Office Action for U.S. Appl. No. 15/260,297, dated Feb. 9, 2018, 17 pages.
Office Action for U.S. Appl. No. 15/260,301, dated Feb. 9, 2018, 9 pages.
Office Action for U.S. Appl. No. 15/336,789, dated Feb. 22, 2018, 15 pages.
Office Action for U.S. Appl. No. 15/336,791, dated Mar. 2, 2018, 13 pages.
Notice of Allowance for U.S. Appl. No. 15/146,649, dated Feb. 27, 2018, 7 pages.
U.S. Appl. No. 15/179,894, filed Jun. 10, 2016, Johnson Controls Technology Company.
U.S. Appl. No. 15/207,431, filed Jul. 11, 2016, Johnson Controls Technology Company.
Search Report for International Application No. PCT/US2017/030890, dated Jun. 21, 2017, 13 pages.
Office Action for U.S. Appl. No. 15/336,789, dated Aug. 10, 2017, 14 pages.
Written Opinion for Singapore Application No. 11201708996V, dated Dec. 27, 2017, 6 pages.
Written Opinion for Singapore Application No. 11201708997W, dated Jan. 10, 2018, 9 pages.
U.S. Appl. No. 15/338,215, filed Oct. 28, 2016, JOHNSON CONTROLS TECHNOLOGY COMPANY.
U.S. Appl. No. 15/338,221, filed Oct. 28, 2016, JOHNSON CONTROLS TECHNOLOGY COMPANY.
U.S. Appl. No. 29/548,334, filed Dec. 11, 2015, JOHNSON CONTROLS TECHNOLOGY COMPANY.
U.S. Appl. No. 29/563,447, filed May 4, 2016, JOHNSON CONTROLS TECHNOLOGY COMPANY.
U.S. Appl. No. 29/576,515, filed Sep. 2, 2016, JOHNSON CONTROLS TECHNOLOGY COMPANY.
U.S. Appl. No. 62/239,131, filed Oct. 8, 2015, JOHNSON CONTROLS TECHNOLOGY COMPANY.
U.S. Appl. No. 62/239,231, filed Oct. 8, 2015, JOHNSON CONTROLS TECHNOLOGY COMPANY.
U.S. Appl. No. 62/239,233, filed Oct. 8, 2015, JOHNSON CONTROLS TECHNOLOGY COMPANY.
U.S. Appl. No. 62/239,245, filed Oct. 8, 2015, JOHNSON CONTROLS TECHNOLOGY COMPANY.
U.S. Appl. No. 62/239,246, filed Oct. 8, 2015, JOHNSON CONTROLS TECHNOLOGY COMPANY.
U.S. Appl. No. 62/239,249, filed Oct. 8, 2015, JOHNSON CONTROLS TECHNOLOGY COMPANY.
Unknown, National Semiconductor's Temperature Sensor Handbook, Nov. 1, 1997, retrieved from the Internet at http://shrubbery.net/~heas/willem/PDF/NSC/temphb.pdf on Aug. 11, 2016, pp. 1-40.
Search Report for International Application No. PCT/US2016/030291, dated Sep. 7, 2016, 11 pages.
Search Report for International Application No. PCT/US2016/030827 dated Sep. 7, 2016, 13 pages.
Search Report for International Application No. PCT/US2016/030829, dated Sep. 7, 2016, 15 pages.
Search Report for International Application No. PCT/US2016/030835, dated Sep. 7, 2016, 13 pages.
Search Report for International Application No. PCT/US2016/030836, dated Sep. 7, 2016, 11 pages.
Search Report for International Application No. PCT/US2016/030837, dated Sep. 7, 2016, 13 pages.
Search Report for International Application No. PCT/US2016/051176, dated Feb. 16, 2017, 20 pages.
Search Report for International Application No. PCT/US2017/012217, dated Mar. 31, 2017, 14 pages.
Search Report for International Application No. PCT/US2017/012218, dated Mar. 31, 2017, 14 pages.
Search Report for International Application No. PCT/US2017/012221, dated Mar. 31, 2017, 13 pages.
Notice of Allowance for U.S. Appl. No. 15/146,763, dated Oct. 4, 2017, 8 pages.
Office Action for U.S. Appl. No. 15/146,649, dated Oct. 6, 2017, 6 pages.
Office Action for U.S. Appl. No. 15/146,749, dated Oct. 4, 2017, 9 pages.
Office Action for U.S. Appl. No. 15/336,792, dated Oct. 10, 2017, 12 pages.
Cuevas et al., Integrating Gesture-Based Identification in Context-Aware Applications: A System Approach, 2014, 8 pages.
Hayashi et al: "Wave to Me: Human Factors in Computing Systems", ACM, 2 Penn Plaza, Suite 701 New York, NY 10121-0701 USA, Apr. 26, 2014, pp. 3453-3462.
Office Action for U.S. Appl. No. 15/260,293, dated Jun. 1, 2018, 23 pages.
Office Action for U.S. Appl. No. 15/260,295, dated Apr. 18, 2018, 16 pages.
Office Action for U.S. Appl. No. 15/336,793, dated May 23, 2018, 18 pages.
Office Action on U.S. Appl. No. 15/260,297, dated Aug. 16, 2018. 21 pages.
Final Office Action on U.S. Appl. No. 15/260,301, dated Sep. 7, 2018. 7 pages.

(56) References Cited

OTHER PUBLICATIONS

Final Office Action on U.S. Appl. No. 15/260,294, dated Sep. 10, 2018. 15 pages.
Office Action on U.S. Appl. No. 15/260,293, dated Feb. 1, 2019. 22 pages.
Office Action on U.S. Appl. No. 15/260,295, dated Nov. 16, 2018. 17 pages.
Office Action on U.S. Appl. No. 15/260,298, dated Feb. 8, 2019. 68 pages.

* cited by examiner

THERMOSTAT WITH USER INTERFACE FEATURES

CROSS-REFERENCE TO RELATED PATENT APPLICATION

This application claims the benefit of and priority to U.S. Provisional Patent Application No. 62/217,788 filed Sep. 11, 2015, U.S. Provisional Patent Application No. 62/217,789 filed Sep. 11, 2015, U.S. Provisional Patent Application No. 62/217,790 filed Sep. 11, 2015, U.S. Provisional Patent Application No. 62/217,791 filed Sep. 11, 2015, U.S. Provisional Patent Application No. 62/367,597 filed Jul. 27, 2016, U.S. Provisional Patent Application No. 62/367,315 filed Jul. 27, 2016, U.S. Provisional Patent Application No. 62/367,614 filed Jul. 27, 2016, U.S. Provisional Patent Application No. 62/367,297 filed Jul. 27, 2016, U.S. Provisional Patent Application No. 62/367,621 filed Jul. 27, 2016, and U.S. Provisional Patent Application No. 62/367,291 filed Jul. 27, 2016. The present application is related to U.S. Provisional Application No. 62/247,672 filed Oct. 28, 2015, and U.S. Provisional Application No. 62/275,711 filed Jan. 6, 2016. The entire disclosure of each of these patent applications is incorporated by reference herein.

BACKGROUND

The present disclosure relates generally to thermostats and more particularly to the improved control of a building or home's heating, ventilating, and air conditioning (HVAC) system through occupancy detection.

A thermostat is, in general, a component of an HVAC control system. Thermostats sense the temperature of a system and control components of the HVAC in order to maintain a desired setpoint. A thermostat can control a heating or cooling system or an air conditioner. Thermostats are manufactured in many ways, and use a variety of sensors to measure temperature and other desired parameters.

Conventional thermostats are configured for one-way communication to connected components, and control HVAC systems by turning on or off certain components or regulating flow. Each thermostat may include a temperature sensor and a user interface. The user interface typically includes a display for presenting information to a user and one or more user interface elements for receiving input from a user. To control the temperature of a building or home, a user adjusts the temperature setpoint via the thermostat's user interface.

SUMMARY

In one aspect, embodiments of the inventive concepts disclosed herein are directed to a thermostat for a building space. The thermostat includes an electronic display, a frame, a touch sensitive interface, and a processing circuit. The touch-sensitive interface has a first portion that overlays the electronic display and a second portion that overlays the frame. The touch-sensitive interface is configured to receive touch-based input via both the first portion and the second portion. The processing circuit is configured to define one or more locations within the second portion that correspond to touch-sensitive buttons. The locations of the touch-sensitive buttons are customizable and can be changed by a user. The thermostat further including at least one of a sticker and a skin that covers at least part of the second portion and visually marks the locations of the touch-sensitive buttons.

In a further aspect, embodiments of the inventive concepts disclosed herein are directed to a method for sensing touch-based input with a thermostat. The method includes receiving the touch-based input via both a first portion of a touch-sensitive interface and a second portion of the touch-sensitive interface. The first portion overlays an electronic display of the touch-sensitive interface and the second portion overlays a frame of the touch-sensitive interface defining one or more locations of touch-sensitive buttons within the second portion of the electronic display. The locations of the touch-sensitive buttons are customizable and can be changed by a user. The method further includes visually marking the locations of the touch-sensitive buttons on the second portion of the touch-sensitive interface using at least one of a sticker and a skin.

In a further aspect, embodiments of the inventive concepts disclosed herein are directed to a thermostat for a building space. The thermostat includes an electronic display, a frame, a touch-sensitive interface, and a processing circuit. The touch-sensitive interface has a first portion that overlays the electronic display and a second portion that overlays the frame. The touch-sensitive interface is configured to receive touch-based input via both the first portion and the second portion. A skin covers at least part of the second portion and visually marks locations of one or more touch-sensitive buttons on the second portion. The processing circuit is configured to define one or more locations within the second portion that correspond to the touch-sensitive buttons. The processing circuit is further configured to detect at least one of a direct touch and a touch movement based on user input provided via the second portion of the touch-sensitive interface.

Those skilled in the art will appreciate that the summary is illustrative only and is not intended to be in any way limiting. Other aspects, inventive features, and advantages of the devices and/or processes described herein will become apparent in the detailed description set forth herein and taken in conjunction with the accompanying drawings.

BRIEF DESCRIPTION OF THE DRAWINGS

Implementations of the inventive concepts disclosed herein may be better understood when consideration is given to the following detailed description thereof. Such description makes reference to the annexed drawings, which are not necessarily to scale, and in which some features may be exaggerated and some features may be omitted or may be represented schematically in the interest of clarity. Like reference numerals in the figures may represent and refer to the same or similar element, feature, or function. In the drawings.

DETAILED DESCRIPTION

Figure 1:
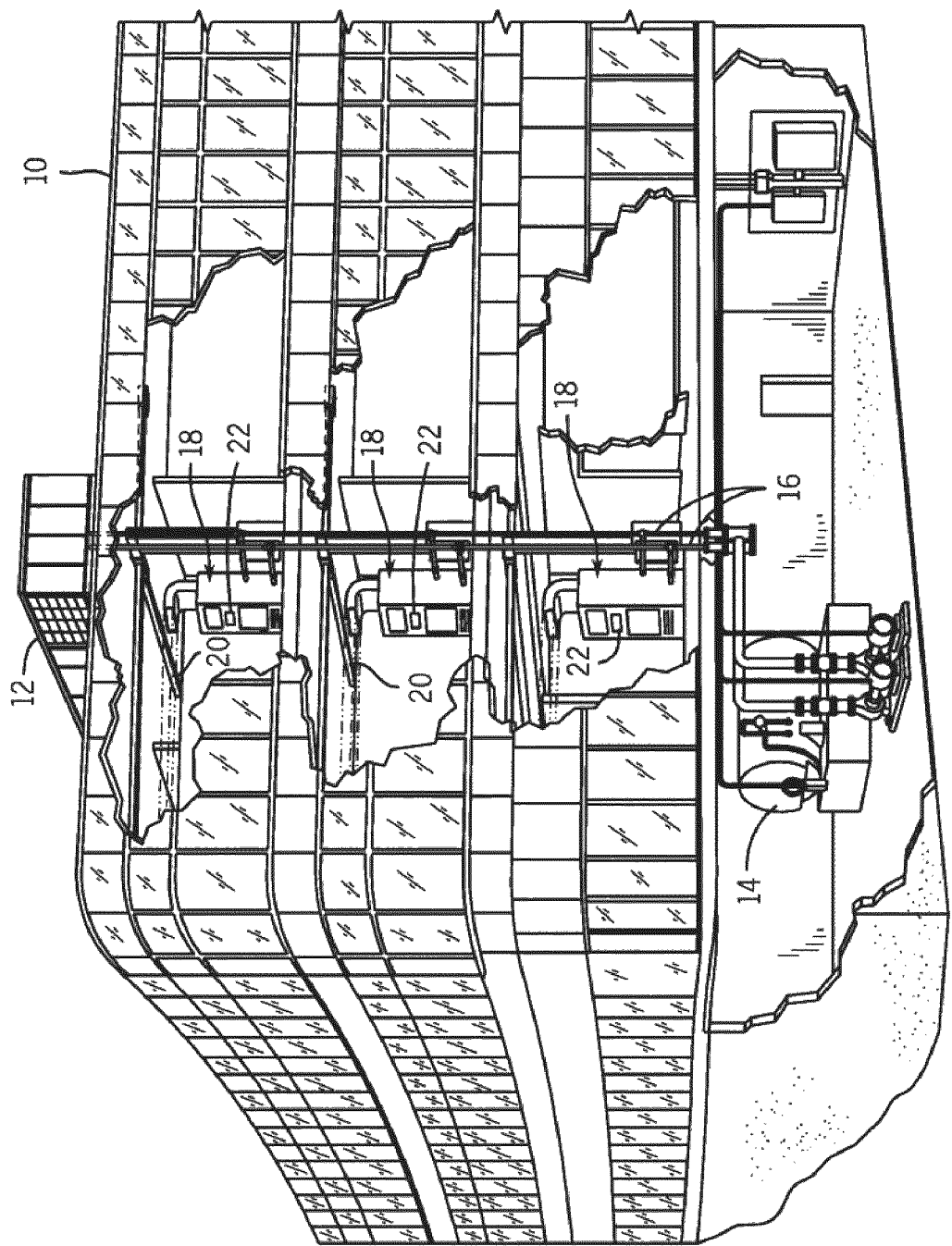
FIG. 1 is an illustration of a commercial or industrial HVAC system that employs heat exchangers, according to an exemplary embodiment.

Before describing in detail the inventive concepts disclosed herein, it should be observed that the inventive concepts disclosed herein include, but are not limited to, a novel structural combination of data/signal processing components, sensors, and/or communications circuits, and not in the particular detailed configurations thereof. Accordingly, the structure, methods, functions, control and arrangement of components, software, and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the exemplary diagrams, but should be construed in accordance with the language in the claims.

Referring generally to the FIGURES, systems and methods for a thermostat are shown according to various exemplary embodiments. The thermostat may include an electronic display, a frame, a touch sensitive interface, and a processing circuit. The touch-sensitive interface may have a first portion that overlays the electronic display and a second portion that overlays the frame. The touch-sensitive interface may be configured to receive touch-based input via both the first portion and the second portion. The processing circuit may be configured to define one or more locations within the second portion that correspond to touch-sensitive buttons. The locations of the touch-sensitive buttons may be customizable and can be changed by a user. The thermostat may further include a sticker and a skin that covers at least part of the second portion and visually marks the locations of the touch-sensitive buttons.

Building with HVAC System and Thermostat

FIG. 1 illustrates an exemplary application, in this case an HVAC system for building environmental management that may be a communicating system employing one or more control devices (e.g., thermostats) functioning as system controllers. A building 10 is cooled by a system that includes a chiller 12 and a boiler 14. As shown, chiller 12 is disposed on the roof of building 10 and boiler 14 is located in the basement; however, the chiller and boiler may be located in other equipment rooms or areas next to the building. Chiller 12 is an air cooled or water cooled device that implements a refrigeration cycle to cool water. Chiller 12 may be a stand-alone unit or may be part of a single package unit containing other equipment, such as a blower and/or integrated air handler. Boiler 14 is a closed vessel that includes a furnace to heat water. The water from chiller 12 and boiler 14 is circulated through building 10 by water conduits 16. Water conduits 16 are routed to air handlers 18, located on individual floors and within sections of building 10.

Air handlers 18 are coupled to ductwork 20 that is adapted to distribute air between the air handlers and may receive air from an outside intake (not shown). Air handlers 18 include heat exchangers that circulate cold water from chiller 12 and hot water from boiler 14 to provide heated or cooled air. Fans, within air handlers 18, draw air through the heat exchangers and direct the conditioned air to environments within building 10, such as rooms, apartments, or offices, to maintain the environments at a designated temperature. A control device 22, shown here as including a thermostat, may be used to designate the temperature of the conditioned air. Control device 22 also may be used to control the flow of air through and from air handlers 18 and to diagnose mechanical or electrical problems with the air handlers 18. Other devices may, of course, be included in the system, such as control valves that regulate the flow of water and pressure and/or temperature transducers or switches that sense the temperatures and pressures of the water, the air, and so forth. Moreover, the control device may communicate with computer systems that are integrated with or separate from other building control or monitoring systems, and even systems that are remote from the building.

Figure 2:
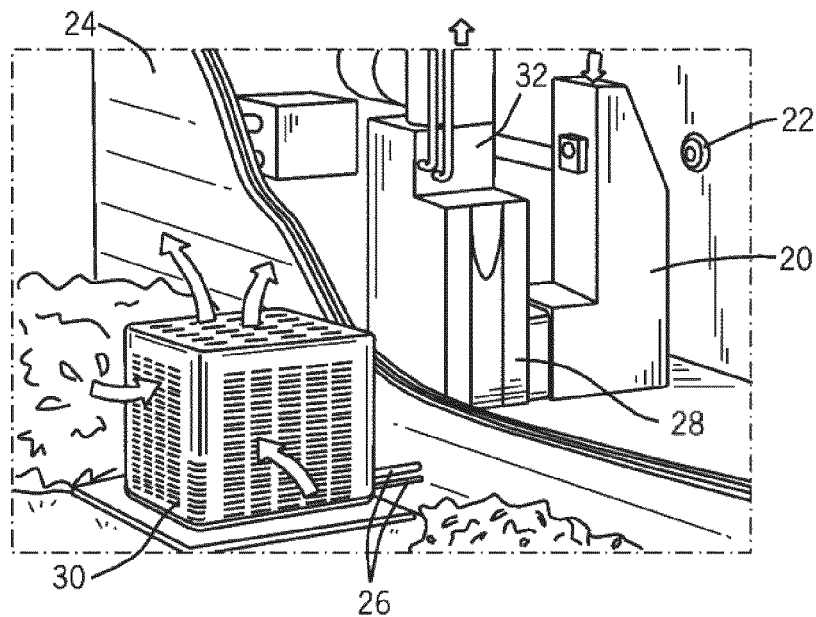
FIG. 2 is an illustration of a residential HVAC system that employs heat exchangers, according to an exemplary embodiment.

FIG. 2 illustrates a residential heating and cooling system. The residential heating and cooling system may provide heated and cooled air to a residential structure, as well as provide outside air for ventilation and provide improved indoor air quality (IAQ) through devices such as ultraviolet lights and air filters. In general, a residence 24 will include refrigerant conduits 26 that operatively couple an indoor unit 28 to an outdoor unit 30. Indoor unit 28 may be positioned in a utility room, an attic, a basement, and so forth. Outdoor unit 30 is typically situated adjacent to a side of residence 24 and is covered by a shroud to protect the system components and to prevent leaves and other contaminants from entering the unit. Refrigerant conduits 26 transfer refrigerant between indoor unit 28 and outdoor unit 30, typically transferring primarily liquid refrigerant in one direction and primarily vaporized refrigerant in an opposite direction.

When the system shown in FIG. 2 is operating as an air conditioner, a coil in outdoor unit 30 serves as a condenser for recondensing vaporized refrigerant flowing from indoor unit 28 to outdoor unit 30 via one of the refrigerant conduits 26. In these applications, a coil of the indoor unit, designated by the reference numeral 32, serves as an evaporator coil. Evaporator coil 32 receives liquid refrigerant (which may be expanded by an expansion device, not shown) and evaporates the refrigerant before returning it to outdoor unit 30.

Outdoor unit 30 draws in environmental air through its sides as indicated by the arrows directed to the sides of the unit, forces the air through the outer unit coil using a fan (not shown), and expels the air as indicated by the arrows above the outdoor unit. When operating as an air conditioner, the air is heated by the condenser coil within the outdoor unit and exits the top of the unit at a temperature higher than it entered the sides. Air is blown over indoor coil 32 and is then circulated through residence 24 by means of ductwork 20, as indicated by the arrows entering and exiting ductwork 20. The overall system operates to maintain a desired temperature as set by system controller 22. When the temperature sensed inside the residence is higher than the set point on the thermostat (plus a small amount), the air conditioner will become operative to refrigerate additional air for circulation through the residence. When the temperature reaches the set point (minus a small amount), the unit will stop the refrigeration cycle temporarily.

When the unit in FIG. 2 operates as a heat pump, the roles of the coils are simply reversed. That is, the coil of outdoor unit 30 will serve as an evaporator to evaporate refrigerant and thereby cool air entering outdoor unit 30 as the air passes over the outdoor unit coil. Indoor coil 32 will receive a stream of air blown over it and will heat the air by condensing a refrigerant.

Figure 3:
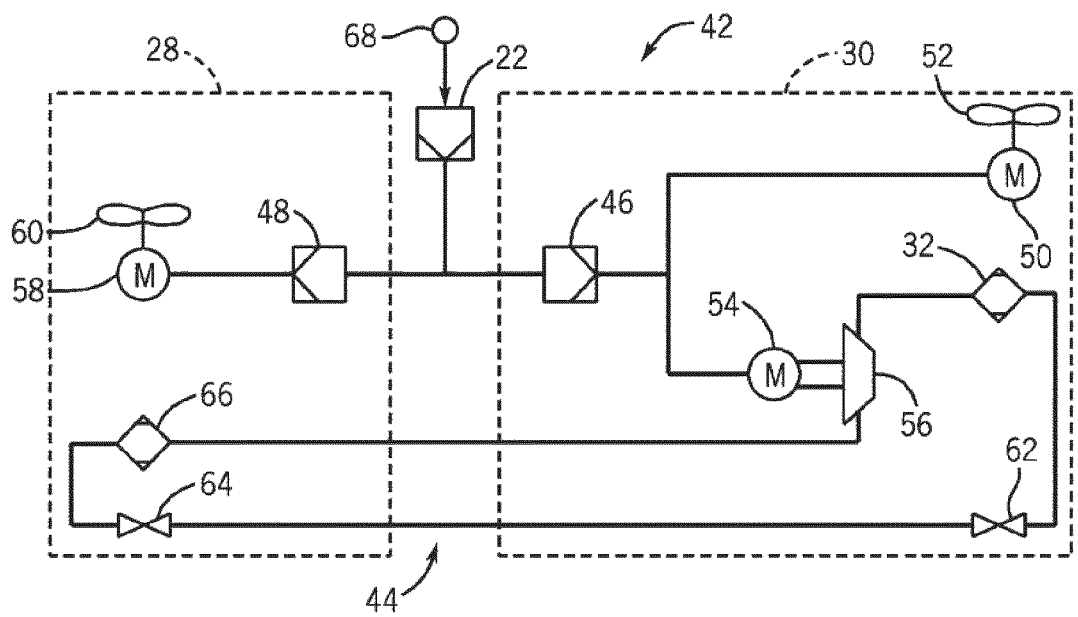
FIG. 3 is a block diagram of a HVAC system that employs a control device such as a thermostat, according to an exemplary embodiment.

FIG. 3 is a block diagram of an HVAC system 42 that includes the control device 22, indoor unit 28 functioning as an air handler, and outdoor unit 30 functioning as a heat pump. Refrigerant flows through system 42 within a closed refrigeration loop 44 between outdoor unit 30 and indoor unit 28. The refrigerant may be any fluid that absorbs and extracts heat. For example, the refrigerant may be hydrofluorocarbon (HFC) based R-410A, R-407C, or R-134a.

The operation of indoor and outdoor units 28 and 30 is controlled by control circuits 48 and 46, respectively. The control circuits 46 and 48 may execute hardware or software control algorithms to regulate the HVAC system. According to exemplary embodiments, the control circuits may include one or more microprocessors, analog to digital converters, non-volatile memories, and interface boards. In certain embodiments, the control circuits may be fitted with or coupled to auxiliary control boards that allow conventional 24 VAC wiring to be controlled through serial communications.

The control circuits 46 and 48 may receive control signals from control device 22 and transmit the signals to equipment located within indoor unit 28 and outdoor unit 30. For example, outdoor control circuit 46 may route control signals to a motor 50 that powers a fan 52 and to a motor 54 that powers a compressor 56. Indoor control circuit 48 may route control signals to a motor 58 that powers a fan 60. The control circuits also may transmit control signals to other types of equipment such as valves 62 and 64, sensors, and switches.

According to exemplary embodiments, control device 22 may communicate with control circuits 46 and 48 by transmitting communication packets over a serial communication interface. Control device 22 may function as the master system controller while control circuits 46 and 48 operate as slave devices. In certain embodiments, control device 22 may send a ping message to discover connected slave devices and their properties. For example, control circuits 46 and 48 may transmit an acknowledgement message in response to receiving a ping message from control device 22. Control circuits 46 and 48 also may transmit information, in response to requests from control device 22, identifying the type of unit and specific properties of the unit. For example, control circuit 46 may transmit a signal to control device 22 indicating that it controls a two-stage heat pump with auxiliary heat and a bonnet sensor. Control circuits 46 and 48 also may transmit signals identifying terminal connections and jumper settings of the control circuits.

Control device 22 may operate to control the overall heating and cooling provided by indoor and outdoor units 28 and 30. Indoor and outdoor units 28 and 30 include coils 66 and 32, respectively, that both operate as heat exchangers. The coils may function either as an evaporator or a condenser depending on the heat pump operation mode. For example, when heat pump system 42 is operating in cooling (or "AC") mode, outside coil 32 functions as a condenser, releasing heat to the outside air, while inside coil 66 functions as an evaporator, absorbing heat from the inside air. When heat pump system 42 is operating in heating mode, outside coil 32 functions as an evaporator, absorbing heat from the outside air, while inside coil 66 functions as a condenser, releasing heat to the inside air. A reversing valve may be positioned on closed loop 44 to control the direction of refrigerant flow and thereby to switch the heat pump between heating mode and cooling mode.

Heat pump system 42 also includes two metering devices 62 and 64 for decreasing the pressure and temperature of the refrigerant before it enters the evaporator. The metering devices also regulate the refrigerant flow entering the evaporator so that the amount of refrigerant entering the evaporator equals, or approximately equals, the amount of refrigerant exiting the evaporator. The metering device used depends on the heat pump operation mode. For example, when heat pump system 74 is operating in cooling mode, refrigerant bypasses metering device 62 and flows through metering device 64 before entering inside coil 66, which acts as an evaporator. In another example, when heat pump system 42 is operating in heating mode, refrigerant bypasses metering device 64 and flows through metering device 62 before entering outside coil 32, which acts as an evaporator.

According to other exemplary embodiments, a single metering device may be used for both heating mode and cooling mode. The metering devices typically are thermal or electronic expansion valves, but also may be orifices or capillary tubes.

The refrigerant enters the evaporator, which is outside coil 32 in heating mode and inside coil 66 in cooling mode, as a low temperature and pressure liquid. Some vapor refrigerant also may be present as a result of the expansion process that occurs in metering device 62 or 64. The refrigerant flows through tubes in the evaporator and absorbs heat from the air changing the refrigerant into a vapor. In cooling mode, the indoor air flowing across the multichannel tubes also may be dehumidified. The moisture from the air may condense on the outer surface of the multichannel tubes and consequently be removed from the air.

After exiting the evaporator, the refrigerant flows into compressor 56. Compressor 56 decreases the volume of the refrigerant vapor, thereby, increasing the temperature and pressure of the vapor. The compressor may be any suitable compressor such as a screw compressor, reciprocating compressor, rotary compressor, swing link compressor, scroll compressor, or turbine compressor.

From compressor 56, the increased temperature and pressure vapor refrigerant flows into a condenser, the location of which is determined by the heat pump mode. In cooling mode, the refrigerant flows into outside coil 32 (acting as a condenser). Fan 52, which is powered by motor 50, draws air across the tubes containing refrigerant vapor. According to certain exemplary embodiments, the fan may be replaced by a pump that draws fluid across the multichannel tubes. The heat from the refrigerant is transferred to the outside air causing the refrigerant to condense into a liquid. In heating mode, the refrigerant flows into inside coil 66 (acting as a condenser). Fan 60, which is powered by motor 58, draws air across the tubes containing refrigerant vapor. The heat from the refrigerant is transferred to the inside air causing the refrigerant to condense into a liquid.

After exiting the condenser, the refrigerant flows through the metering device (62 in heating mode and 64 in cooling mode) and returns to the evaporator (outside coil 32 in heating mode and inside coil 66 in cooling mode) where the process begins again.

In both heating and cooling modes, motor 54 drives compressor 56 and circulates refrigerant through reversible refrigeration/heating loop 44. The motor may receive power either directly from an AC or DC power source or from a variable speed drive (VSD). The motor may be a switched reluctance (SR) motor, an induction motor, an electronically commutated permanent magnet motor (ECM), or any other suitable motor type.

The operation of motor 54 is controlled by control circuit 46. Control circuit 46 may receive control signals from control device 22. In certain embodiments, control device may receive information from a sensor 68 that measures the ambient indoor air temperature. Control device 22 then compares the air temperature to the temperature set point (which may be input by a user) and engages compressor motor 54 and fan motors 50 and 58 to run the cooling system if the air temperature is above the temperature set point. In heating mode, control device 22 compares the air temperature from sensor 68 to the temperature set point and engages motors 50, 54, and 58 to run the heating system if the air temperature is below the temperature set point.

The control circuit 46 and control device 22 also may initiate a defrost cycle when the system is operating in heating mode. When the outdoor temperature approaches freezing, moisture in the outside air that is directed over outside coil 32 may condense and freeze on the coil. Sensors may be included within outdoor unit 30 to measure the outside air temperature and the temperature of outside coil 32. These sensors provide the temperature information to the control circuit 46 which determines when to initiate a defrost cycle.

Figure 4:
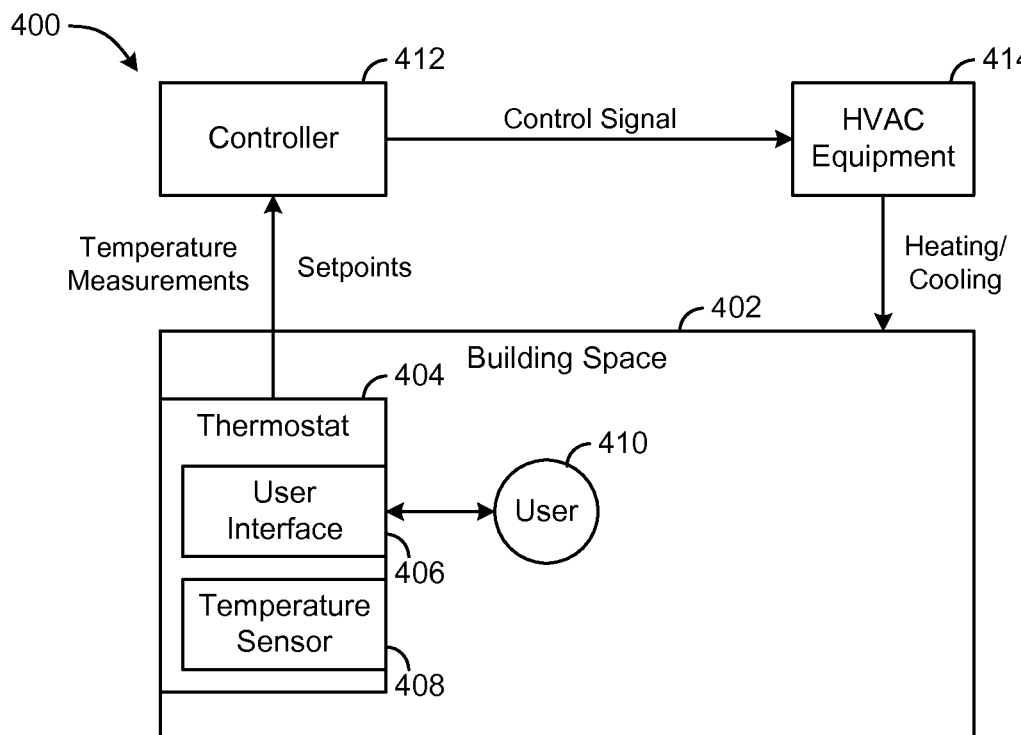
FIG. 4 is a block diagram of a prior art system for controlling the temperature of a building space using a wall-mounted thermostat, according to an exemplary embodiment.

Referring now to FIG. 4, a system 400 for monitoring and controlling the temperature of a building space is shown, according to an exemplary embodiment. System 400 is shown to include a thermostat 404 installed within a building space 402. Typically, thermostat 404 is mounted on a wall within building space 402. Thermostat 404 is shown to include user interface 406 and a temperature sensor 408. User interface 406 includes an electronic display for presenting information to a user 410 and one or more physical input devices (e.g., a rotary knob, pushbuttons, manually-operable switches, etc.) for receiving input from a user 410. Temperature sensor 408 measures the temperature of building space 402 and provides the measured temperature to user interface 406.

Thermostat 404 communicates with a controller 412. In various embodiments, controller 512 may be integrated with thermostat 404 or may exist as a separate controller (e.g., a field and equipment controller, a supervisory controller, etc.) that receives input from thermostat 404. Thermostat 404 may send temperature measurements and user-defined temperature setpoints to controller 412. Controller 412 uses the temperature measurements and the setpoints to generate a control signal for HVAC equipment 414. The control signal causes HVAC equipment 414 to provide heating and/or cooling for building space 402.

Figure 5:
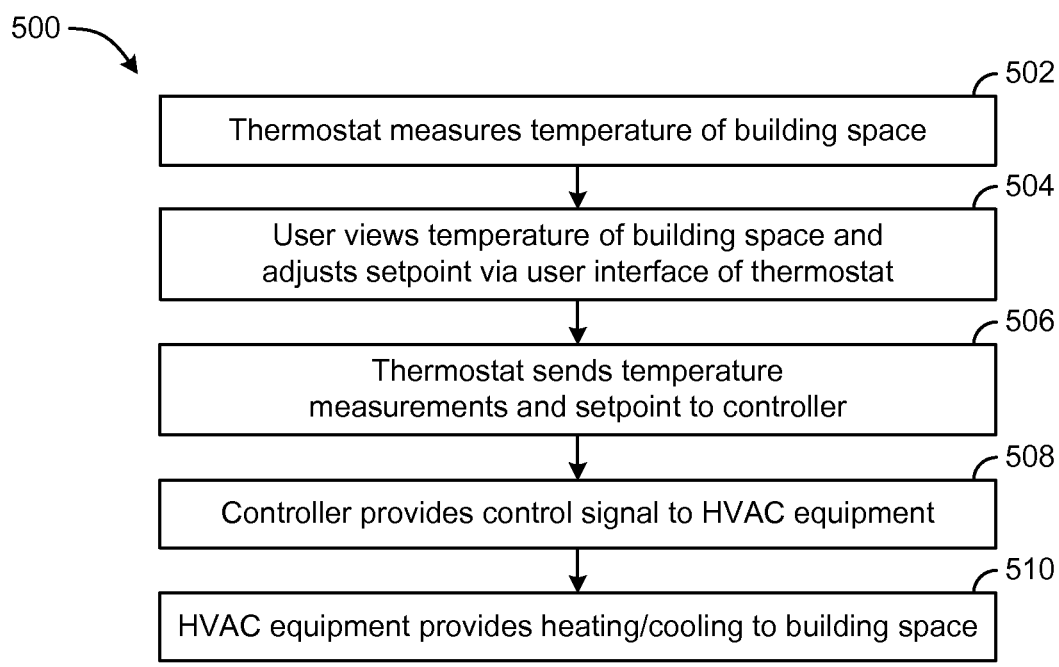
FIG. 5 is a flowchart of a prior art process for controlling the temperature of a building space using a wall-mounted thermostat, according to an exemplary embodiment.

Referring now to FIG. 5, a process 500 for monitoring and controlling the temperature of a building space is shown, according to an exemplary embodiment. Process 500 may be performed by system 400, as described with reference to FIG. 4. In process 500, thermostat 404 measures the temperature of building space 402 (step 502). User 410 views the measured temperature and adjusts the temperature setpoint via user interface 406 of thermostat 404 (step 504). Thermostat 404 sends the measured temperature and the setpoint to controller 412 (step 506). Controller 412 uses the measured temperature and the setpoint to generate and provide a control signal to HVAC equipment 414 (step 508). HVAC equipment 414 operates in accordance with the control signal to provide heating/cooling to building space 402 (step 510).

Occupancy Based Control and Operation

Figure 6:
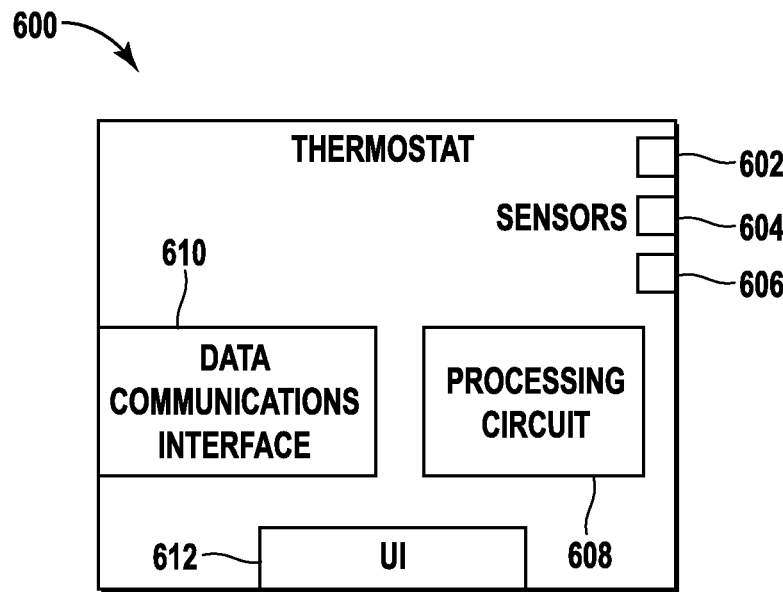
FIG. 6 is a block diagram of a thermostat with which a user may control the temperature of a building space according to an exemplary embodiment.

In FIG. 6, a block diagram of thermostat 600 is shown to include sensors 602, 604, and 606, processing circuit 608, data communications interface 610, and user interface 612. In some embodiments, sensors 602-606 are used to detect occupancy (i.e., occupancy sensors). It is contemplated that sensors 602-606 could be, in some embodiments, motion sensors, cameras, microphones, capacitive sensors, or any number of other sensors. Sensors 602-606 could be any number of sensors. Sensors 602-606 could be cameras which detect heat signatures in some embodiments. Sensors 602-606 may detect separate objects and distinguish between humans and other objects. Sensors 602-606 could be any transducers which detect some characteristic of their respective environment and surroundings.

Still referring to FIG. 6, thermostat 600 is capable of bi-directional communication with equipment through data communications interface 610. In some embodiments, the data communications interface includes a network communications module. Thermostat 600 may communicate to a network or the Internet through the data communications interface 610. In some embodiments, the networks include at least one of a wireless Zigbee network, a Bluetooth connection, Ethernet, Wi-Fi, and any other such network. In some embodiments, the data communications interface 610 includes a near field communication module configured to interact with near field communication enabled devices. In some embodiments, the near field communication module is configured to exchange information adhoc, in a peer-to-peer connection. In some embodiments, thermostat 600 may be able to communicate with a variety of devices through a network. For example, thermostat 600 may be able to communicate with other network enabled appliances and systems in a user's home such as a security system or a refrigerator or light system. In other embodiments, thermostat 600 may be able to communicate directly with devices.

Figure 7:
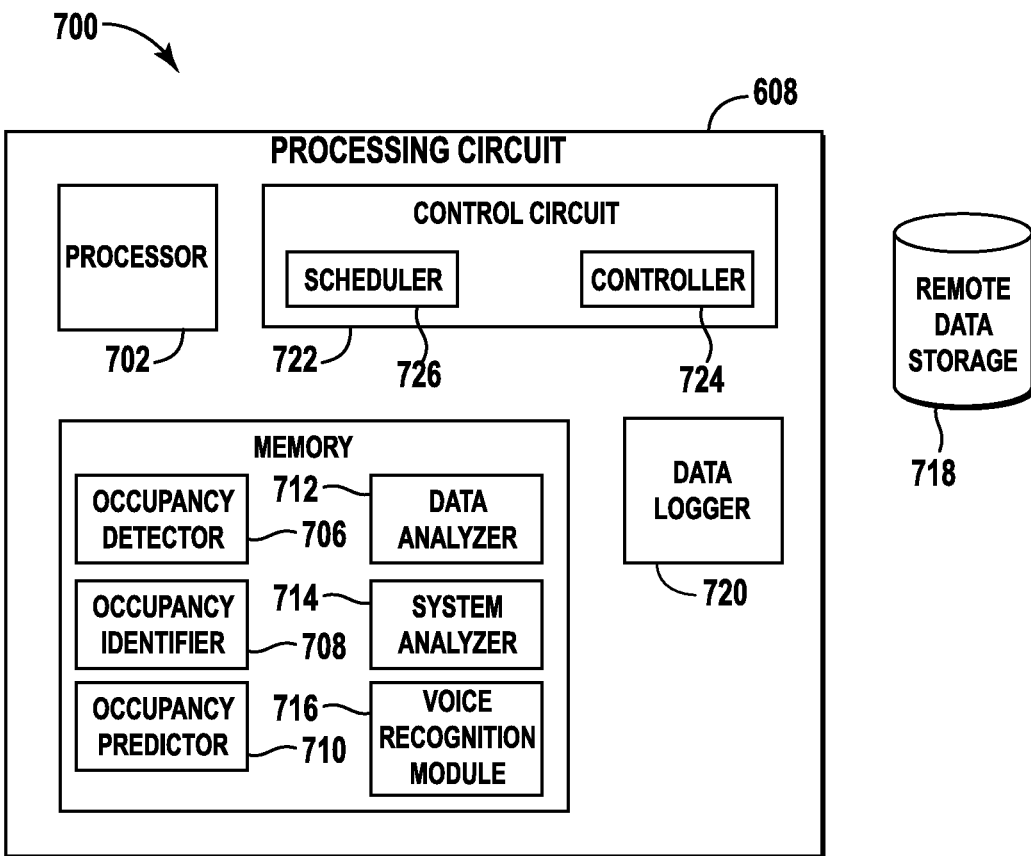
FIG. 7 is a system block diagram of a processing circuit of a thermostat and a remote data storage location according to an exemplary embodiment.

Now referring to FIG. 7, processing circuit 608 is shown to include a processor 702 and memory 704. Processor 702 may be a general purpose or specific purpose processor, an application specific integrated circuit (ASIC), one or more field programmable gate arrays (FPGAs), a group of processing components, or other suitable processing components. Processor 702 is configured to execute computer code or instructions stored in memory 704 or received from other computer readable media (e.g., CDROM, network storage, a remote server, etc.).

Memory 704 may include one or more devices (e.g., memory units, memory devices, storage devices, etc.) for storing data and/or computer code for completing and/or facilitating the various processes described in the present disclosure. Memory 704 may include random access memory (RAM), read-only memory (ROM), hard drive storage, temporary storage, non-volatile memory, flash memory, optical memory, or any other suitable memory for storing software objects and/or computer instructions. Memory 704 may include database components, object code components, script components, or any other type of information structure for supporting the various activities and information structures described in the present disclosure. Memory 704 may be communicably connected to processor 702 via processing circuit 134 and may include computer code for executing (e.g., by processor 702) one or more processes described herein. When processor 702 executes instructions stored in memory 704 for completing the various activities described herein, processor 702 generally configures thermostat 600 (and more particularly processing circuit 134) to complete such activities.

Memory 704 is shown to include occupancy detector 706, occupancy identifier 708, occupancy predictor 710, data analyzer 712, system analyzer 714, and voice recognition module 716. Occupancy detector 706 processes data received from sensors 602-606 to determine whether occupancy has been detected. Occupancy identifier 708 processes occupancy data collected to determine which user or users are home. Occupancy predictor 710 processes calendar and scheduling data to determine when a user or users will be home, which user or users will be home, and the appropriate course of action when overlap and conflicting preferences occur.

Processing circuit 608 is shown to include a control circuit 722 which includes a controller 724, and a scheduler 726. Controller 724 may be an embodiment of controller 512, and is able to communicate with and send commands to connected equipment. Scheduler 726 is a module which is configured to receive calendar and schedule data to organize and send commands to connected equipment.

Processing circuit 608 is also shown to include a data logger 720. System 700 is shown to include remote data storage 718. In some embodiments, remote data storage 718 is at least one of RAM, ROM, EPROM, EEPROM, CD-ROM or other optical disk storage, hard drive, magnetic disk storage or other magnetic storage devices, or any other medium which can be used to store data. Data logger 720 may record data in memory 704 and the remote data storage 718. In some embodiments, processing circuit 608 may store data in remote data storage 718. In some embodiments, remote data storage 178 is located inside processing circuit 608. In some embodiments, remote data storage 718 is outside processing circuit 608 but is located inside thermostat 600. While storing data locally may reduce access time, the cost of providing suitable storage space may discourage user adoption. Remote data storage 718 is remote from processing circuit 608 and may be accessed through any number of communications protocols.

Figure 8:
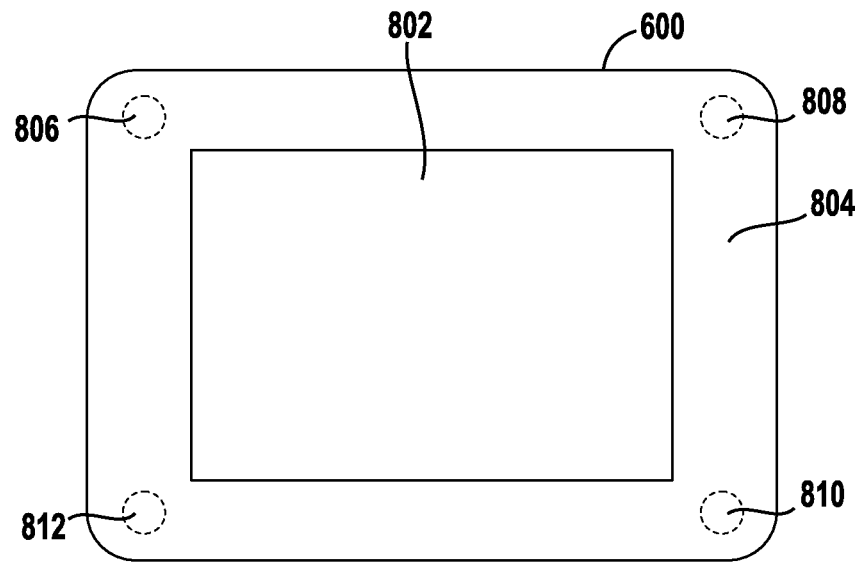
FIG. 8 is a drawing of a thermostat and its user interface elements according to an exemplary embodiment.

Referring now to FIG. 8, thermostat 600 is shown to have a display 802 and a frame 804. In some embodiments, display 802 is touch-sensitive, and may be a capacitive LCD screen. In some embodiments, frame 804 is touch-sensitive. In some embodiments, a capacitive layer may extend from display 802 out over frame 804. Thermostat may be configured to have buttons 806-812 on frame 804. Buttons 806-812 on frame 804 are touch sensitive buttons. Buttons 806-812 are not physical buttons, and cannot be seen. Buttons 806-812 are predefined areas of the capacitive layer which extends over frame 804. In some embodiments, buttons 806-812 are associated with large areas of frame 804 and are not finely sensitive. In some embodiments, buttons 806-812 are configured to receive touch-based input. Buttons 806-812 may use any amount of the available size of frame 804 and may be configured in any shape. In some embodiments, the shapes may be circular, square, rectangular and any other shape that can be used as a button. In some embodiments, the button shapes and sizes are selected for a direct touch from the user. In some embodiments, the button shapes and sizes are selected for registering a swipe on frame 804. In some embodiments, buttons 806-812 are configured to register a direct touch. In some embodiments, buttons 806-812 are configured to register a swipe.

Figure 9:
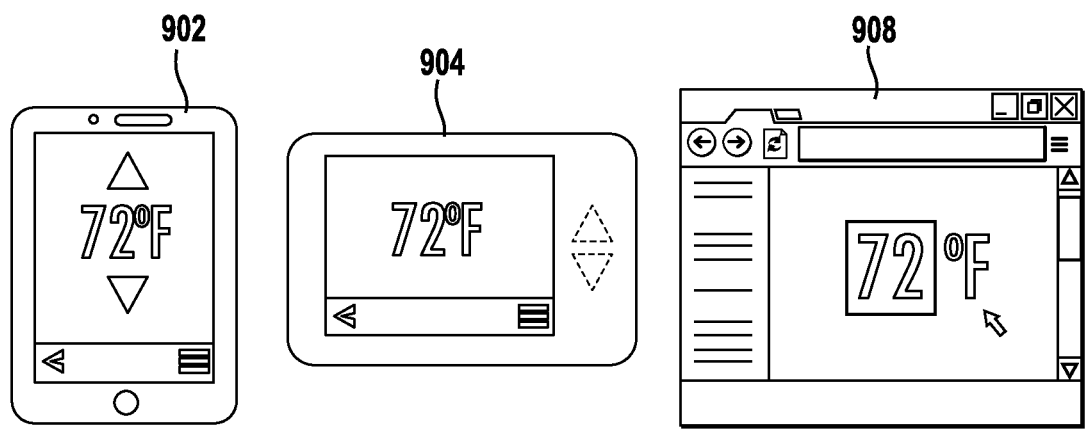
FIG. 9 is a drawing of the various user interfaces through which a user may control a thermostat according to an exemplary embodiment.

Referring now to FIG. 9, exemplary user interfaces 902, 904, and 908 are shown. User interfaces 902-908 are used to interact with and control thermostat 600. User interface 902 is an exemplary embodiment of a mobile application user interface which can be used on personal electronic devices such as smartphones or tablets. User interface 904 is an exemplary embodiment of user interface 612, and is physically integrated with thermostat 600. User interface 908 is an exemplary embodiment of a web-based application user interface which can be accessed through any device connected to the Internet. In some embodiments, a network-based application may be used instead of a web-based application, and may allow users to control thermostat 600 through any device which is connected to a local area network (LAN), regardless of Internet connectivity. It is understood that the embodiments described and shown in FIG. 9 are only a few of many different possibilities. In some embodiments, it is possible for a user to queue commands through user interfaces 902-908 to send to thermostat 600. In some embodiments, any combination of the above mentioned methods may be available options to control thermostat 600.

Figure 10A:
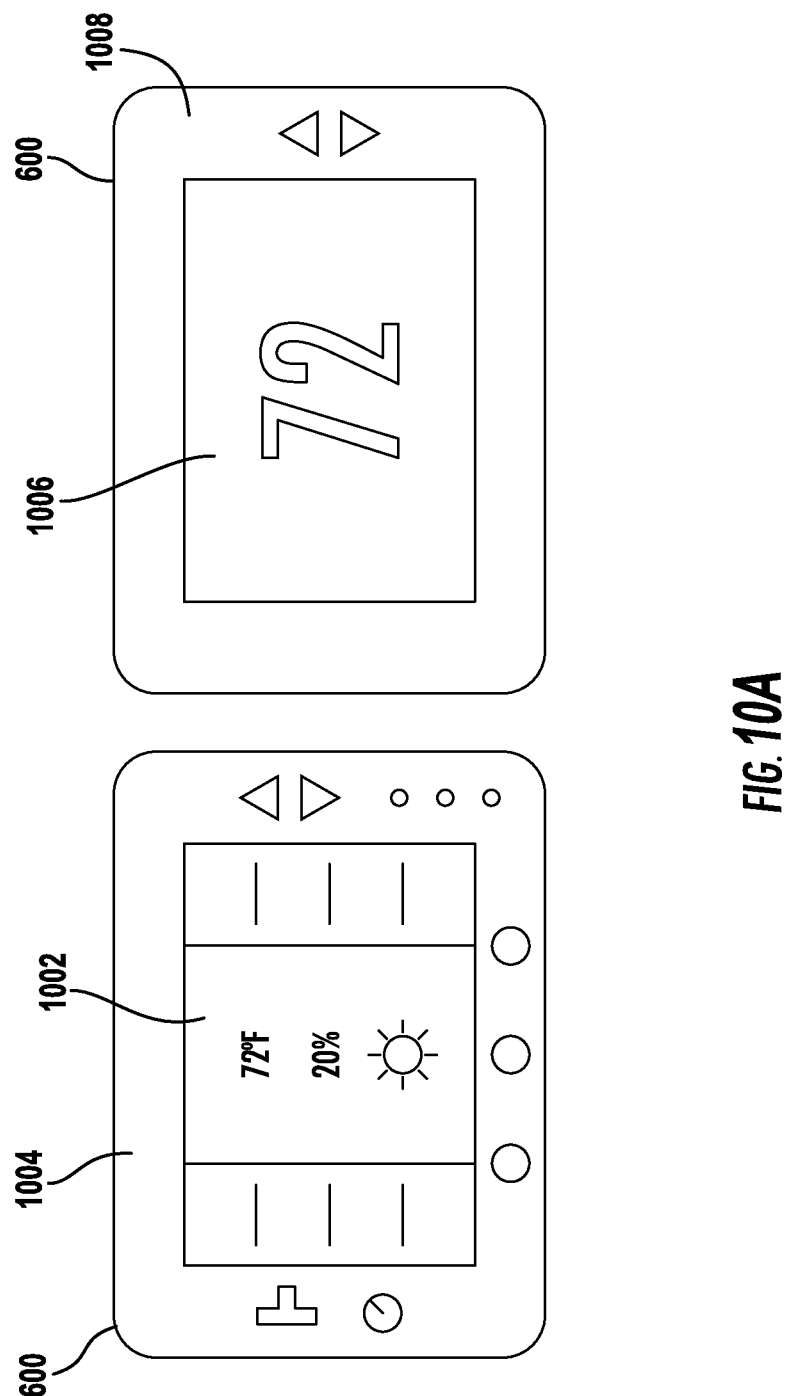
FIG. 10A is a drawing of various skins and configurations of the user interface of a thermostat according to an exemplary embodiment.

Referring now to FIG. 10A, different skins 1002, 1004, 1006, and 1008 are shown. Skins may change the look, feel, and functionality of thermostat 600. Skins may be used to tailor functionality and complexity of operation to a user's preference and comfort level. Skins may be software configurations which dictate the appearance of user interface 612 of thermostat 600. Skins 1002 and 1006 are exemplary embodiments of software configuration skins. Skin 1002 is an exemplary embodiment of a skin created for a user who wishes to be able to access and use all features of their thermostat 600. Skin 1006 is an exemplary embodiment of a skin created for a user who only wishes to control the temperature of their home, and does not wish to see any other options or controls.

Skins can be stickers which are applied to the outside of thermostat 600 to frame 804. It is understood that physical skins may be in the form of any physical applique and is not limited to stickers. The buttons shown on skins 1004 and 1008 are visible only on the physical skins, and are not visible or physical buttons on frame 804. In some embodiments, a wirelessly communicating tag, attached to the physical skin, interacts with thermostat 600 to configure the functionality of thermostat 600. For example, an RFID tag is attached to a skin sticker which dictates portions of frame 804 which correspond to buttons on the sticker.

Figure 10B:
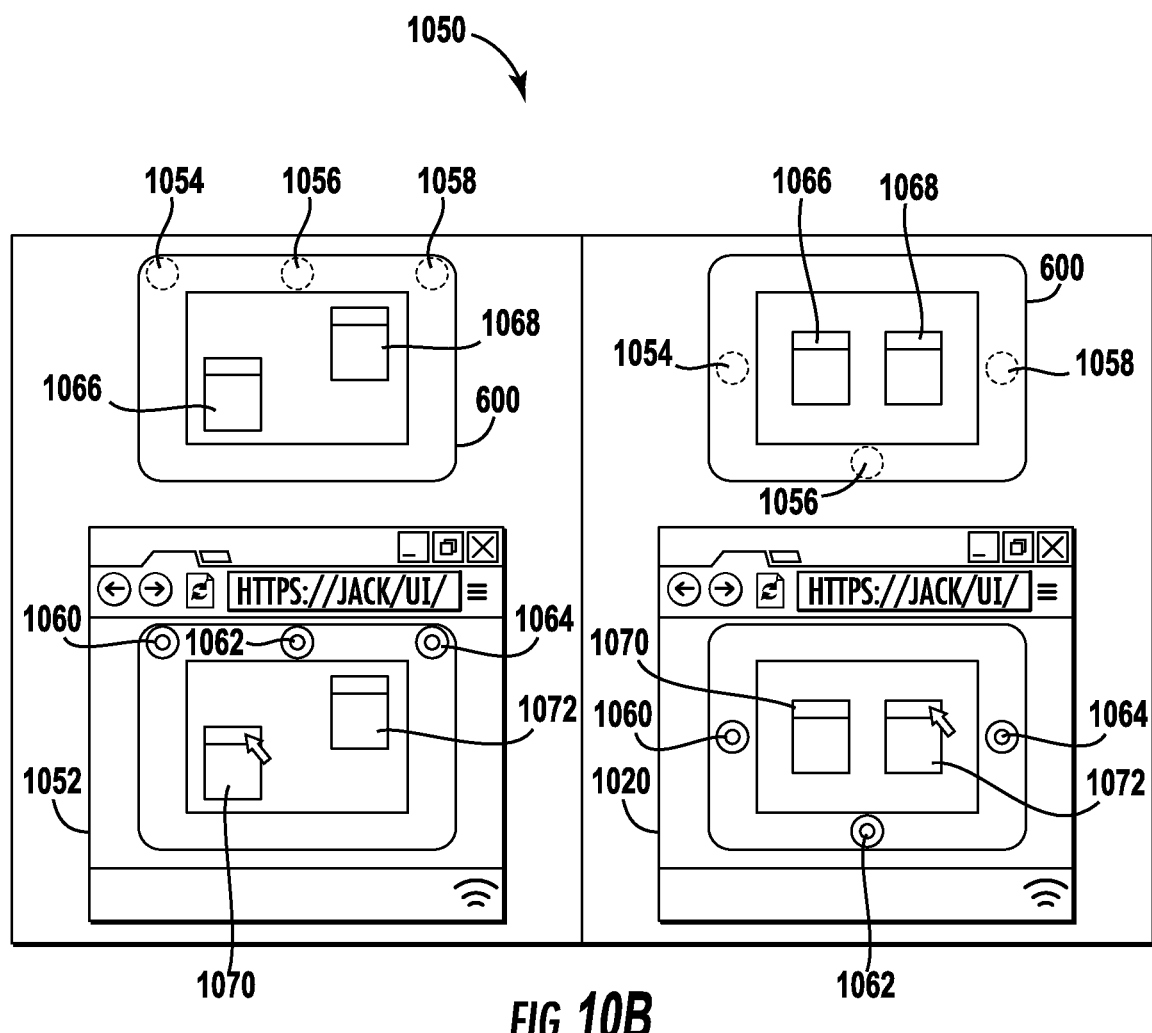
FIG. 10B is a drawing of a process in which user interface elements of a thermostat may be relocated or redefined according to an exemplary embodiment.

Referring now to FIG. 10B, a process 1050 through which a skin may be customized is shown. Users may be able to download an application or use a web-based application, embodied in FIG. 10B as 1052, to customize skins to their preferred settings. Users may be able to change the placement and priority of certain features of user interface 612 of thermostat 600. Users may be able to move icons, screens, or buttons on display 802. It is shown that the movement of button icons 1060, 1062, and 1062 in web-based application 1052 correspond to movement of touch-sensitive buttons 1054, 1056, and 1058 on thermostat 600. The movement of screens 1070 and 1072 in web-based application 1052 is shown to correspond to movement of screens 1066 and 1068 on thermostat 600. Changes which could be made to user interface 612 of thermostat 600 include backgrounds, icons, macros, scenes, etc. In some embodiments, skins may change the sound settings of thermostat 600. It is conceivable that any setting on thermostat 600 may be adjusted by a user through the use of skins. There could be any number of skins, which may be user customizable.

In some embodiments, users may be able to design their own physical skin and print it out at a location with a suitable fabrication center. In another embodiment, users may need to send their designs to the manufacturer or a dealer to fabricate. In some embodiments, any combination of the above mentioned methods of customization may be available to users.

Determining the occupancy of a home allows thermostat 600 to make energy efficient operating decisions by reducing conditioning and power consumption when a home is unoccupied. User comfort may be increased when thermostat 600 is able to anticipate occupancy and condition the home to user preferences by the time the home is occupied. Occupancy based operation and control of an HVAC system allows users to conserve energy and arrive home to a comfortable environment without requiring a large amount of effort on the part of the user.

Figure 11A:
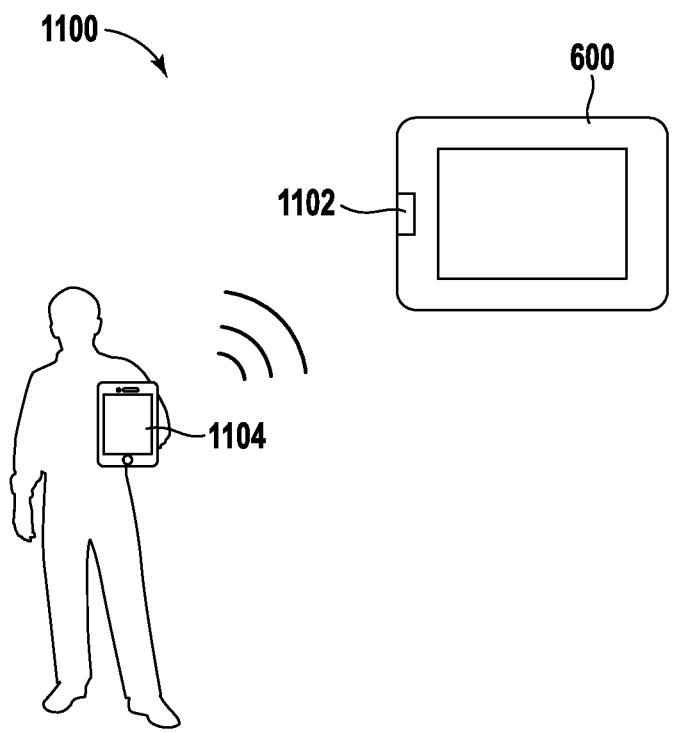
FIG. 11A is a drawing of a process in which a thermostat detects occupancy according to an exemplary embodiment.

Referring now to FIG. 11A, an exemplary situation 1100 in which thermostat 600 detects occupancy of a home is shown. Thermostat 600 may detect occupancy through sensor 1102, which may be an embodiment of sensors 602-606. In some embodiments, thermostat 600 may detect occupancy through communication with external object 1104. Object 1104 may be any device. In some embodiments, object 1104 is an electronic device capable of communicating with thermostat 600. In various embodiments, object 1104 may be a user's cellphone, laptop, tablet, or any portable electronic device. In some embodiments, object 1104 is a dongle which may be compatible with thermostat 600 or any other objects which may communicate with thermostat 600. In some embodiments, object 1104 is a wearable object such as a necklace, a watch, or a fitness tracker. Object 1104 may be a business card or an RFID card. Thermostat 600 may detect the time at which occupancy is detected. In some embodiments, thermostat 600 time-stamps logged data to be used in later analysis.

Figure 11B:
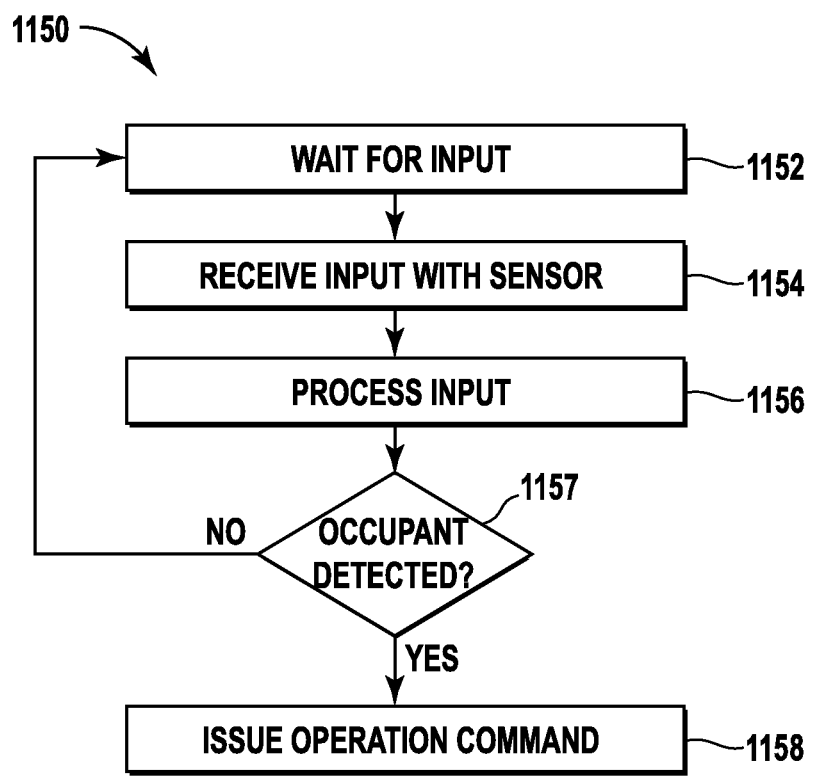
FIG. 11B is a flowchart of the process shown in FIG. 11A according to an exemplary embodiment.

FIG. 11B describes an exemplary process 1150 in which thermostat 600 may detect occupancy and alter operations of a connected system. Thermostat 600 waits for an input to be received at sensor 1102 (step 1152). In step 1154, an input is received. The input may be a noise, a movement, a heat signature, or a communication signal. Once the input is received, it must be processed by occupancy detector 706 of memory 704 in step 1156. In step 1157, a determination is made whether occupancy has been detected. If occupancy has been detected, an operation command is issued from thermostat 600 to the connected system (step 1158). If occupancy has not been detected, the process repeats, and thermostat 600 waits for an input to be received in step 1152. In some embodiments, thermostat 600 may receive a communication signal from object 1104, which may be through NFC, WiFi, Bluetooth, or any other communication protocol.

Figure 12A:
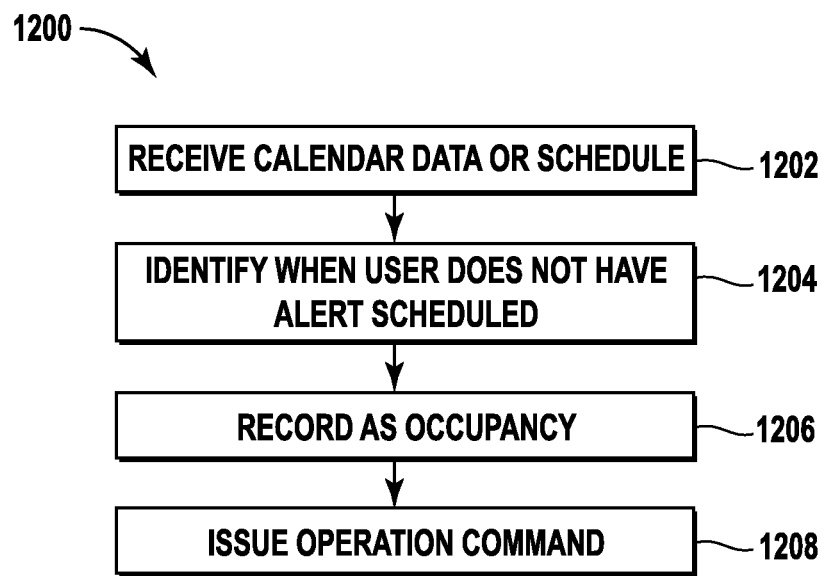
FIG. 12A is a flowchart of a process in which a thermostat uses schedule data to determine occupancy according to an exemplary embodiment.

Referring now to FIG. 12A, thermostat 600 may determine occupancy based on a schedule or calendar. In some embodiments, a user is able to input a schedule directly to the thermostat. In other embodiments, thermostat 600 may support integration with existing calendar applications. In step 1202, occupancy predictor 710 of memory 704 receives calendar data or a schedule from a user. Occupancy predictor 710 then determines when the user does not have any events scheduled in step 1204. In some embodiments, thermostat 600 may allow a user to input a schedule of times when she expects to be home. The periods of time identified in step 1204 are then stored as predicted periods of occupancy (step 1206). In some embodiments, thermostat 600 may store the predicted occupancy periods in remote data storage 718. In other embodiments, thermostat 600 may store the predicted occupancy periods locally in memory 704. In step 1208, operation commands are issued from thermostat 600 to the connected system based on the occupancy periods stored and the associated user's preferences.

Figure 12B:
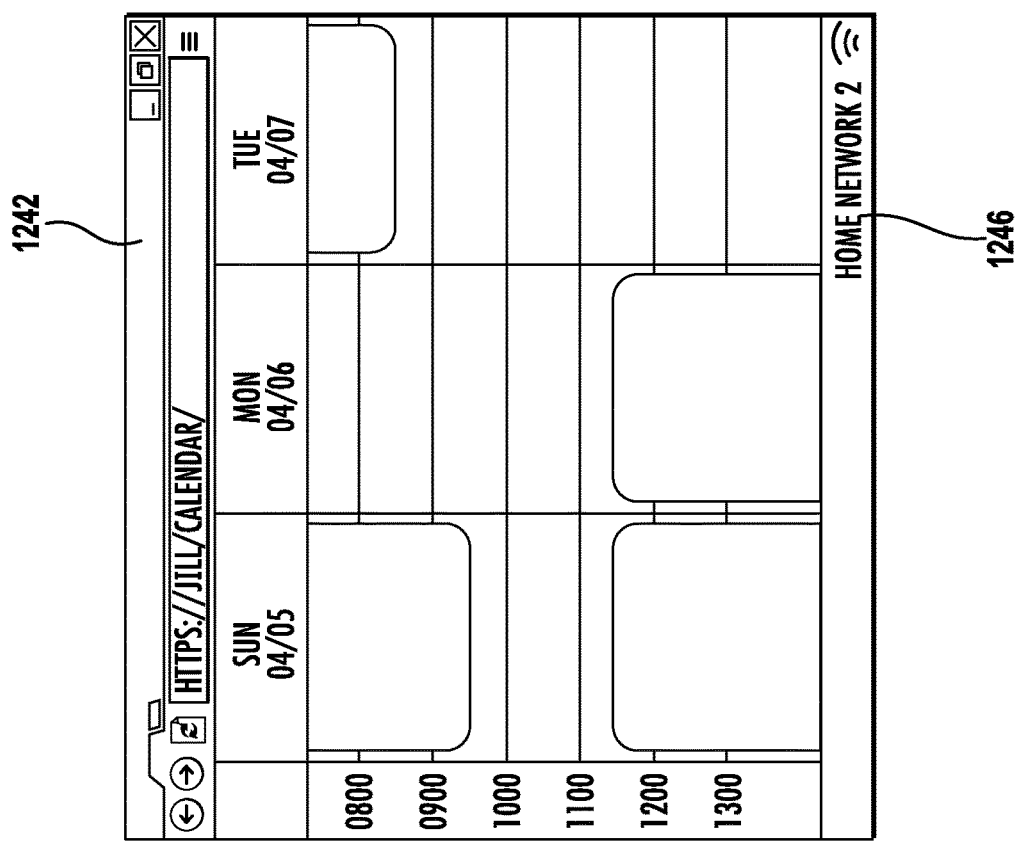
FIG. 12B is a drawing of various applications and their user interfaces through which a thermostat may obtain schedule data and determine occupancy according to an exemplary embodiment.
Figure 12B:
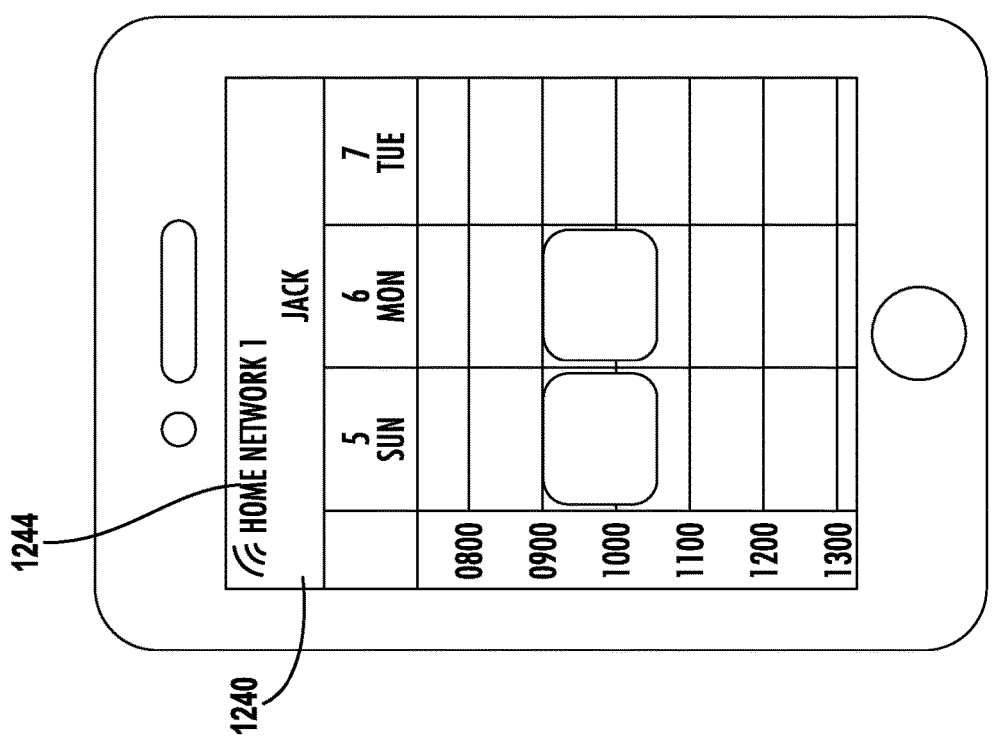

In FIG. 12B, an exemplary embodiment of methods with which users may input calendar data is shown. Existing calendar application 1240 accessed on a mobile device with user Jack's schedule is shown. Existing calendar application 1242 accessed via a browser with user Jill's schedule is shown. In some embodiments, thermostat 600 may communicate with Jack or Jill's Google, iOS, or Outlook calendar and determine when he or she will be home based upon the appointment and event information obtained. Thermostat 600 may decide that a user will be home whenever he does not have an appointment scheduled. In some embodiments, thermostat 600 may be programmed to assume that a user will not be home on weekdays during the work day, in addition to appointments and engagements outside of those hours. Thermostat 600 may be able to determine when a user will be home based upon location information associated with events in his calendar. In some embodiments, thermostat 600 may be able to detect the network connectivity of a user's personal device—whether it is connected—to determine occupancy. In some embodiments, thermostat 600 may be able to detect the network connectivity of a user's personal device to determine what area of the home the user is in. Thermostat 600 may be able to control conditioning to different areas, or zones, of a home depending on the duct and flow work. The network 1244, to which Jack is connected, may be identified and used to determine that he is in zone 1 of the home. The network 1246, to which Jill is connected, may be identified and used to determine that she is in zone 2 of the home.

In a multiple occupancy home, thermostat 600 may be able to make operating decisions based on occupancy. Thermostat 600 may be able to operate on different schedules for different detected users. In one embodiment, users may each enter their own schedule to thermostat 600 directly. In other embodiments, thermostat 600 may be able to communicate with external calendars and applications to determine a user's schedule. Thermostat 600 may be able to detect which user is home and adjust the operating schedule to accommodate that user's preferences. For example, in a home with multiple occupants and different schedules to keep to, thermostat may detect which user is home, and make operating decisions based on that user's settings and schedule. It is possible that thermostat 600 may have a different setting for guests or periodic visitors such as a housekeeper or a nanny. For example, thermostat 600 may operate at lower capacity when only the housekeeper is in the home, as opposed to when the entire family residing in the home is present.

Figure 12C:
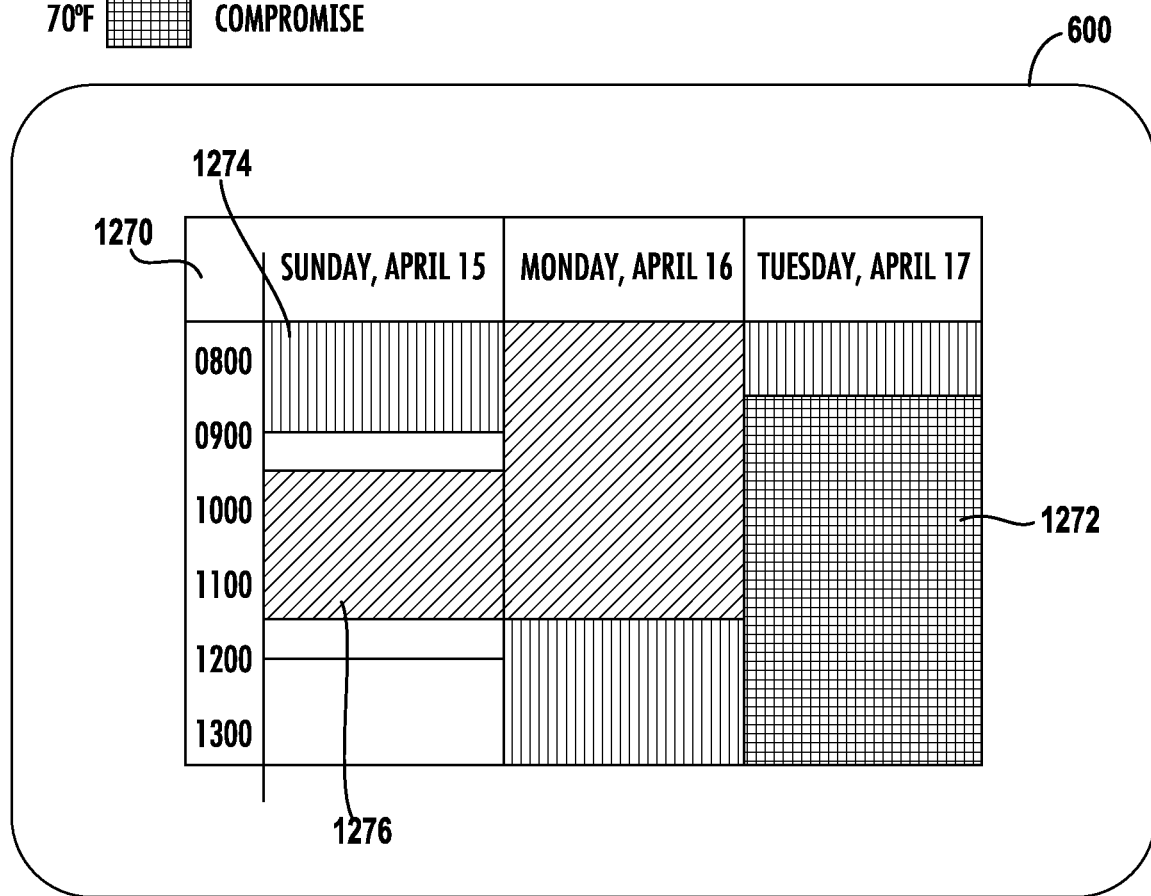
FIG. 12C is a drawing of a scheduling screen of a thermostat, through which the process of handling multiple occupancy homes is shown according to an exemplary embodiment.

In a multiple occupancy home, it is common for users to have different schedules. Referring now to FIG. 12C, thermostat 600 is shown making operating decisions based on the intersection of schedules of the occupants. Thermostat 600 may use calendar information to determine how many users are home and adjust operation accordingly. Thermostat 600 may make decisions on operating procedure when more than one user is home. In one embodiment, thermostat 600 may compromise when users with different preferences are home. The process described in FIG. 12A may be adapted for situations in which conflicting preferences exist for multiple occupancy homes. Thermostat 600 may receive the schedule of two occupants of the home. Thermostat 600 compares the calendars detect occupancy based on when either occupant does not have an event scheduled. Thermostat 600 could create a merged calendar of the free times of the users. If only one user is home, his settings are applied, as shown in thermostat 600 schedule block 1274. Thermostat 600 determines an overlap in occupancy has been detected. For example, if one user prefers the home to be at 72° F. while another user prefers the home to be at 68° F., and both users are home, thermostat 600 may compromise and set the temperature to 70° F. as shown in thermostat 600 schedule block 1272. In another embodiment, there may be a master user whose settings will override other users' settings. For example, one user prefers the home to be at 72° F. while another user prefers the home to be at 68° F.; however, the first user is the master user, so her settings are conveyed to the equipment as shown in thermostat 600 schedule block 1276. In another embodiment, if a user is already at home but the master user is detected afterward, her settings may be applied automatically upon her detection. In yet another embodiment, thermostat 600 may keep an existing user's preferences until the master user commands an update.

Figure 13:
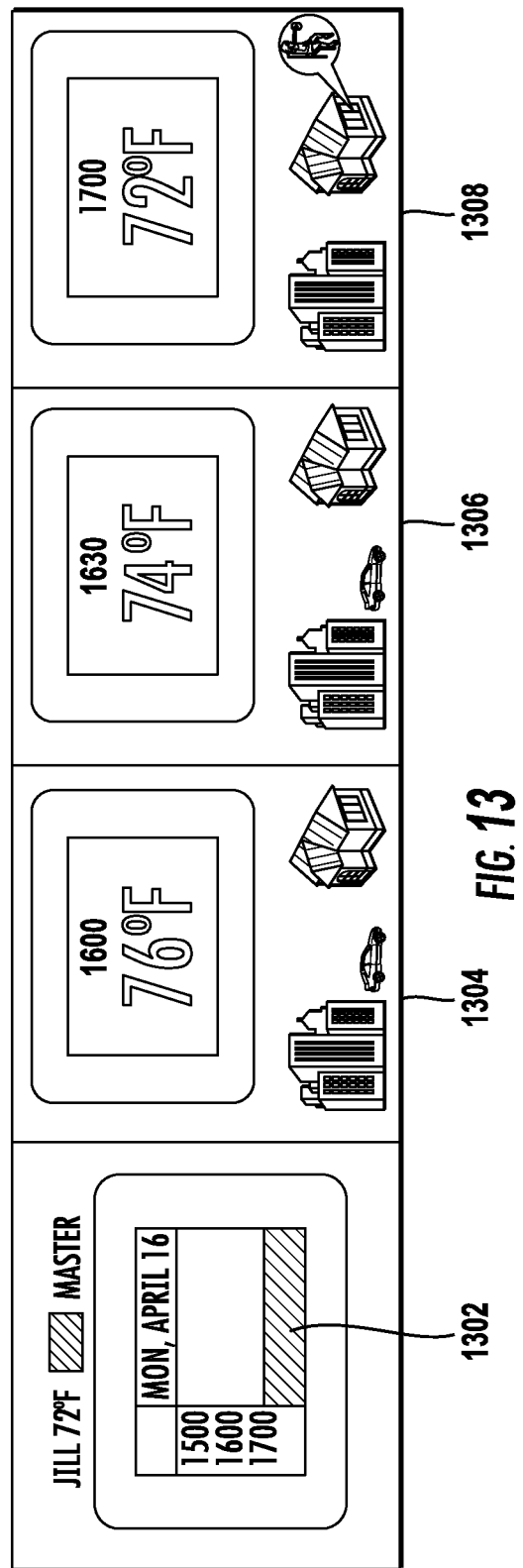
FIG. 13 is a drawing of a process in which a thermostat system adjusts the temperature of a home to a user's preferences prior to her arrival at home according to an exemplary embodiment.

Referring now to FIG. 13, thermostat 600 may be able to determine the operating conditions needed to reach a user's desired settings by the time they arrive. In one embodiment, thermostat 600 allows a user to program directly into thermostat 600 when she expects to be home and what settings she would like it to be. In another embodiment, thermostat 600 may access a user's external calendar and determine when she will be home as shown in thermostat 600 schedule block 1302. For example, if Jill is scheduled to be home at 1700 and would like her home to be at 72° F. when she arrives, thermostat 600 may begin to cool her home from a starting point of 76° F. at 1600, as shown in situational snapshot 1304. By 1630, as Jill is travelling, thermostat 600 has already cooled her home to 74° F. as shown in situational snapshot 1306. When Jill arrives home at 1700, her home is already at 72° F., as shown in situational snapshot 1308. In another embodiment, thermostat 600 may be able to receive communication from a user while they are away to set their home at a certain temperature, which thermostat 600 may immediately command.

Thermostat 600 may be able to determine what kind of activities are occurring in the home and change operation based on occupancy level. In some embodiments, thermostat 600 is able to detect separate occupants of the home. In other embodiments, thermostat 600 determines occupancy level based on communication with connected equipment. For example, thermostat 600 may be able to estimate occupancy based on assumed load seen by the AC unit. In another embodiment, thermostat 600 may obtain activity information from a fitness tracker to determine the amount of activity related to a specific user. In yet another embodiment, thermostat 600 may use sensor 1102 to detect the amount of movement or activity occurring. For example, thermostat 600 may determine that a user is currently occupying a room, but that there is a low level of activity. Thermostat 600 may determine that the user is sleeping, and adjust conditioning accordingly. Thermostat 600 may determine that many people are in one room, and that there is a high level of activity, and increase conditioning accordingly.

Figure 14:
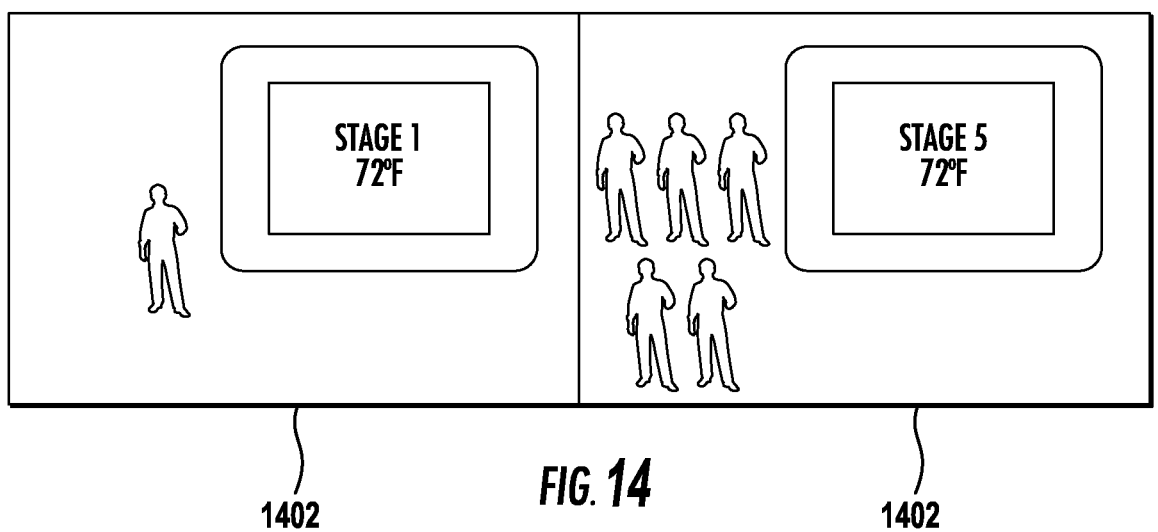
FIG. 14 is a drawing of a process in which a thermostat system adjusts compressor staging using occupancy according to an exemplary embodiment.

Referring now to FIG. 14, thermostat 600 may adjust compressor staging in a connected AC unit based on occupancy. In one embodiment, thermostat 600 may detect a change in occupancy and adjust compressor staging accordingly. For example, thermostat 600 may detect that more motion is occurring, and increase staging to maintain temperature. In another embodiment, thermostat 600 may analyze the occupancy and activity level of the home and determine an appropriate staging progression. For example, there may currently be one person detected by thermostat 600, as shown in snapshot 1402. The compressor is currently operating in stage 1, as there is low occupancy. In snapshot 1404, thermostat 600 may detect from the home network that there are five people in the home, and command the compressor, currently at stage 1, to go through stages 2, 3, and 4 to stage 5. Thermostat 600 may then detect that there are ten people in the home, and command the compressor, currently at stage 1, to go directly to stage 5.

Thermostat 600 may be able to determine with some granularity where in the home a user is. In some embodiments, thermostat 600 communicates with a user's personal device 1104 and obtains GPS data to determine whether a user is home, and if so, where he is. In some embodiments, thermostat 600 uses a geofencing to determine what zone or room of the home a user is in and adjusts operation accordingly. Geofencing allows a boundary to be defined based on locational information. Thermostat 600 may adjust operation based on detected occupancy and location. For example, if a user is detected on the upper floor of a home, thermostat 600 may increase conditioning on the upper floor. Thermostat 600 could detect that there are no occupants on the lower floor and decrease conditioning to the lower floor.

Thermostat 600 may allow users to set their occupancy status through an application or as an input to thermostat 600. In some embodiments, a user may input their occupancy status through an object 1104 such as a cellphone. For example, Jill may set her status as "away." In some embodiments, different users may have different settings, and thermostat 600 may determine the level of occupancy from the status information received. In some embodiments, thermostat 600 is able to automatically update a user's status based on the connectivity of an object 1104 which, in some embodiments, is a cellphone.

In some embodiments, thermostat 600 may send push notifications to a user's cellphone 1104 depending on their detected location. For example, if Jill is detected to have left her home, thermostat 600 may display a prompt asking if she would like to set her status as "away." In some embodiments, when a user is away, the system associated with thermostat 600 goes into an energy efficient state which may not be comfortable to occupants remaining in the home. Thermostat 600 may allow a master user to override all commands given to thermostat 600 from other users. In some embodiments, if a master user is away, the system will go into an energy efficient state despite the occupancy of the home by other users. Thermostat 600 may display a warning to the master user that another user is still home, and ask whether she would still like to set her status as "away." For example, if Jill is the master user and is detected leaving her home, thermostat 600 may ask whether she would like to set her status to "away." If she chooses "Yes", thermostat 600 may warn her that Jack is still home, and that the system will go into an energy efficient state despite his occupancy. Thermostat 600 may ask whether a user is sure she wishes to change her status. If a user selects "Yes", the system will execute whatever command is associated with no occupancy.

Thermostat 600 may detect a user's location based on a zone sensor which may communicate through any communications protocol. For example, the zone sensor may use Bluetooth, NFC, WiFi, or any other communications protocol. In some embodiments, thermostat 600 may indicate the success or failure of detection of a user through the playing of a sound. In some embodiments, the sound may be unique for success or for failure. In some embodiments, an accompanying indicator may be displayed. For example, a message may be displayed, warning the user that they were not authenticated. The indicator may be as simple as a flashing LED.

Thermostat 600 may be adjust its communication behavior based on detected occupancy. In one embodiment, thermostat 600 may determine that a user is in the kitchen while thermostat 600 is in the living room. Thermostat 600 may attempt to communicate any changes in operation to the user through a speaker in the kitchen, or through the user's portable electronic device since the user cannot see the screen of thermostat 600.

Thermostat 600 may be able to learn from user behavior, and store data to adapt operation and better serve users. In one embodiment, thermostat 600 may analyze the location data obtained and determine the location in which a user spends a majority of his time in. Thermostat 600 may set that location as a priority to condition over all locations in the home. In another embodiment, thermostat 600 may allow users to set their preferred priority space.

Thermostat 600 may be able to learn from outside sources how to adjust operation. In some embodiments, thermostat 600 stores the date and time at which occupancy is being detected. Thermostat 600 may determine, based on the season, what an appropriate conditioning command might be. Thermostat 600 may be able to learn what an appropriate adjustment to standard operating conditions might be based on historical data collected from the home.

Thermostat 600 may make adjustments to standard operating condition based on the frequency at which occupancy is detected. A user is detected at one time. Some amount of time later, the user is detected again. Thermostat 600 will make an operating decision based on the time in between detections. In one embodiment, sensors 602-606 are one motion sensor and thermostat 600 detects occupancy purely on motion. For example, a pet cat may walk past the sensor several times a minute, causing thermostat 600 to detect "high occupancy." However, thermostat 600 may have a threshold frequency past which it decides that it should not be considering each detection as a separate event. In another embodiment, thermostat 600 may detect a user's device connecting to the home network at a high frequency, possibly due to faulty components. Thermostat 600 may decide that the high level of activity is not genuine, and cancel adjustments accordingly.

Thermostat 600 may receive identifying information when detecting occupancy. In one embodiment, thermostat 600 may use sensors 602-606, in one embodiment, a plurality of cameras, to detect and identify separate users. In another embodiment, thermostat 600 may receive user information from the user's portable electronic device. In yet another embodiment, thermostat 600 may communicate with the network to receive user information from devices connected to the network. Thermostat 600 may store personalized settings and control configurations for each associated device. Thermostat 600 may load settings from the network to adjust the user interface in accordance with the user detected. For example, a user may prefer to have a user interface with only temperature adjustment, whereas another user may prefer to have a user interface which allows her to access every option available. Thermostat 600 may allow users to create a personalized home screen which displays information the user is most interested in.

Thermostat 600 may display different information based on the user detected. In some embodiments, thermostat 600 is able to distinguish between occupants based on information received from sensors 602-606. One of sensors 602-606 may be a camera, an IR sensor, a microphone, or any other conceivable sensor which could be used to detect occupancy. Thermostat 600 may only display the current temperature if a child or a pet is detected. In some embodiments, thermostat 600 may detect the user based on their identifiable personal device, and display a screen of her choice. For example, if a user prefers to see how long it will take to reach her settings, she can select that screen as the default screen when she is detected in the home. In another embodiment, thermostat 600 may display the most used screen. For example, if the temperature screen is used the most out of all screens available, thermostat 600 may display the temperature screen whenever occupancy is detected.

Near Field Communication Based Control and Operation

Figure 15A:
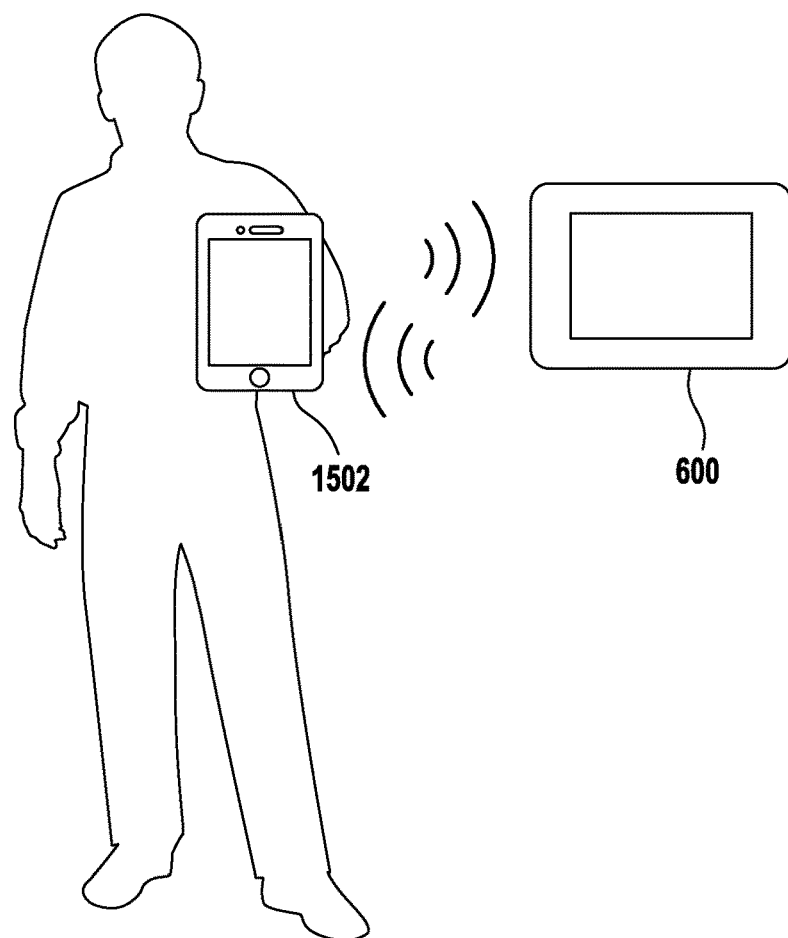
FIG. 15A is a drawing of a process in which a thermostat communicates with a user's personal electronic device via NFC according to an exemplary embodiment.
Figure 15B:
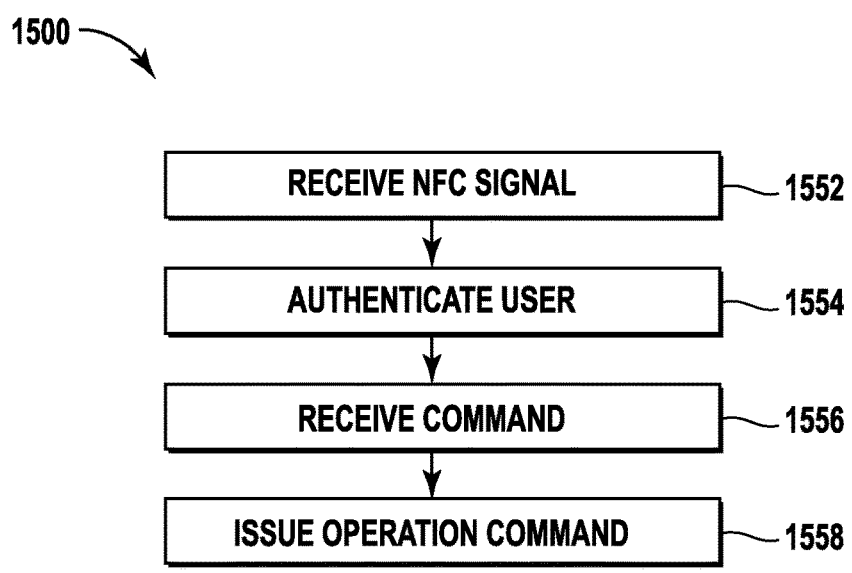
FIG. 15B is a flowchart of the process described in FIG. 15A according to an exemplary embodiment.

Thermostat 600 may be able to base control and operation decisions on data obtained through near field communication (NFC). In one embodiment, a user brings personal electronic device 1502 within range of an NFC transmitter integrated with thermostat 600, as shown in FIG. 15A. This may be referred to as "checking in." FIG. 15B describes process 1550, an exemplary embodiment of the method. In step 1552, thermostat 600 may receive identifying information through NFC. This information may include preferred settings for thermostat 600. Upon authentication and identification of the user through electronic device 1502, thermostat 600 is receptive to commands (step 1554). In some embodiments, thermostat 600 may provide an audible indication that the scan has occurred. For example, thermostat 600 may beep to let users know that scanning has been completed. In other embodiments, thermostat 600 may provide visual feedback that scanning has occurred. For example, thermostat 600 may flash display 802. In another embodiment thermostat 600 may communicate to device 1502 to provide an indication, such as beeping, flashing, or vibrating, that scanning has occurred. Thermostat 600 may alert the user that scanning has occurred in any number of ways not limited to those enumerated. Upon receiving a command in step 1556, thermostat 600 then transmits the command to connected equipment (step 1558).

In some embodiments, thermostat 600 may detect that no users have been associated, and may display a prompt on display 802 or on device 1502 with a tutorial on how to set up thermostat 600. For example, if thermostat 600 has just been installed and has no associated users and detects Jill's phone, thermostat 600 may display a message on Jill's phone asking whether she would like a tutorial of how to set up thermostat 600, or if she would like a walkthrough of any of the features of thermostat 600.

In multiple occupancy homes, thermostat 600 may allow multiple users. In some embodiments, a user may designate themselves as the master user, and may be able to override all commands to thermostat 600 from other users. In some embodiments, a new master user may be designated through an NFC check in based on the identifying information received by thermostat 600. For example, master user Jill may leave for work early in the morning while Jack remains at home until the afternoon. Jack may be able to check in and become the new master.

In some embodiments, thermostat 600 may automatically execute commands communicated through NFC. Users may be able to queue commands to thermostat 600 on their electronic device and transmit them through the use of NFC. In some embodiments, a user may send commands directly through user interface 612. In other embodiments, a user may send commands through electronic device 1502. For example, an application made by Johnson Controls Inc. for interacting with thermostat 600 may be available for download to a user's device. In some embodiments, if a user has not downloaded the application, thermostat 600 may be able to detect this and activate a prompt which asks the user if they would like to install the application. Thermostat 600 may be able to communicate with the network and initiate the installation process for the application. In other embodiments, a web-based application may be available for use with thermostat 600. For example, Johnson Controls Inc. may create an application which users can access from any device with network connectivity.

Figure 16A:
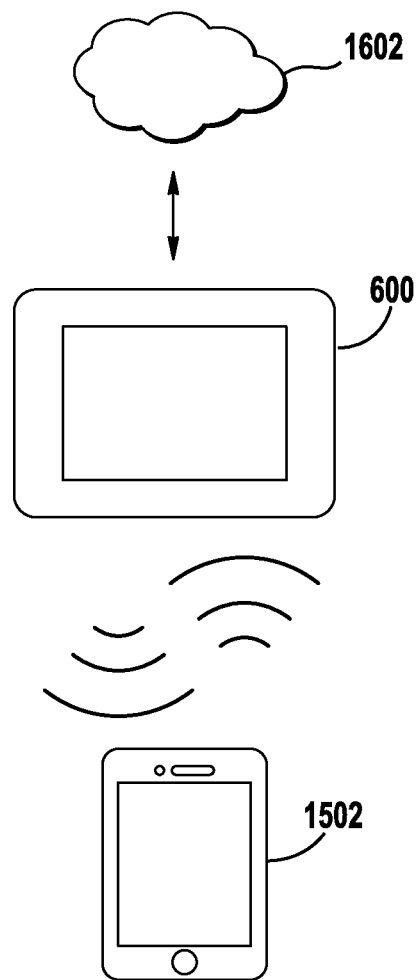
FIG. 16A is a system diagram of the flow of information between a network, a thermostat, and a user's personal electronic device via NFC according to an exemplary embodiment.

In FIG. 16A, thermostat 600 is communicating with network 1602 to receive information which thermostat 600 then transmits to device 1502. In some embodiments, network 1602 is a cloud storage service. In other embodiments, network 1602 may be a LAN or any other type of network, and may allow access to the Internet.

Figure 16B:
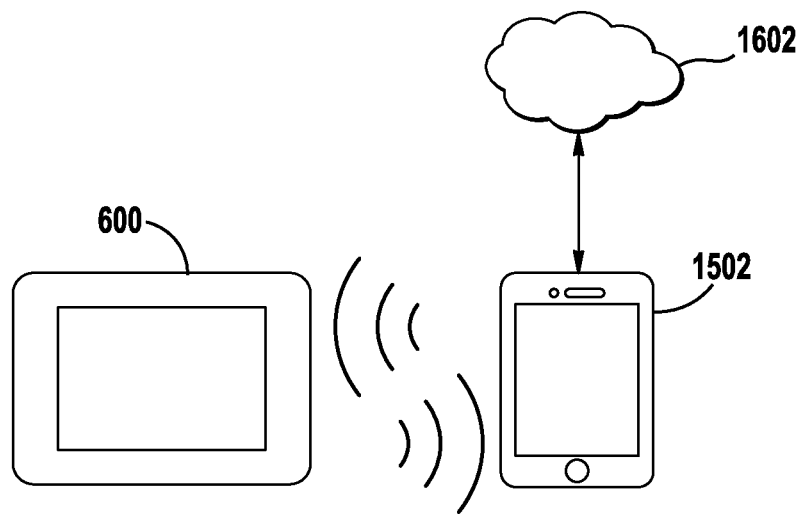
FIG. 16B is a system diagram of the flow of information between a network, a thermostat, and a user's personal electronic device via NFC according to another exemplary embodiment.

Referring now to FIG. 16B, thermostat 600 communicates over NFC with device 1502 which communicates with the network. Thermostat 600 may command device 1502 to retrieve information from network 1602 instead of transmitting the data over NFC. This embodiment and the previous embodiment are critically different in the flow of information.

Thermostat 600 may be able to receive billing information from device 1502. A user may wish to analyze their usage and their bill to make decisions regarding their behavior moving forward. In some embodiments, a user may be able to bring device 1502 within range of thermostat 600 and transmit bill information to thermostat 600. In some embodiments, the information is transferred over NFC after authentication of the user and device 1502. In other embodiments, the user and device 1502 are authenticated over NFC, and a command is sent to thermostat 600 to retrieve bill information from the network. The information retrieved may be in the form of Excel data, an XML file, a .txt file, any file type with tags, or any number of data formats. A user may be able to pay their bill over NFC through protocols such as Android Pay or Samsung Pay.

Figure 17:
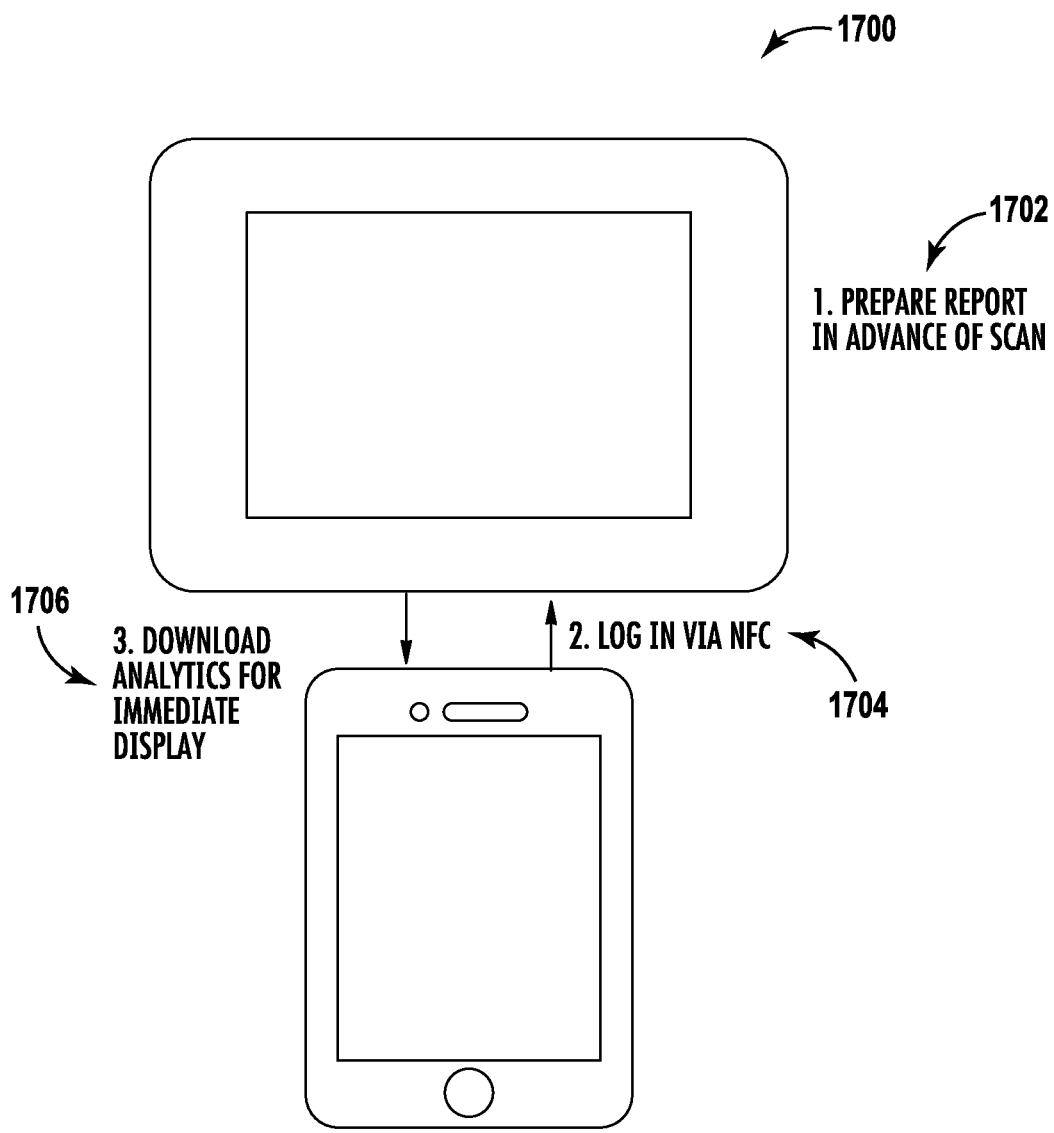
FIG. 17 is a drawing of a process in which a thermostat prepares an analytic report in advance of receiving a request via NFC for the report according to an exemplary embodiment.

In FIG. 17, process 1700 is an exemplary method through which thermostat 600 may preprocess stored data in order to send performance reports to device 1502 almost instantaneously. In some embodiments, device 1502 is able to quickly pull raw data via NFC from thermostat 600 to generate performance reports on topics such as energy management. Thermostat 600 may store data within a memory integrated with the device itself. In some embodiments, thermostat 600 may store data in the network. In step 1702, thermostat 600 prepares reports for download by device 1502 in advance of a request for a report. Device 1502 checks in over NFC with thermostat 600 and is authenticated (step 1704). Once device 1502 is authorized to download reports from thermostat 600, the analytics are downloaded for immediate display in step 1706. The entire process is streamlined to provide users with quick updates of their system performance. In some embodiments, generated reports pertain to energy management. In other embodiments, reports pertain to system operating parameters and performance metrics such as time-to-setpoint. In some embodiments, reports may be sent to a different authorized device after check in and specification by the user. The state and operation parameters of an HVAC system are constantly changing. In some embodiments, placing device 1502 on thermostat 600 provides a user with a snapshot of the system which includes information such as the system state, setpoint, current temperature.

Figure 18:
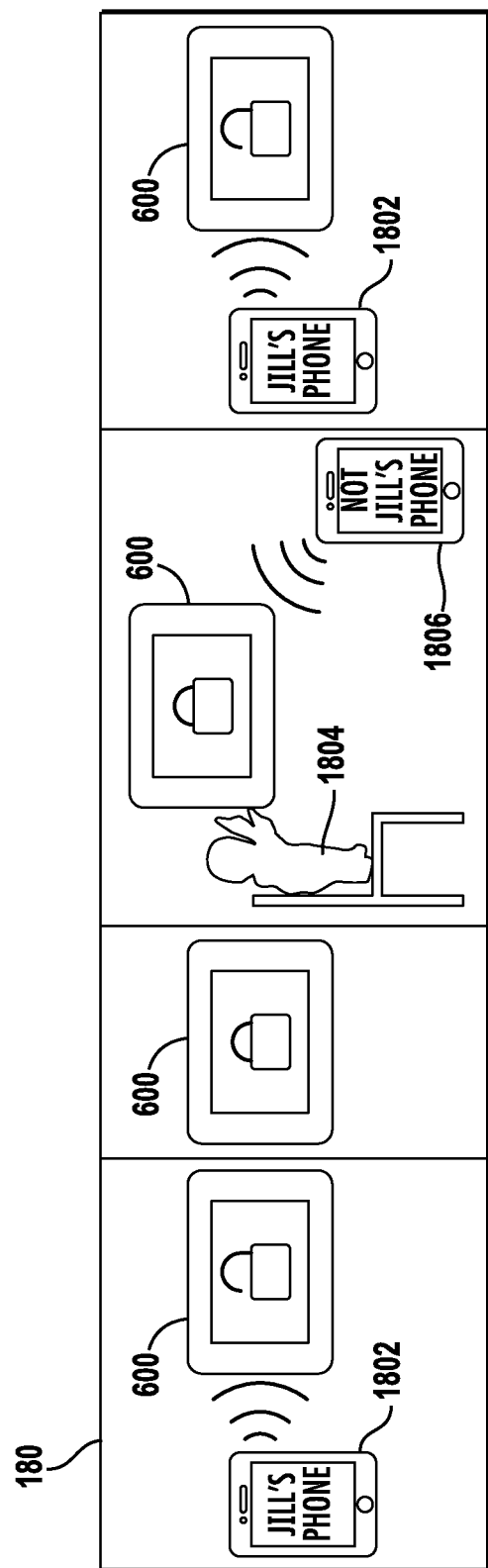
FIG. 18 is a drawing of a process in which a thermostat is locked and unlocked via NFC according to an exemplary embodiment.

Referring now to FIG. 18, the process of locking thermostat 600 over NFC is shown. A user (in this exemplary process, Jill) may check in with thermostat 600 with device 1802 and send the command to lock operation. Thermostat 600 receives the command and locks operation until another command is received. All attempts to input commands from other users (device 1806), pets, or small children (baby 1804) will be denied. Upon check in from the same user's device, cellphone 1802, which locked thermostat 600 and receiving the unlock command, thermostat 600 may resume operation and become receptive to commands from other users. In some embodiments, thermostat 600 may be commanded to allow other authorized users who check in to unlock operation. For example, Jill could send a command authorizing Jack to unlock operation—no one but Jack and Jill can unlock thermostat 600. In other embodiments, a user may be able to lock thermostat 600, but a master user may be able to unlock thermostat 600 without specifically being authorized to do so. For example, Jack may lock thermostat 600 without designating anyone else as an authorized user; because Jill is a master user, Jill can unlock thermostat 600. In some embodiments, a user may have more than one device associated with him and thermostat 600 may recognize all devices and allow him to lock and unlock devices with different devices associated with him.

Figure 19:
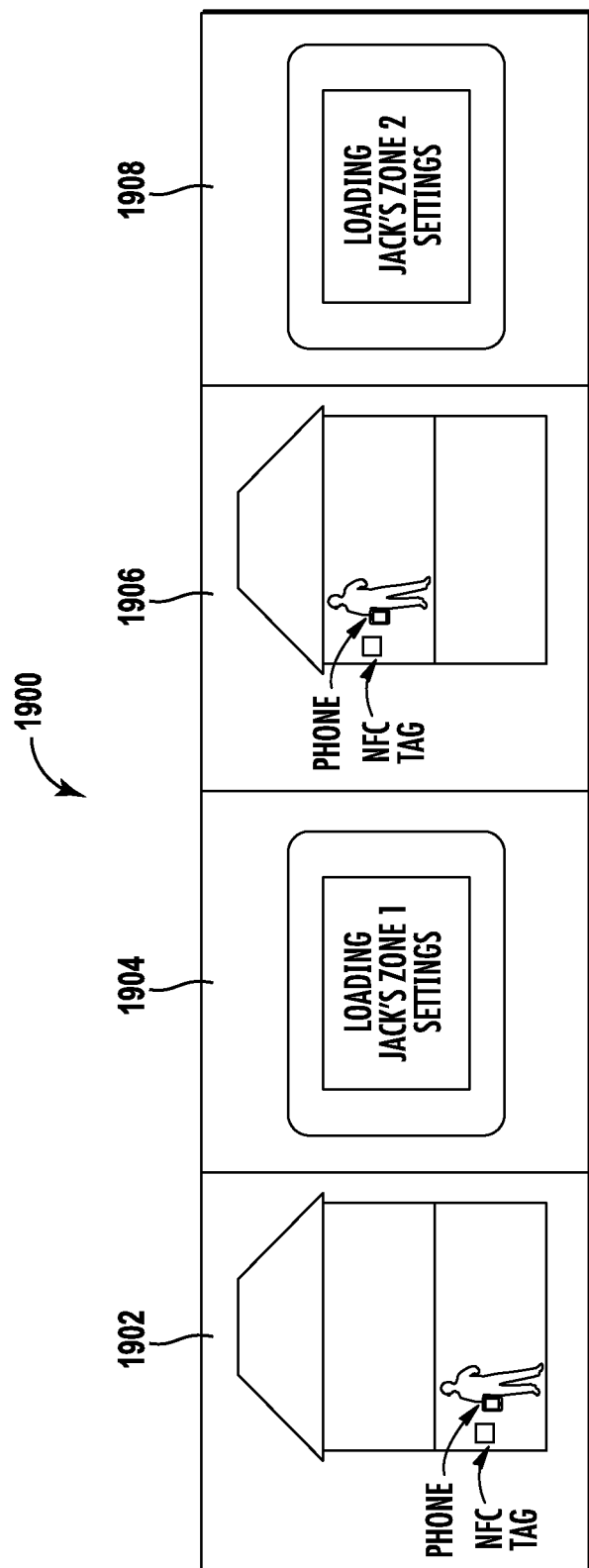
FIG. 19 is a drawing of a process in which a thermostat changes operation of a system using location data obtained via NFC according to an exemplary embodiment.

Referring now to FIG. 19, an exemplary process 1900 for changing zones based on the user is shown. It is contemplated that there are multiple conditioning zones in a home, and that an NFC tag or sensor may be installed in each. Depending on the zone in which a user checks in, thermostat 600 may automatically receive commands to adjust settings for that zone. Jack, a user is shown checking in with an NFC tag on the first floor, or zone 1, of his home in step 1092. Once Jack's device 1502 is authenticated, thermostat 600 receives an automatic command to adjust settings of zone 1 to Jack's preferences in step 1904. Jack is then shown to check in on the second floor of his home in step 1906. Once Jack's device 1502 is authenticated, thermostat 600 receives an automatic command to adjust settings of zone 2 to Jack's preferences in step 1908. In a multiple occupancy home, thermostat 600 may support multiple settings for each zone. In some embodiments, thermostat 600 may adjust each zone to a different user's preferences. In other embodiments, thermostat 600 may decide that zones in which a user has not checked in are not occupied, and therefore adjust or reduce conditioning in those zones. A user may be able to save preferred zones as part of their settings. For example, if a home is divided into zones such that there is one zone for each room, a user may save their bedroom as their preferred zone. Upon check in at any of the NFC sensors in the home, settings for their preferred zone will be communicated to thermostat 600, which will control the appropriate connected equipment.

Figure 20:
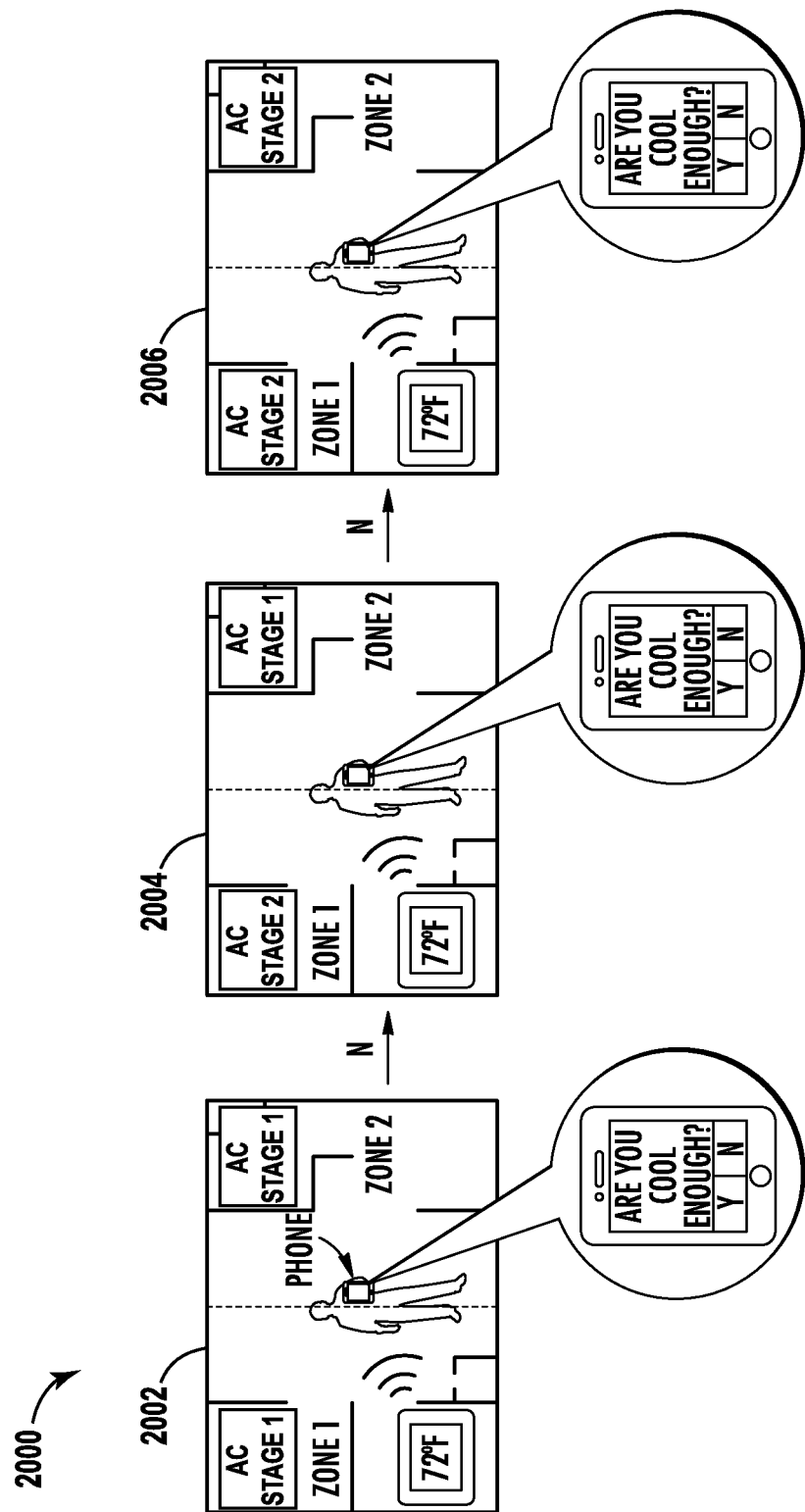
FIG. 20 is a drawing of a process in which a thermostat changes operation of a system using feedback from a user obtained via NFC according to an exemplary embodiment.

Referring now to FIG. 20, an exemplary process 2000 for adjusting conditioning when a user is between zones is shown. In many homes, the only thermocouples or other temperature sensors are the ones integrated with the thermostats. In step 2002, thermostat 600 may detect that a user is not in just one zone. Thermostat 600 sends a prompt to be displayed on user's device 1502 which asks whether it is cool enough. If the user feels that it is not cool enough, despite the thermostat's sensor reporting that the desired temperature has been reached, he may choose to say "No." Thermostat 600 then adjusts the operating conditions of one of the zones the user is between. Once the conditions have stabilized, thermostat 600 sends another prompt to be displayed on user's device 1502 which asks whether it is cool enough (step 2004). If the user still feels that it is not cool enough, in step 2006, thermostat 600 adjusts the operating conditions of another zone the user is between. Thermostat 600 repeats this process until the user responds in the affirmative. This process could be used for heating, for adjusting humidity, etc. and is not limited to cooling.

Figure 21:
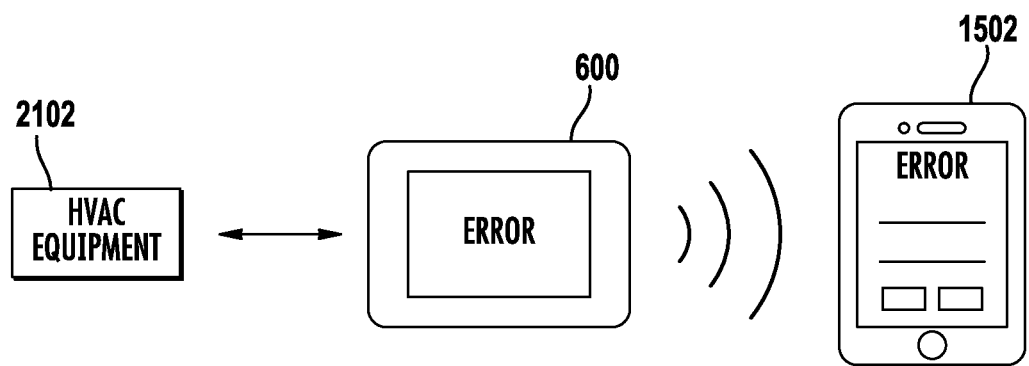
FIG. 21 is a drawing of the flow of fault information between a piece of equipment, a thermostat, and a device via NFC according to an exemplary embodiment.

Referring now to FIG. 21, thermostat 600 may be able to detect faults in or receive messages reporting faults from connected equipment. When a fault is detected, thermostat 600 may alert users by sending a prompt to the users' devices. For example, if a compressor is not functioning correctly and this malfunction is detected, thermostat 600 may send a prompt to device 1502 notifying the user that the compressor is not performing as expected. In some embodiments, thermostat 600 may contain contact information for the dealer or an authorized repair company. Thermostat 600 may include the contact information in the prompt, or provide it when a user indicates that they would like to call for help. For example, thermostat 600 may ask a user if they would like to contact the dealer, and offer to dial the dealer's number if a user chooses to accept. In some embodiments, thermostat 600 uses NFC to send the dealer's number to the user's phone when the user places his phone on thermostat 600. In some embodiments, thermostat 600 may generate an estimate for repair costs based on historic data. In other embodiments, thermostat 600 may receive communication from the dealer with an estimate of the repair based on the information transmitted.

Figure 22A:
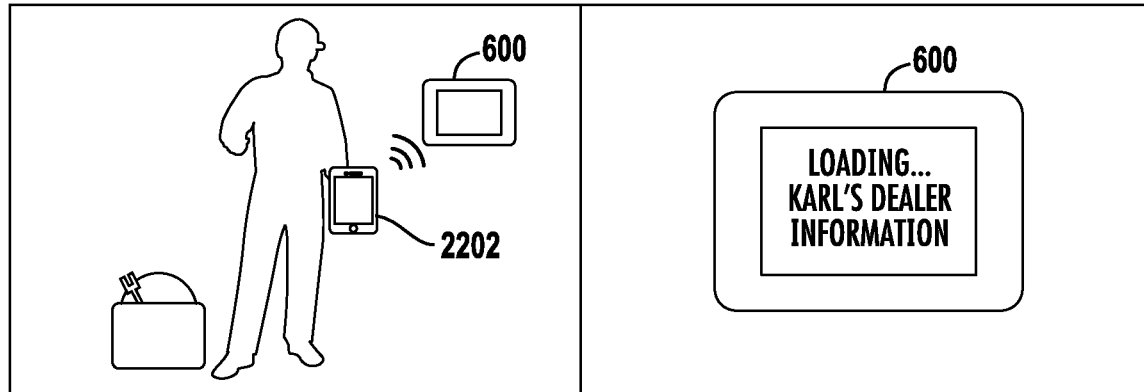
FIG. 22A is a drawing of a process in which a thermostat modifies its user interface and available features using user identification data obtained via NFC according to an exemplary embodiment.

Thermostat 600 may be able to provide different user interfaces and make different options available depending on the user. As shown in FIG. 22A, thermostat 600 may have an operating mode targeted to dealers which allows for configuration of thermostat 600 before purchase by the end user. A technician is shown to use dealer authorized device 2202. In some embodiments, thermostat 600 in dealer mode will allow a dealer to apply a custom configuration specific to their dealership. The dealer may program in their contact information to be displayed when a fault is detected. The dealer may choose to include their logo, custom messages, and specific settings for system parameters. The dealer may configure any aspect of the thermostat. In some embodiments, the dealer may contact the customer before purchase and configure the settings to the customer's specifications. The dealer may be able to include fault suppression rules, such that minor faults are not displayed to the user to prevent undue concern. For example, faults related to energy efficiency may not be displayed to the user. In some embodiments, the dealer may be able to demote faults to prompts such that a user remains informed, but does not become distressed. For example, if a user's AC unit is not functioning as efficiently as it could, the dealer may demote the fault to a prompt which notifies the user that current outside conditions make it difficult to operate at maximum efficiency. In some embodiments, dealers may edit the language of the faults. For example, if a catastrophic failure of the system occurs, a dealer may change the language of the fault notification to a less panic inducing message.

Figure 22B:
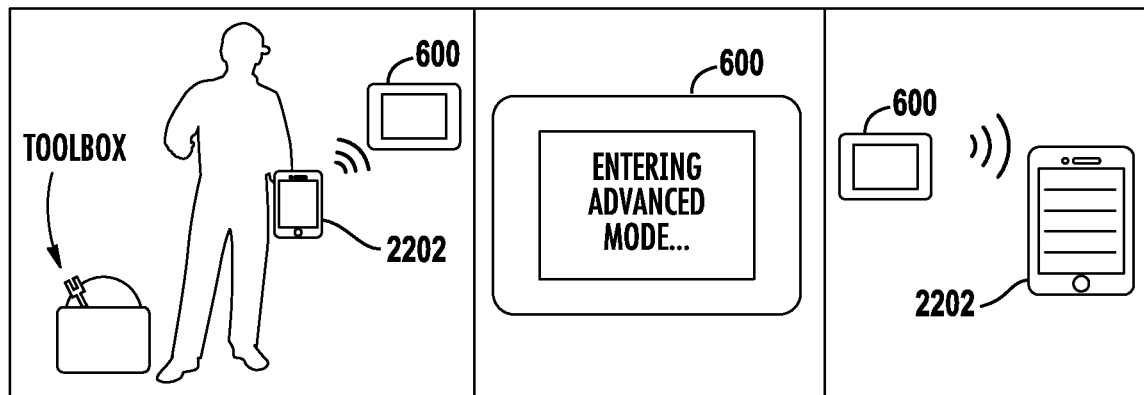
FIG. 22B is a drawing of a process in which a thermostat modifies its user interface and available features using user identification data obtained via NFC according to another exemplary embodiment.

Referring now to FIG. 22B, thermostat 600 may follow different procedures for reporting faults when a dealer is the user checked in. Information may be transmitted to the dealer or repairman over NFC. In some embodiments, the information itself is not sent—instead, a key or command is sent to the device to retrieve the information from the network. In some embodiments, thermostat 600 is able to send the dealer or repairman to the appropriate troubleshooting page for the specific model of equipment being worked on. Troubleshooting techniques and common problems and their solutions may be displayed. In some embodiments, thermostat 600 may communicate where variations in the system and most commonly identified trouble junctions are during installation. Thermostat 600 may store performance data and fault data. In some embodiments, this data is stored in memory integrated with thermostat 600. In other embodiments, this data is stored in the network and accessed by thermostat 600 when needed. Thermostat 600 may be able to produce a system performance history report. In some embodiments, thermostat 600 may produce a fault history report or any number of analytic reports on the operation of the system.

Figure 23:
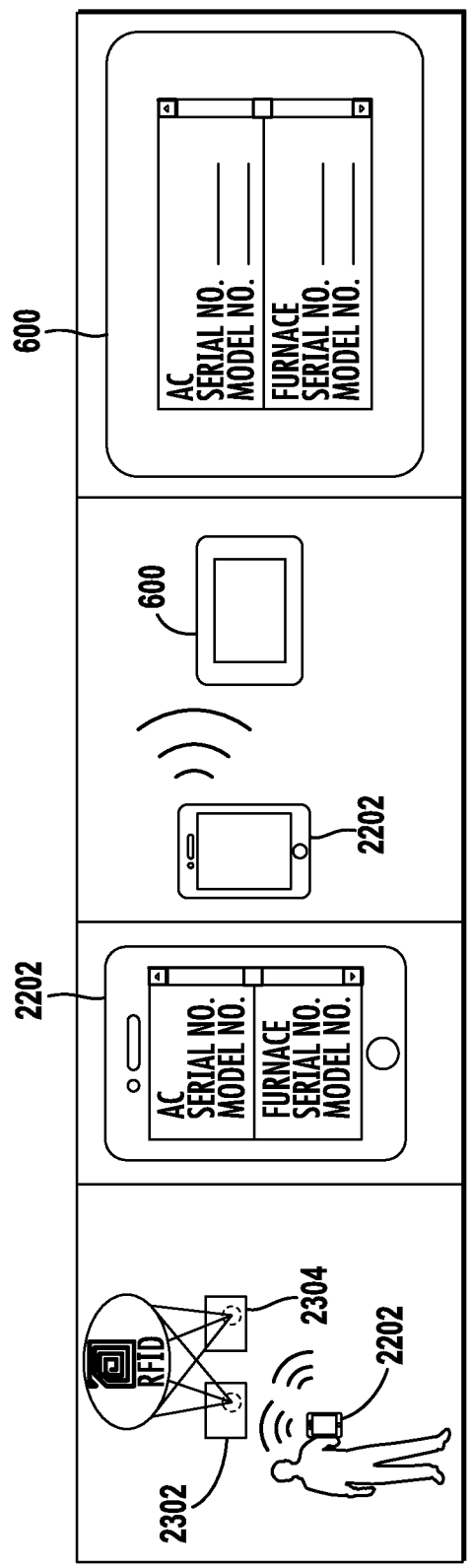
FIG. 23 is a drawing of a process in which a thermostat obtains equipment-specific information via NFC according to an exemplary embodiment.

Referring now to FIG. 23, equipment connected to thermostat 600 may include RFID tags which can be scanned by thermostat 600 or the device of an installer. AC unit 2302 and furnace 2304 are shown to include RFID tags. The RFID tags may contain identifying information such as the serial number, model, and install date. For ease of installation, the RFID tags may link to installation instructions unique to the model of equipment being installed. In some embodiments, other information such as wiring diagrams and set-up guides may be available upon scanning the RFID tag of the respective piece of equipment. Thermostat 600 may send a key to access the information over NFC along with a command to retrieve the information from the network. The information may be displayed on dealer authorized device 2202 or another authorized device. In some embodiments, the information may be displayed on display 802 of thermostat 600. In some embodiments, dealers may be able to input the warranty information for the system to be made available to the user if requested from thermostat 600. In some embodiments, the warranty information and period may be automatically applied during installation via NFC. In some embodiments, a user is able to retrieve warranty information from thermostat 600 via NFC by placing device 1502 on thermostat 600.

It should be noted that some or all of the features disclosed above described with respect to advanced functions and modes available to dealers and installers may also be available to end users, if desired.

Smart Thermostat and Equipment Communications

Figure 24:
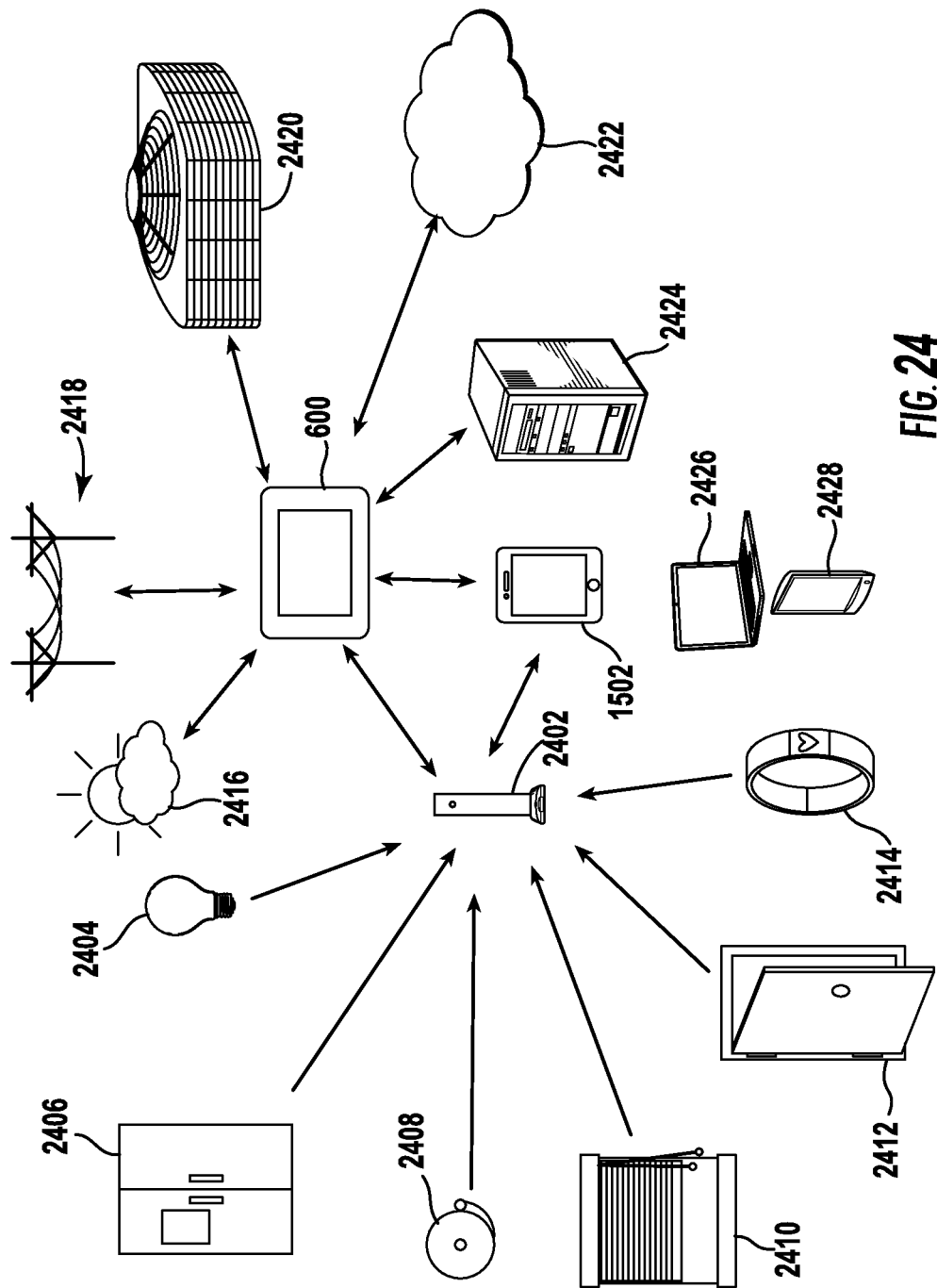
FIG. 24 is a drawing of the devices with which a thermostat may communicate according to an exemplary embodiment.

Most commercial thermostats available to consumers are only capable of uni-directional communication: switching on or off connected equipment. Thermostat 600 is capable of bi-directional communication with connected equipment in the system. Referring to FIG. 24, it is shown that thermostat 600 is capable of communicating with a variety of devices, such as light system 2404, refrigerator 2406, security system 2408, blinds or windows 2410, door 2412, or fitness tracker or other wearable 2414, either directly or through an intermediary. Thermostat 600 may communicate directly with connected HVAC equipment 2420. Thermostat 600 may communicate with services such as weather service 2416, utility provider 2418, network 2422, or server 2424. In some embodiments, thermostat 600 communicates with devices through router 2402 to which the devices are connected. In other embodiments, thermostat 600 communicates with devices through network 2422 with which the devices are connected. User owned portable electronic devices with which thermostat 600 may communicate include device 1502, laptop 2426, or tablet 2428. It is understood that the resources with which thermostat 600 is shown to be connected are not meant to be limiting, and that thermostat 600 may be connected with any number of devices, services, and systems. Communication may occur over any of a number of protocols: communication may occur over wired or wireless venues. Communication may occur over WiFi, Bluetooth, LAN, TCP/IP, etc.

Figure 25:
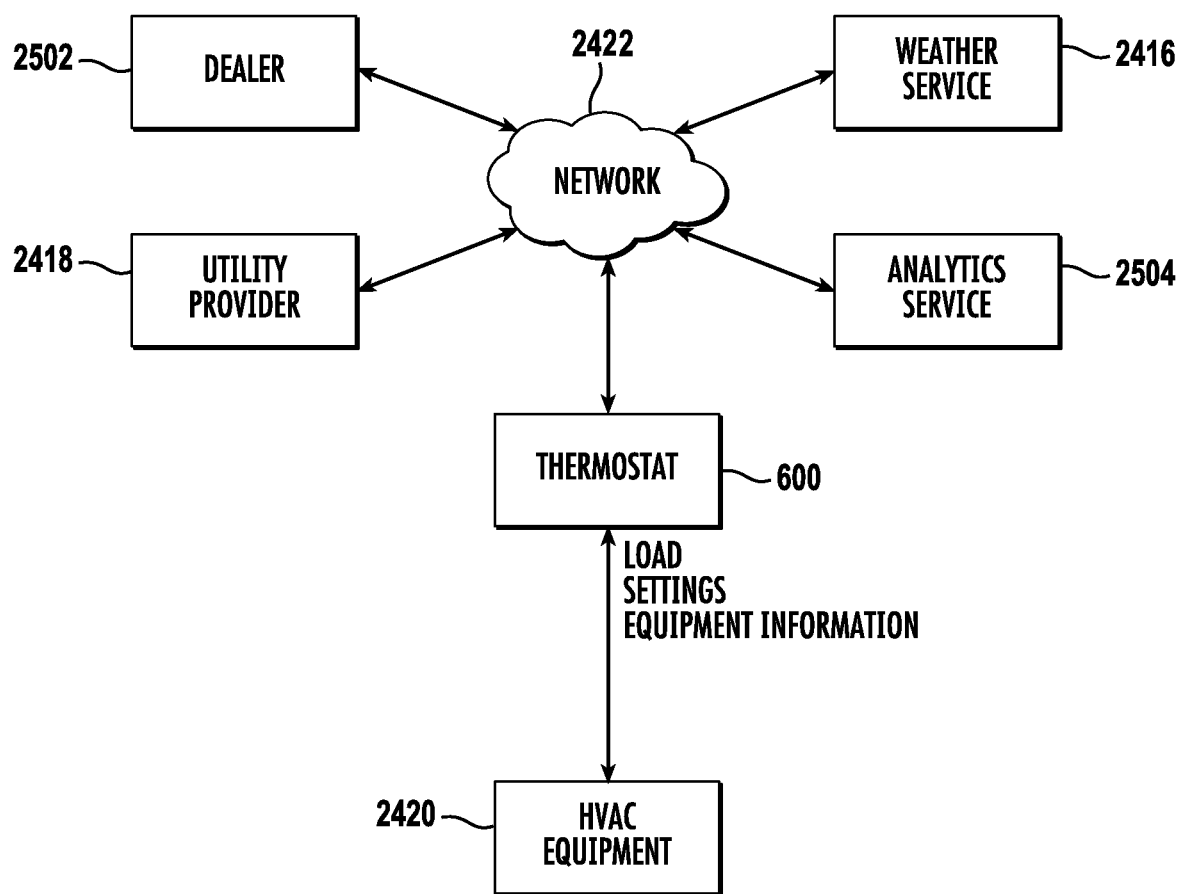
FIG. 25 is a flowchart detailing the flow of information between a thermostat, HVAC equipment, a network, and network-connected devices and services according to an exemplary embodiment.

Referring now to FIG. 25, thermostat 600 is able to receive information used to calculate metrics such as assumed load and current energy consumption due to its bi-directional communication abilities. Thermostat 600 is shown to be connected with network 2422, through which thermostat 600 may communicate with dealer 2502, weather service 2416, analytics service 2504, or utility provider 2418. Thermostat 600 is shown to be communicating directly with HVAC equipment 2420. It is understood that the resources with which thermostat 600 is shown to be connected are not meant to be limiting, and that thermostat 600 may be connected with any number of devices, services, and systems. The history of the system, including equipment operating performance, can be stored either in memory integrated with thermostat 600 or in network 2422 for later access.

Thermostat 600 may analyze the data through analytics service 2504. Analytics service 2504 may be an embodiment of analyzer 712 of memory 704, which is integrated with thermostat 600, or may be a remote module able to communicate with thermostat 600 in any of the ways in which thermostat 600 is able to communicate: through wired or wireless protocols. Thermostat 600 and analytics service 2504 may be able to use historical data from the system with which it is associated as well as other systems connected to the network which are similar in size and equipment configuration. Thermostat 600 may be able to use local equipment history or history stored in network 2422 of similar equipment to educate a user on the capabilities of his system. Analytics service 2504 may have algorithms available to it, as well as a store of historical calculations and analysis from which it may provide informed estimates. Thermostat 600 may receive basic operational data from connected equipment which it then transmits to analytics service 2504. Analytics service 2504 may use feedback from connected equipment to make accurate estimates and to detect faults. For example, analytics service 2504 may determine that despite the AC unit operating at maximum settings for the past 20 minutes, no change in temperature has been detected. Analytics service 2504 may then generate an error message for thermostat 600 to communicate to a user. Analytics service 2504 may also be able to detect problems such as capacity incongruences and staging malfunctions. It is understood that analytics service 2504 is not limited to detecting problems explicitly enumerated.

Thermostat 600 may connect with a commercial energy management software which provides tools to users. These tools may allow users to create reports using variables in which they are interested. In some embodiments, thermostat 600 may transmit all data received to the commercial energy management software for processing and presentation to a user. Thermostat 600 may receive results and reports from the energy management software for display to a user on a portable device or on display 802. In some embodiments, thermostat 600 may generate the results and reports and display the results and reports to the user on portable device 1502 or on display 802. Advantages of not processing data locally include reduced cost of units for consumers and simplicity of updating or patching functionality. Thermostat 600 may be compatible with a plug in which communicates with thermostat 600 and a standalone program. The plug in may detect parameters such as current draw, and may be able to detect actions of the system early through monitoring current draw or other such parameters.

Analytics service 2504 may combine a user's energy usage data with their energy bill to report on the fiscal effects of a user's behavior. Thermostat 600 is able to communicate with a user's device which may authorize thermostat 600 to receive billing information. In some embodiments, thermostat 600 may help a user reduce their energy bill by integrating demand-response information into the report. In some embodiments, thermostat 600 is able to develop a cost analysis of a user's energy behavior. For example, thermostat 600 may be able to receive demand-response feedback from a utility provider or smart meter which can be analyzed along with a user's energy usage to inform the user of the effects of their usage behavior.

Figure 26A:
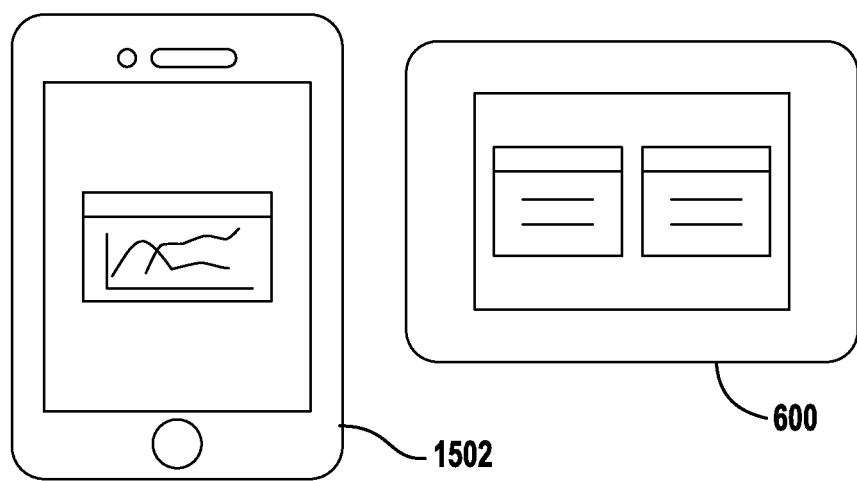
FIG. 26A is a drawing of user interfaces through which a thermostat may display reports which compare and contrast a user's energy consumption and behavior with other similar systems according to an exemplary embodiment.
Figure 26B:
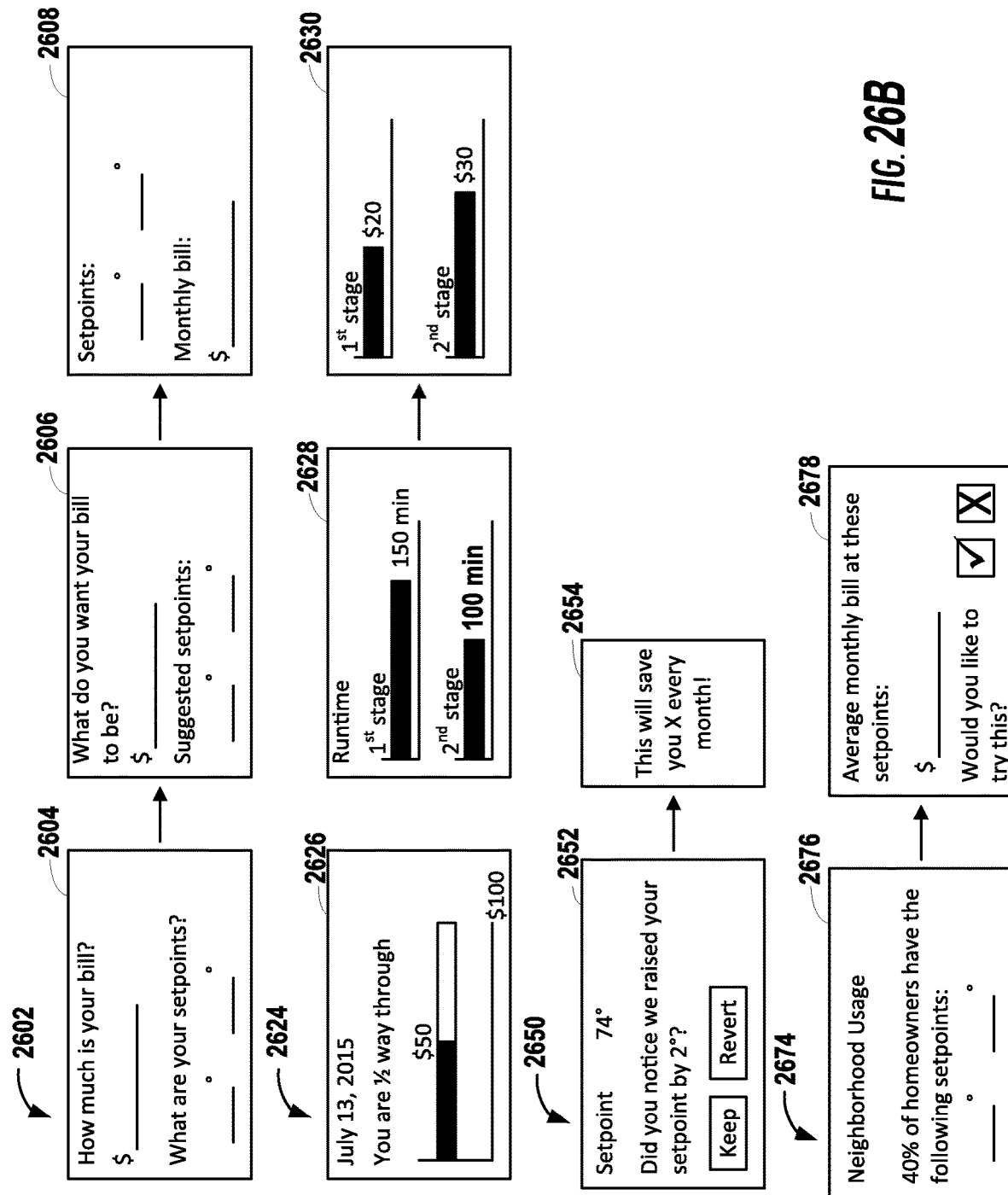
FIG. 26B is a drawing of processes through which a thermostat may interact with a user to affect the energy consumption and energy bill of a building space according to an exemplary embodiment.

Referring now to FIG. 26B, several processes through which a user can control her energy usage and resulting energy bill are shown. In process 2602, display 802 of thermostat 600 is shown. Thermostat 600 may suggest setpoints to help a user reach her target bill amount. In step 2604, a user is asked to input her current monthly energy bill and their current setpoints. For example, Jill may currently be paying $350 a month in energy bills by keeping her setpoints at 68° F. in the summer and 76° F. in the winter. In step 2606, the user is asked to input her target bill amount. Jill may wish to reduce her bill to $250 a month. In some situations, the target bill amount is not possible. Thermostat 600 may display a warning to the user that her target is unachievable under the current operating conditions. For example, it is the coldest winter in Jill's area in 100 years. In order to keep temperatures at a livable level and prevent damage to the plumbing, the temperature needs to be kept at or above 65° F. In another situation, it is the hottest summer in Jill's area in 100 years. The units in Jill's home are not equipped to efficiently cool a house of that size to a livable temperature. Thermostat 600 is unable to save enough energy to reduce Jill's monthly bill to $250 and when she inputs her target payment as $250, thermostat 600 may flash a message which reads "Current operating temperatures prevent me from reaching your target bill amount. We are on track to having a bill of $300 this month." When the target bill amount is possible, thermostat 600 may change the setpoints to the setpoints suggested to the user. In one embodiment, a user may input her own preferred setpoints to see what her monthly bill may be if she does not make changes to her energy usage. In step 2608, for example, Jill may input her preference for 70° F. and 74° F. Thermostat 600 may determine that based on local historical equipment data, Jill's monthly bill with her current settings will be $230. In some embodiments, thermostat 600 may use data from the history stored in network 2422. Thermostat 600 may communicate the need to have the data analyzed by data analytics service 2504. Thermostat 600 may communicate with other devices connected to network 2422 and display information on connected devices. In some embodiments, thermostat 600 may display all data and communications on a user device 1502.

Still referring to FIG. 26B, in process 2624, thermostat 600 may allow a user to track their usage relative to their target. In step 2626, thermostat 600 shows on display 802 a user's energy usage relative to their goal payment for the month. For example, Jill would like to pay $100 for the month of July. It is the 13th, and she is already halfway through her target payment. This allows Jill to make an informed decision on whether she would like to adjust her usage habits or receive a larger bill. In some embodiments, thermostat 600 may provide a report of different operating parameters and their respective energy usage. In step 2628, the runtime of each stage of the compressor is shown. In step 2630, the calculated cost associated with the runtimes of each stage is shown. This comparison informs users of their usage habits and allows users to decide whether and how to make adjustments to affect their monthly bill. In some embodiments, thermostat 600 may use data from the history stored in network 2422. Thermostat 600 may communicate the need to have the data analyzed by data analytics service 2504. Thermostat 600 may communicate with other devices connected to network 2422 and display information on connected devices. In some embodiments, thermostat 600 may display all data and communications on a user device 1502.

Still referring to FIG. 26B, thermostat 600 may make changes to setpoints automatically (process 2650). In step 2652, display 802 of thermostat 600 is shown to inform a user that his setpoint has been raised by 2° F. For example, Jack may have had his setting at 72° F. and over the course of a few hours, thermostat 600 may have raised the temperature to 74° F. Thermostat 600 may inform Jack that his setpoint was increased, and ask whether he had noticed a difference in comfort or whether he would like to keep the change made. If a user chooses to accept the change, thermostat 600 may display the projected savings resulting from the change (step 2654). In some embodiments, this is a monthly savings. Thermostat 600 may be able to estimate the savings for just one day, or for a year. This feature may help users save energy by making adjustments and showing them how even a small change can result in savings. In some embodiments, thermostat 600 may use data from the history stored in network 2422. Thermostat 600 may communicate the need to have the data analyzed by data analytics service 2504. Thermostat 600 may communicate with other devices connected to network 2422 and display information on connected devices. In some embodiments, thermostat 600 may display all data and communications on a user device 1502.

Still referring to FIG. 26B, thermostat 600 may compare a home's system with systems in the surrounding area or neighborhood (process 2674). In some embodiments, thermostat 600 receives information regarding the systems in the surrounding area from data analytics service 2504. In some embodiments, only homes with similar settings and equipment will be shown. In other embodiments, all homes will be shown regardless. In step 2676, thermostat 600 may show on display 802 statistics on setpoints being used by neighbors. This allows users to compare their usage habits with users in similar environmental conditions. For example, Jack and Jill live in Mr. Roger's Neighborhood. Thermostat 600 shows that 40% of homes have setpoints at 72° F. and 72° F. (meaning that they keep 72° F. as the setpoint year round). In step 2678, thermostat 600 may show the average monthly bill for the set of homes included in the report. Thermostat 600 may ask users if they would like to try the settings, allowing users to make budget and energy conscious decisions without undue effort. In some embodiments, thermostat 600 may use data from the history stored in network 2422. Thermostat 600 may communicate the need to have the data analyzed by data analytics service 2504. Thermostat 600 may communicate with other devices connected to network 2422 and display information on connected devices. In some embodiments, thermostat 600 may display all data and communications on a user device 1502.

Thermostat 600 may make comparisons of the connected system to similar systems connected to the network. System analyzer 714 may find a subset of systems connected to the network which are similar to the system connected to thermostat 600. Similar systems may be determined based on equipment configurations, size of home, location, climate, and various other factors or any combination of the previously mentioned factors. Thermostat 600 may send a request for a report to be generated by analytics service 2504, which may retrieve data, from the subset of similar systems determined by system analyzer 714, from the network. Reports may be generated which analyze energy usage of the occupants of a home. As shown in FIG. 26A, thermostat 600 may display reports on a user's device 1502 to compare and contrast a user's energy consumption and behavior with other similar systems. Thermostat 600 may also show comparison reports on display 802. For example, thermostat 600 may display reports comparing John's usage with his neighbors—Jack and Jill's—usage.

In other embodiments, thermostat 600 may find systems which are similar with respect to many parameters, although not necessarily geographically close. Thermostat 600 may be able to notify a user of their ranking in terms of energy usage. For example, thermostat 600 may inform a user that their energy usage is above average among similar systems. This allows users to evaluate their energy usage behavior and decide whether they value efficiency, comfort, or a compromise. In some embodiments, number ranks could be given, encouraging users to experiment with thermostat 600 and its settings in order to be more efficient. It is contemplated that users can post their rank and their settings on social media to share with others and to create a sense of competition. For example, a user may post their settings on a social media website with the message "My conditioning system is running 10% more efficiently this month and saved $15 on my electricity bill! Thanks Johnson Controls Inc.!"

Figure 26C:
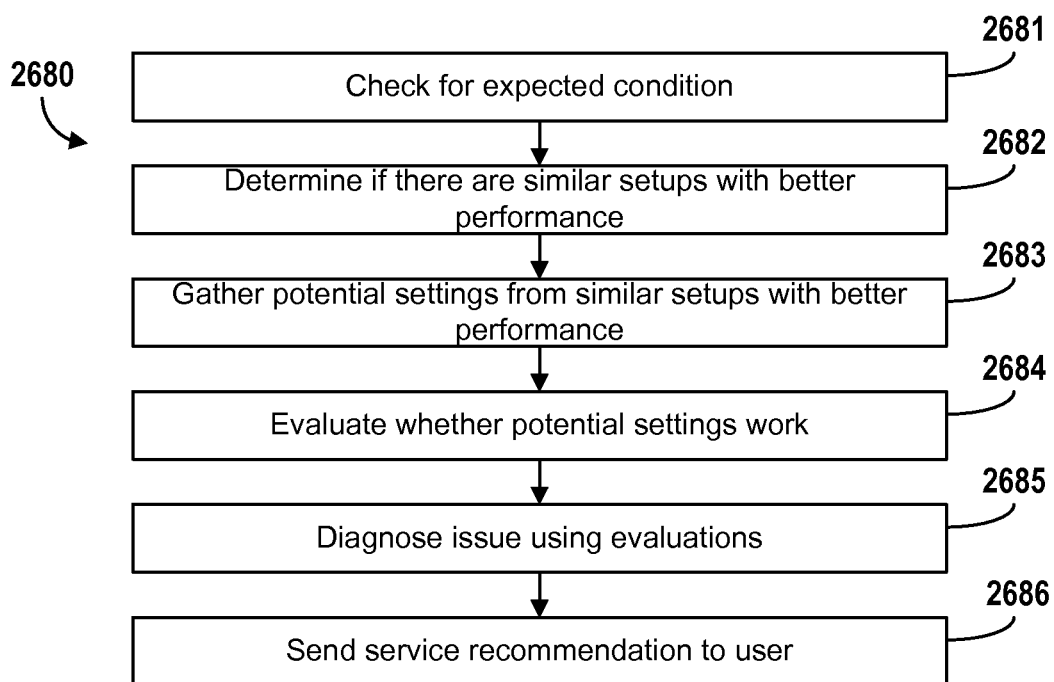
FIG. 26C is a flowchart detailing process of testing new settings automatically according to an exemplary embodiment.

Referring now to FIG. 26C, users may be able to indicate their preference to thermostat 600, which may use the preference to make operation decisions. When comparing systems according to process 2680, thermostat 600 may determine whether settings of other systems can impact a user's energy usage. In step 2681, system analyzer 714 may find a subset of systems connected to the network which are similar to the system connected to thermostat 600. Similar systems may be determined based on equipment configurations, size of home, location, climate, and various other factors or any combination of the previously mentioned factors. Thermostat 600 may find that a neighboring home of a similar size with a similar system is using much less energy (step 2682). If the user has indicated that they value energy efficiency, thermostat 600 may notify the user that potentially more efficient settings have been found (step 2683). In some embodiments, thermostat 600 may automatically test-run settings which have been identified as potentially impacting a user's energy usage. For example, thermostat 600 may run settings of a potentially more efficient system while a user is not home and report the results of the test when the user returns (step 2684).

In some embodiments, thermostat 600 may display a prompt with the identified potentially impactful settings and allow a user to decide which settings to test. For example: a system identical in equipment and area serviced is identified as operating 10% more efficiently than Jill's system. Thermostat 600 may display "According to information stored in the cloud, you may be able to increase efficiency by increasing your fan speed to HIGH. Would you like to increase your fan speed from MEDIUM to HIGH? To accept this change, please select Yes. To reject this change, please select No." Depending on Jill's selection, thermostat 600 would either adjust fan speed or dismiss the prompt. In some embodiments, an issue may occur when a setting does not produce expected results. For example, the blower of a system is too small to operate any more efficiently at higher speeds. A compressor may be broken and consequently produces no better results when staging is altered. Thermostat 600 may identify the source of these issues and evaluate what the problem is (step 2685). Thermostat 600 may then display a prompt to the user asking whether she would like to call her dealer or a technician to repair the identified source of the problem (step 2686). For example, there is a furnace connected to thermostat 600. The thermostat 600 communicates to the furnace and identifies that there is a problem with the airflow of the furnace. Thermostat 600 uses information gathered from the furnace to identify that an air filter of the furnace needs to be changed. Thermostat 600 then displays a prompt to the user identifying the issue as a bad air filter. In some embodiments, the information regarding identified problems are sent directly to the user and the technician via an email or text message.

Thermostat 600 is able to provide a clear and up-to-date report of a home's energy usage. Thermostat 600 is able to communicate with a wide variety of devices, and the communication allows greater detail when creating a usage report. Whereas a monthly bill from a utility provider merely shows the total usage, analytics service 2504 offers key information such as the time of use and the piece of equipment associated with the usage. For example, thermostat 600 may display an energy usage report which shows that for the past two days, the dishwasher has been using more than twice the amount of energy is has been using for the three years it has been in the home. Thermostat 600 may detect the discrepancy and notify a user that the dishwasher may be malfunctioning. Thermostat 600 may display an energy report which shows that the AC system is using less energy than a user had previously thought. Thermostat 600 may display an energy report that shows that the washing machine is using energy even when it is not being used. This information may help a user decide that it is time to replace old, inefficient appliances. Thermostat 600 may connect to older, existing equipment in a home to improve efficiency over previous performance using a conventional thermostat. In some embodiments, thermostat 600 applies changes to the equipment operating parameters using metering over time.

Thermostat 600 may be able to use analytics service 2504 to calculate the time needed to reach the setpoint commanded by the user. In some embodiments, this calculation is done locally. In other embodiments, thermostat 600 may transmit the data to analytics service 2504 which may transmit the results back to thermostat 600 or a user device 1502 for display. For example, thermostat 600 may receive a command to condition a home to 72° F. when the outside temperature is 80° F. and there is low humidity. Thermostat 600 transmits the current operating conditions and the command to analytics service 2504. Analytics service 2504 determines, from current operation conditions, feedback from the equipment, and historical data, that the system will be able to reach the setpoint specified in half an hour. Analytics service 2504 transmits this information to thermostat 600, which then displays a message to the user notifying her that the system will reach the setpoint in half an hour. In some embodiments, based on certain outside conditions, the system may be under an unusual amount of load. Analytics service 2504 may recognize this when comparing system performance with similar systems and adjust the time estimate. In some embodiments, analytics service 2504 may add an offset to the standard time estimate. It is contemplated that analytics service 2504 is able to perform this function for more optimal conditions as well, and subtract an offset from the standard time estimate.

Figure 26D:
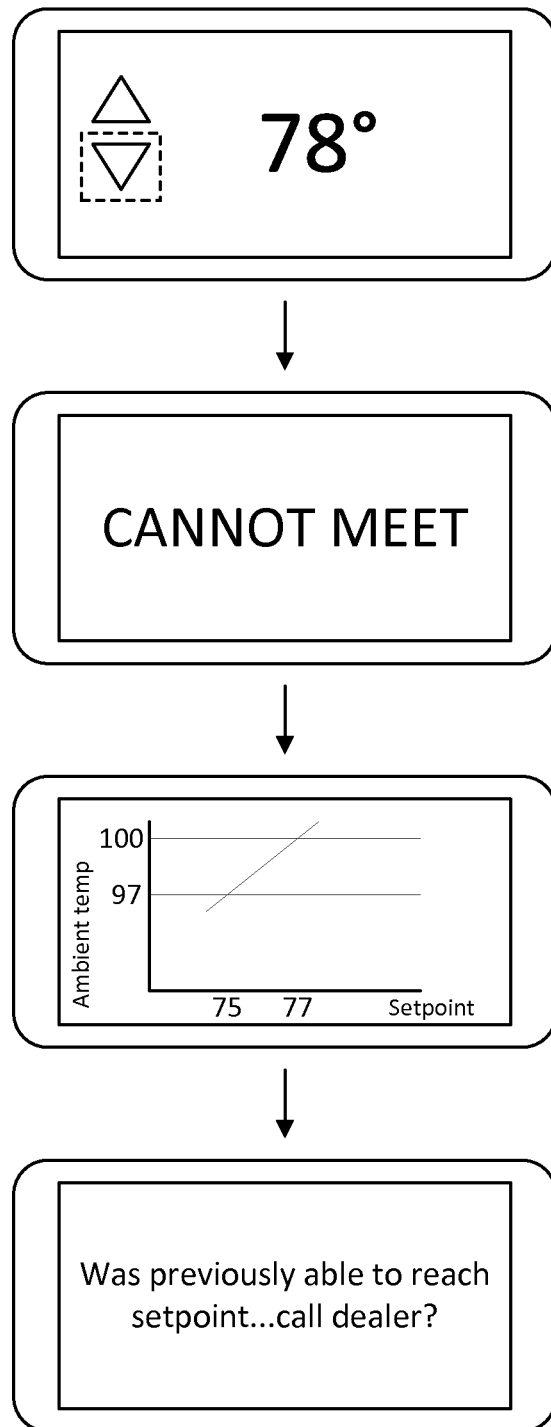
FIG. 26D is a drawing of a process in which a thermostat alerts users that it is unable to reach a setpoint according to an exemplary embodiment.

Referring now to FIG. 26D, thermostat 600 may be able to notify a user of the ability of the system to reach the setpoint specified by the user. For example, thermostat 600 may receive a command to condition a large home to 77° F. when the outside temperature is 105° F. Thermostat 600 sends the current operating conditions and the command to analytics service 2504. Analytics service 2504 may determine, from current operation conditions, feedback from the equipment, and historical data, that due to the high humidity and the size of the AC unit installed relative to the size of the home, the system is unable to reach the setpoint. Analytics service 2504 may determine this by using data points from current operation to extrapolate future temperatures. Analytics service 2504 may use historical data points to determine setpoint limits under the current operating conditions. Analytics service 2504 transmits this information to thermostat 600, which then displays a message to the user notifying her that the system is unable to reach a setpoint.

When this situation arises, thermostat 600 may be able to notify the user in any number of different ways. Thermostat 600 may display an indicator such as a flashing message on display 802, transmit a message to user device 1502 to vibrate and alert the user that the setpoint is unattainable, play a sound, or any number of other methods of notifying the user. Thermostat 600 may display a message with more information about the situation, such as the factors contributing to the inability of the system to reach the setpoint. It is contemplated that thermostat 600 may notify users of any condition and provide additional information, and that this feature is not limited to when the system cannot reach the specified setpoint. In some embodiments, thermostat 600 may be able to calculate the maximum or minimum setpoint which can be achieved based on the current operating conditions, feedback from equipment, and historical performance data. In some embodiments, thermostat 600 uses historical data to determine that a system was previously able to reach a setpoint, but is now unable to do so. In some embodiments, thermostat 600 monitors the time it takes the system to reach a setpoint and compares it to a threshold time. For example, if a system that historically takes 15 minutes to reach 65 degrees Fahrenheit when the temperature is 70 degrees Fahrenheit takes 30 minutes to reach 65 degrees Fahrenheit, the thermostat 600 can identify a decrease in performance. In some embodiments, thermostat 600 determines a new setpoint such that the time required to reach the setpoint is equal or less than the threshold time. This decrease in performance may be due to degradation of components in the system, and thermostat 600 may display a prompt telling the user that a piece of equipment may be broken or damaged. Thermostat 600 may ask a user if they would like to call their dealer or a technician to have the system repaired. In some embodiments, thermostat 600 does not reach the setpoint due to weather conditions and operating limitations of the equipment. In some embodiments, thermostat 600 serves a notification to the user that the setpoint is unattainable.

Thermostat 600 may be able to offer an alternative when the setpoint cannot be reached. In some embodiments, analytics service 2504 may be able to find a solution in which the system can sacrifice certain parameters in order to achieve the user's desired setting. For example, thermostat 600 may be able to achieve the specified setting, if the user is willing to pay more in electricity, decrease the lifespan of components, wait for a longer period of time, or turn off another appliance. It is understood that there are other tradeoffs which could be made to achieve a desired thermostat setting. The choice is offered to the user, who will then be able to decide between energy saved and time lost.

Thermostat 600 may display the appropriate setpoint limit depending on whether a user is decreasing the setpoint (the minimum) or increasing the setpoint (the maximum). In some embodiments, thermostat 600 is able to detect when to show the setpoint limit, depending the user's commands. For example, if a user is repeatedly inputting commands at user interface 612 of thermostat 600, thermostat 600 may display the setpoint limit. In other embodiments, thermostat 600 may go directly to the limit after predetermined conditions have been met. For example, if a user is inputting commands at user interface 612 of thermostat 600 and holds down a button for a certain amount of time, thermostat 600 may interpret the input as a command to set the system to the respective limit. In some embodiments, if a system is already at its limit when a user tries to command the system to move farther in the direction of the extreme, thermostat 600 may display a notification on display 802 to inform the user that the system is already at its limit, and that their request cannot be fulfilled under the current conditions.

Thermostat 600 may be able to show a user the efficiency or comfort consequences of their commands. Thermostat 600 may receive a command on a hot day to condition a home to 2° F. lower than it currently is. Thermostat 600 may transmit the current operating conditions and the command to analytics service 2504. Analytics service 2504 may determine, from current operation conditions, feedback from the equipment, and historical data, the additional costs associated with the 2° F. decrease as well as the additional energy used based on billing history associated with the home, billing data of similar systems connected to the network, and algorithms for determining energy consumption. Thermostat 600 may be able to perform these calculations for any increase, decrease, or lack of change in the setpoint. The calculated energy consumption and additional costs may be used by analytics service 2504 to provide suggestions to users about their usage behavior. For example, thermostat 600 may display a message explaining that turning up the setpoint on a hot day by 2° F. may save a user as much as $3.00 that day. Thermostat 600 may provide tips for conserving energy such as reducing load by turning off high-energy devices such as dryers, or by better insulating the home by closing windows. Thermostat 600 may provide suggestions of energy or money saving features not recently used.

Analytics service 2504 may be able to determine from comparing current performance with historical performance whether a piece of equipment is functioning correctly. For example, analytics service 2504 may determine that if a connected unit is malfunctioning, analytics service 2504 may transmit an error code to thermostat 600, which then displays an error code to the user. In some embodiments, thermostat 600 may display the error code on display 802. In other embodiments, thermostat 600 may display the error code on a user's device 1502 or in a web-based application connected to the system.

If a fault is detected, standard staging progressions or operating procedures may be altered to provide the best experience for the user. For example, an AC unit may normally transition from stage to stage without skipping stages. If thermostat 600 has detected that a fault has occurred somewhere within the system, thermostat 600 may command the compressor to skip the lower stages and go straight to the upper stages in order to maintain performance. In another example, thermostat 600 may receive information from the flow system that a pipe has been clogged somewhere in the system, and that airflow has been greatly diminished. In order to maintain performance, thermostat 600 may command an increase in airflow to compensate for the blockage.

Thermostat 600 may alter staging, airflow, or other system parameters based on historical performance. In some embodiments, analytics service 2504 may search through historical data to find periods of operation which match conditions and select the settings and commands which produced the most desirable result according to the user's preferences.

Thermostat 600 may alter staging progressions or other operating parameters based on other factors, such as weather conditions and forecasts. Thermostat 600 may be able to receive weather information from a weather service, the network, or a device with which thermostat 600 can directly or indirectly communicate. In some embodiments, thermostat 600 is able to receive a weather forecast and make operating decisions based on that forecast. For example, thermostat 600 may receive information one balmy night that the next morning will be below freezing. Thermostat 600 may command the system to go to 100% operating power without transitioning through lower stages. In some embodiments, thermostat 600 may change the setpoint from the user defined setpoint using the weather information received.

Thermostat 600 may alter staging progressions or other operating parameters based on factors such as user demand or level of activity. In some embodiments, thermostat 600 adjusts operating parameters when a user commands a sudden and significant change in temperature. For example: it is below freezing outside and a user has returned home after vacation; the HVAC system is suddenly powered on and commanded to heat the home to 72° F.; thermostat 600 commands all equipment to operate at maximum capacity in order to reach the setpoint as soon as possible. In other embodiments, thermostat 600 detects the level of occupancy and activity, and adjusts operating parameters accordingly. For example: there is a party in the home and there are many people dancing; thermostat 600 detects the high level of occupancy and activity and commands all equipment to operate at maximum capacity in order to maintain the setpoint. It is understood that thermostat 600 may detect that there is low or no occupancy or activity and adjust operating conditions accordingly. For example, thermostat 600 may detect that there is little activity and command equipment to operate at low capacity and as efficiently as possible. In some embodiments, thermostat 600 may detect that there is no occupancy and that the outside conditions are acceptable and turn off all equipment in order to save energy.

Thermostat UI Features, Integration, Branding, and Social Media

UI Features

Referring again to FIG. 8, thermostat 600 is shown to have a display 802, and a frame 804. Display 802 and frame 804 may both be touch-sensitive, and accept user input as commands to thermostat 600.

Figure 27:
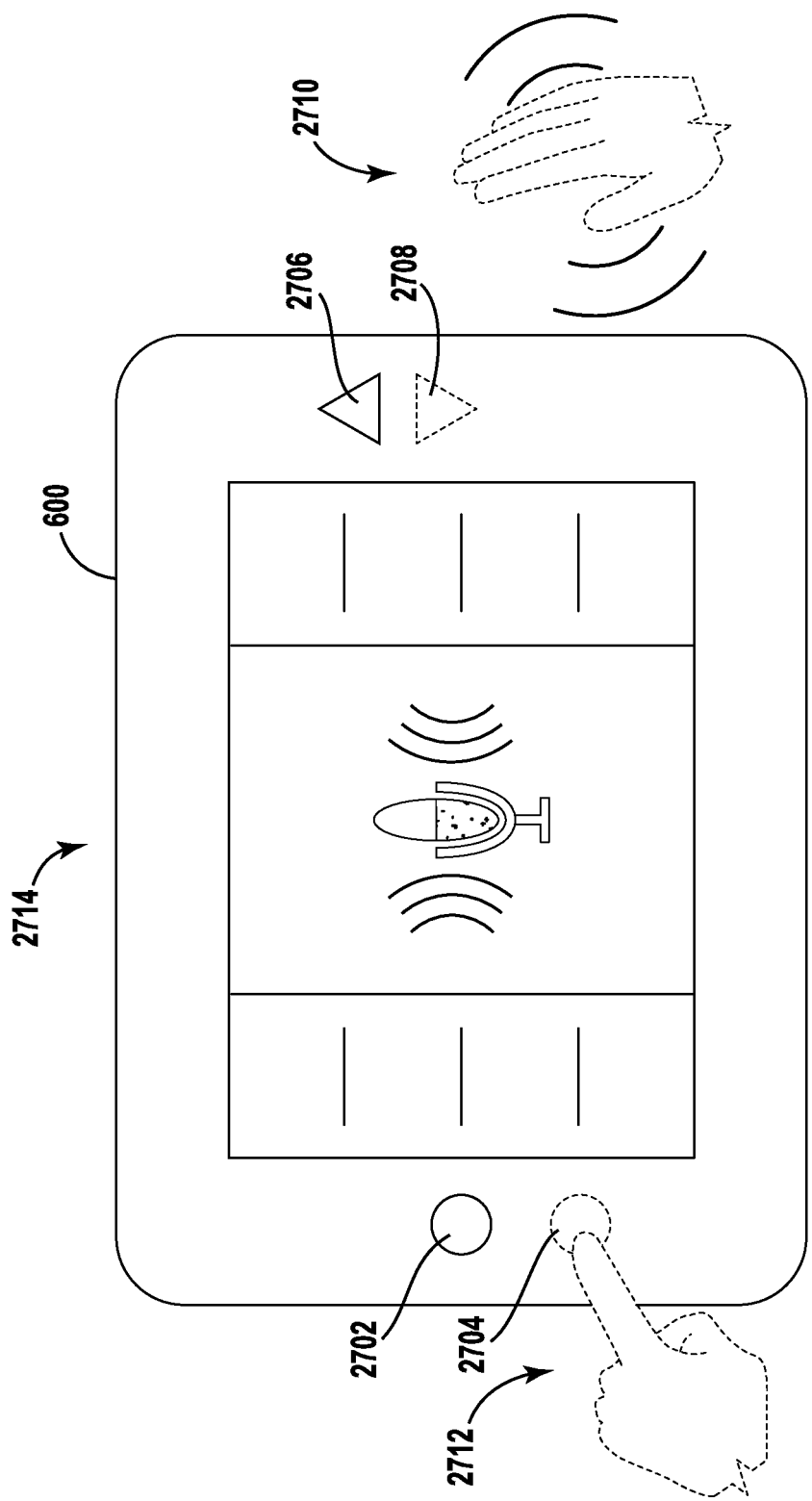
FIG. 27 is a drawing of various methods which a user may use to provide input to a thermostat according to an exemplary embodiment.

Referring now to FIG. 27, a variety of ways to provide input to thermostat 600 are shown. Buttons 2702, 2704, 2706, and 2708 may be embodiments of buttons 806-812. Buttons 2704 and 2708 are shown in dashed outlines to clarify that they are not visible or physical buttons. Buttons 2702 and 2706 are shown in solid outlines, and are an exemplary embodiment of buttons printed on and defined by a physical skin. In some embodiments, hidden buttons are placed around frame 804. Having the option of providing input through the frame allows users to control thermostat 600 without obscuring display 802. In some embodiments, users are able to provide a direct touch to buttons 2704 and 2708 in the form of a button push and/or button tap. In some embodiments, users are able to provide input in the form of touch movement on frame 804. For example, a user may be able to swipe up or down to scroll, or left or right to move through screens. Input method 2712 is an exemplary method of interaction with the touch-sensitive buttons on frame 804. Thermostat 600 may recognize voice commands. Input method 2714 is an exemplary method of interacting with thermostat 600 via voice commands. Thermostat 600 may recognize input through the use of sensors 602-606. One of sensors 602-606 may be a camera, an IR sensor, a microphone, a capacitive sensor, or any other conceivable sensor. In some embodiments, sensors 602-606 are embodied as a microphone and voice recognition module 716 of memory 704 processes input locally. In other embodiments, the voice input may be sent to network 2422 and processed by a separate module. In some embodiments, a user gives voice commands to their personal device 1502 which processes the input and transmits the command to thermostat 600. Thermostat 600 may be programmed with a specific voice command that will not be commonly or accidentally said to enter dealer or advanced mode. For example, the phrase "advanced dealer mode 23" may be said to enter dealer mode when making a house call.

Thermostat 600 may recognize gesture controls through the use of sensors 602-606. For example, a user may perform a certain gesture to indicate returning to the menu, increasing the temperature, decreasing the temperature, or locking thermostat 600. Many types of gestures of varying complexity may be accepted as input to thermostat 600. For example, a user may swipe up or down to scroll. In some embodiments, gesture input is processed locally by a memory module gesture processor. In other embodiments, gesture input is received by thermostat 600 and sent to a processor connected to the network. The command is then transmitted to thermostat 600. In some embodiments, a specific gesture may put thermostat 600 in dealer or advanced mode. For example, an uncommon gesture such as making two circles may be used by a dealer when making a house call to put thermostat 600 into dealer mode.

Users may add customizable skins to thermostat 600 to alter its functionality and appearance. Skins may be physical appliques similar to stickers, or they may be a certain selection of settings. In some embodiments, skins have buttons printed in various locations. In some embodiments, the buttons are circles, squares, arrows or any other shape. In some embodiments, the buttons are customized images such as a dealer logo. In some embodiments, the buttons are custom images created by a user. Skins may transmit the location of these buttons relative to frame 804 such that a touch of the button on the skin will register as an input associated with that location on frame 804. Users can design their own skins with their preferred button placement to apply to thermostat 600. In some embodiments, users may use an application (web-based, mobile application, or otherwise) or user interface 612 of thermostat 600 to define button placement on the frame and generate a digital file of a design for the customized skin. In some embodiments, the web-based application and/or the mobile application communicate with thermostat 600 via a network (e.g. the Internet) through data communications interface 610. The web-based application and/or the mobile application can communicate the location of buttons to thermostat 600. Users may be able to define the functionality of buttons on the frame. In some embodiments, user created skins may be printed out by sending the digital file of the customized skin to a dealer. In other embodiments, custom skins can be sent to the manufacturer (e.g., Johnson Controls Inc.) to be printed. Skins may be created and applied to thermostat 600 prior to delivery. In some embodiments, users may design their own skin for thermostat 600 at the time of ordering. For example, Jack may wish to purchase a thermostat 600 for their grandmother who cannot see very well and does not want to use every feature of thermostat 600; he creates a skin with large, clearly printed buttons and simplified menus when ordering thermostat 600. In other embodiments, skins are created for dealers and applied prior to sale. Dealer created skins may include a dealer's logo, custom button configurations, unique settings, and contact information. For example, a dealer may program their information in as the contact when a fault requiring repair occurs.

Skins may easily be shared over social media. Users may post designs for physical skins as well as the actual configuration skin. In some embodiments, other users can select skins to try on their respective thermostat 600. Users may share results of their detailed energy usage reports to foster a sense of competition and to encourage others to be conscious of their energy usage. For example, a user may post their new configuration skin with the message "Went up by 1 degree and saved $5 this month! #1degreeatatime #jci #savingtheworld #fahrenheit #imperialsystem4ever."

Many screens are available within user interface 612 which allow the user to control and interact with thermostat 600. In some embodiments, thermostat 600 is able to learn from user input and behavior. Thermostat 600 may store frequency of screen visits, and automatically open to the most viewed screen. Thermostat 600 may allow users to select their favorite screen to be displayed first whenever user interface 612 is viewed. Buttons 806-812 can be used to interact with display 802. In some embodiments, editing the placement of the buttons and the set-up of the screens shown on display 802 can be done through an application on thermostat 600 or user device 1502.

Figure 28:
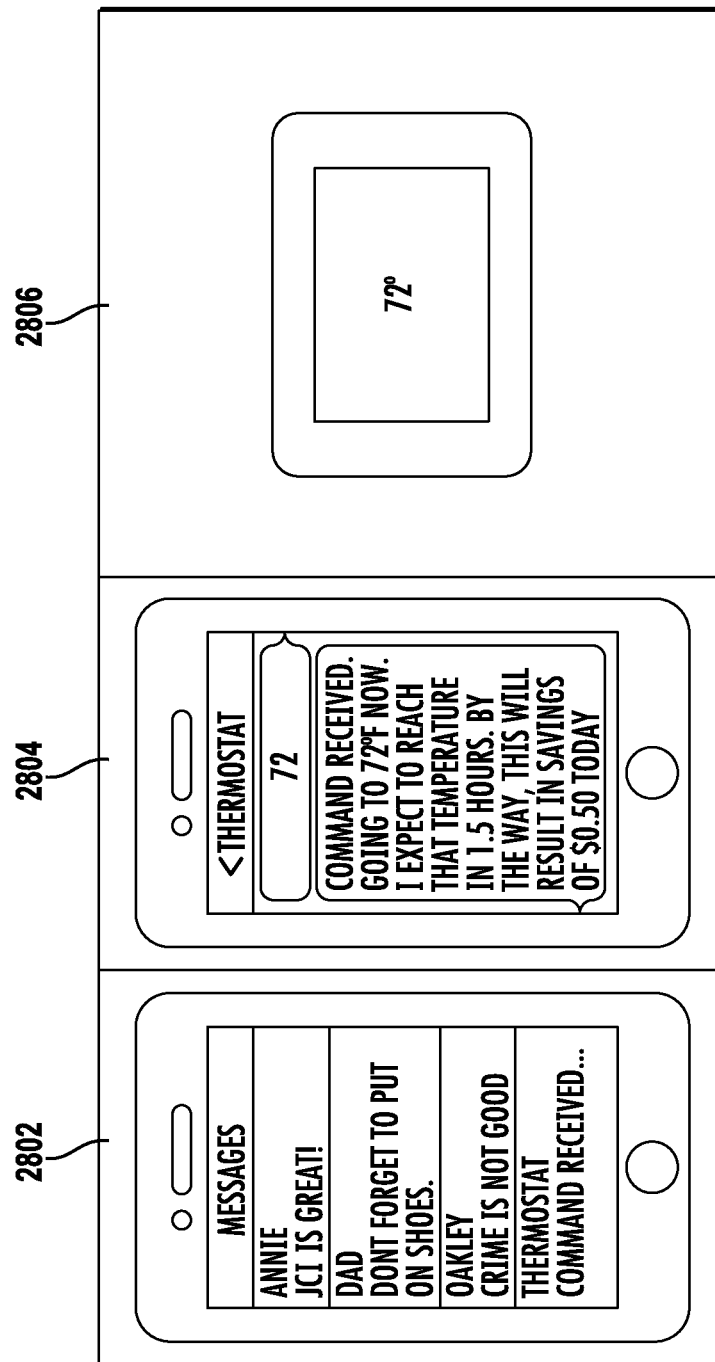
FIG. 28 is a drawing of a process in which a thermostat receives a command from a user through text message according to an exemplary embodiment.

Referring now to FIG. 28, an exemplary process 2800 of controlling thermostat 600 by sending it text messages is shown. Thermostat 600 may have its own unique number at which it can receive messages through the cellular network. In step 2802, a user opens the messaging app of their cellphone and selects thermostat 600. In step 2804, a user sends thermostat 600 the message "72" and thermostat 600 acknowledges. Depending on the settings selected by the user, thermostat 600 will interpret the number received as either degrees Fahrenheit or degrees Celsius. In some embodiments, thermostat 600 will be able to detect, based on which user is sending the command, which units are being specified. Thermostat 600 may determine that the command received is either degrees Fahrenheit or degrees Celsius based on predetermined limits, as there is little chance that a user would like for their home to 25° F. or 72° C. In step 2806, thermostat 600 adjusts operation in accordance with the target temperature received in the previous step. Thermostat 600 may receive commands from any source. It is contemplated that thermostat 600 may receive commands from an email, a phone call, a video message, a social media message, or any other form of communication.

Figure 29:
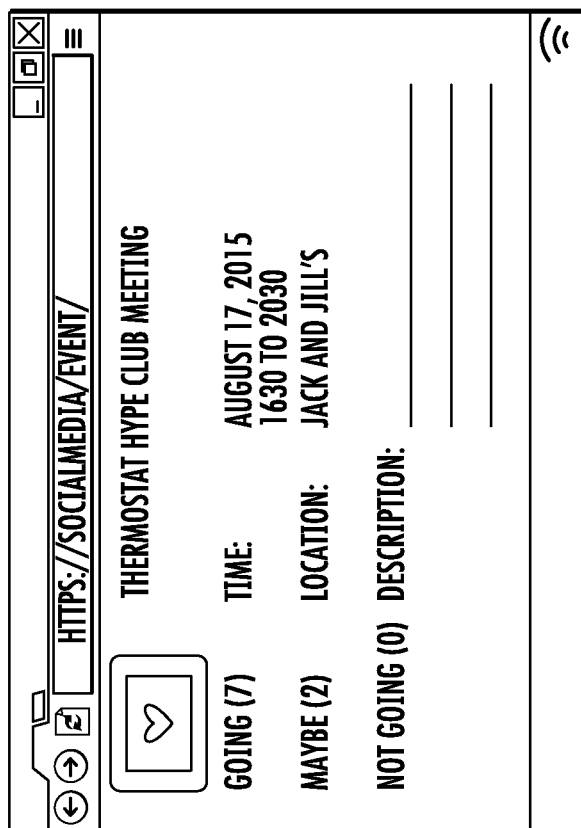
FIG. 29 is a drawing of a method which a thermostat may utilize social media to determine occupancy according to an exemplary embodiment.
Figure 29:
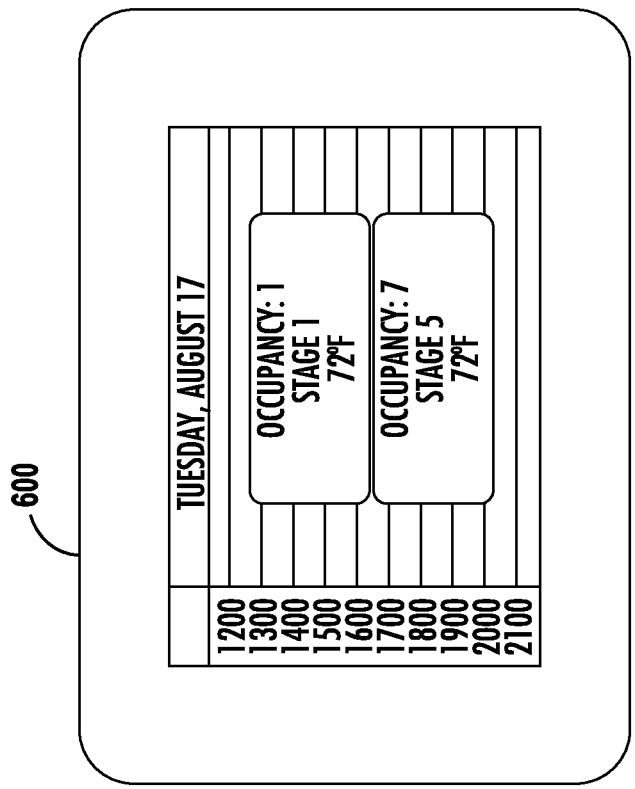

Referring now to FIG. 29, thermostat 600 may connect to social media to gather event data and adjust scheduling accordingly. Thermostat 600 may determine that a user will not be home because they will be at an event at a location which is not home and reduce conditioning to operate more efficiently until it is anticipated that the user will return home. For example, a user may accept an invitation to a dinner at a restaurant from 1900 until 2200 one evening. Thermostat 600 may reduce conditioning at 1900 and, depending on the expected time to the setpoint at which the user left the home, may begin to increase conditioning an appropriate amount of time prior to 2200. In some embodiments, thermostat 600 may determine that an event is occurring at home and adjust scheduling and occupancy accordingly. For example, FIG. 29 shows that seven people are attending a hype club for Thermostat (possibly thermostat 600) at Jack and Jill's house. Thermostat 600 determines that Jack and Jill's house is home, and that occupancy will be seven people on August $17^{th}$ from 1630 to 2030. Thermostat 600 will adjust conditioning, scheduling, and occupancy on August $17^{th}$ to accommodate the high occupancy and the scheduled event so that the home will be conditioned by the time the event starts. There are situations in which a user may wish to delay scheduled events or the programmed schedule for thermostat 600. In some embodiments, thermostat 600 may communicate with a user's calendar application or clock application so that when the user chooses to "snooze", thermostat 600 will delay scheduling by the amount that the snooze is set for. For example, if thermostat 600 is scheduled to reduce heating when Jack is at work from 0900 until 1700 on a winter day, but Jack has a late morning meeting he would like to get more sleep for, he can hit snooze for 30 minutes in the alarm app on his phone and rest easy knowing that thermostat 600 will not suddenly leave him freezing while he is getting ready.

Integration of Other Systems/Cloud

As shown in FIG. 24, thermostat 600 is capable of communicating with many devices. Thermostat 600 may receive data from various sensors around the home to use when making operating decisions. Thermostat 600 may be able to determine occupancy without the use of an integrated sensor if sensors in places such as windows and doors are installed and connected to thermostat 600 or the network. For example, thermostat 600 may determine that the home is occupied upon activation of the front door sensor and begin conditioning the home based on the master user's preferences. Thermostat 600 may detect that a window or door is open and display a message on display 802 or in some embodiments on device 1502 warning a user that a window or door is open and may cause an increase in energy consumption and a decrease in efficiency. Thermostat 600 may also determine that the home is no longer occupied upon a second activation of the front door sensor and begin reducing conditioning of the home. It is understood that more sophisticated algorithms for determining occupancy may be used to prevent issues such as a guest entering a home, letting a pet outside, or other such situations. Thermostat 600 may communicate with users' personal devices, such as cellphones, heartrate trackers, fitness trackers, or any of a variety of personal devices. In one embodiment, thermostat 600 may determine level of activity based on information from a user's heartrate or fitness tracker and adjust conditions accordingly.

Thermostat 600 may have control over other systems in the home, such as the lighting system or the security system. In some embodiments, when occupancy is detected, thermostat 600 may turn on lights where a user is determined to be. For example, if Jill comes home, checks in, and proceeds to her bedroom, thermostat 600 may turn on the lights on the way from the door to Jill's bedroom. In other embodiments, thermostat 600 may be able to turn off lights when occupancy is no longer detected. Thermostat 600 may enable the security system when occupancy is no longer detected. For example, if Jack leaves for work but forgets to set the alarm, thermostat 600 may arm the security system after failing to detect occupancy in the entire home for 30 minutes. In some embodiments, thermostat 600 may be able to disarm the security system if occupancy is detected. For example, if Jill comes home and checks in, thermostat 600 may disarm the security system. It is understood that more sophisticated algorithms may be used to prevent issues associated with the turning on of lights in rooms where a user may be sleeping or enabling the alarm system while users are still home. Thermostat 600 may be able to control systems such as blinds, windows, and doors. Thermostat 600 may be able to draw blinds or close doors or windows when occupancy changes, or in order to improve efficiency or performance of the system.

Thermostat 600 may receive data from a weather service, as mentioned previously. In some embodiments, thermostat 600 may show the forecast on display 802. Thermostat 600 may be able to send the forecast to a user's phone on a schedule or upon check-in with thermostat 600.

Thermostat 600 may communicate with commercial storage solutions such as Dropbox, Google Docs, or Amazon Cloud. Thermostat 600 may store data in such places in order to record trends and make data and analytic reports more accessible to users. Storing data in places other than local memory will also reduce the cost of thermostat 600 as a unit and promote sales.

Thermostat 600 may communicate with the network to receive firmware updates. In some embodiments, the firmware updates are for connected equipment. For example, thermostat 600 may receive a notification that the AC unit has an available firmware update. Thermostat 600 may show a prompt on display 802 with a message such as: "A firmware update is available for your AC unit. Would you like to call your dealer to schedule a home visit?"

Thermostat 600 may communicate with a user's utility provider. System performance data may be integrated with utility data in order to monitor a home's level of energy usage and inform users of their usage habits.

Branding

The appearance of thermostat 600 can easily be changed to a dealer or end user's preference. This flexibility provides many opportunities for marketing and promotion of a brand. Dealers may choose to use custom branding in order to familiarize consumers with their business. Dealers may be provided with skin templates to choose from which will change the user interface or the physical appearance of thermostat 600; these skin templates may be further customizable. For example, dealers may be presented with three or four skin templates for the user interface of thermostat 600.

An application may allow a dealer to customize the color scheme of his chosen template. In some embodiments, this application is a stand-alone application to be accessed through a computing device such as a laptop or smartphone. In other embodiments, this application is a web-based application which may be accessed through any network connection. Dealers may be able to customize the fonts used in the user interface or on the physical skin. In some embodiments, dealers may choose from a selection of chosen font pairs which go well together. In some embodiments, the skin created with such a branding design tool may be applied, prior to sale, to all thermostats a dealer sells. In some embodiments, thermostat 600 is branded at installation. In some embodiments, a skin template may be available which is tailored to meet the Americans with Disabilities Act (ADA) specifications. Color schemes, font size and choice and animations may be customized to meet ADA specifications. Features such as ADA compliant sounds or other feedback may be made available through the branding tool. Dealers may wish to use a more subtle method of branding; for example, using only the logo or icon without the brand name attached.

As shown in FIG. 22A, a dealer can program their contact information into thermostat 600 to be made available to an end user whenever service or advice is needed or maintenance is required. In some embodiments, dealers may choose to customize a physical skin which will provide a button for a user to press which will call the dealer when pressed. The call may be placed as a Voice over Internet Protocol call. In some embodiments, thermostat 600 will communicate with the user's cellphone and automatically place the call.

Figure 30:
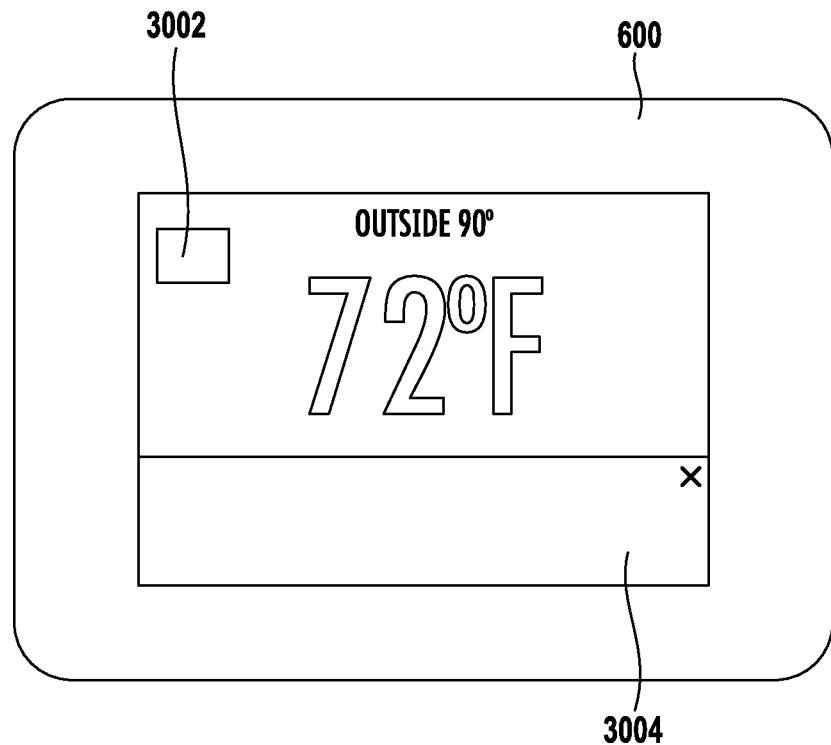
FIG. 30 is a drawing of a thermostat and its user interface through which a brand may promote itself according to an exemplary embodiment.

Referring now to FIG. 30, thermostat 600 may include unobtrusive dealer specified content on certain screens. In some embodiments, this may include an RSS feed of the dealer's website to keep the end user apprised of activity relating to the dealer. For example, thermostat 600 may include a news screen at the bottom of which exists a window which shows an RSS of a dealer's website. In other embodiments, this may include advertisements for dealer services and specials in which an end user has indicated an interest. Advertisements for partner companies and services may also be shown. In some embodiments, advertisement selection may be based on information made available to thermostat 600. For example, if a user has no events schedule and it is a hot summer day, advertisements for a water park owned by a partner company may be selected for display to that user. In one embodiment, advertisements may be based on events scheduled for the user; for example, advertisements for partnered hotels may be selected if a user is scheduled to travel.

Thermostat 600 may communicate with the network, and as such, may be updated remotely. In some embodiments, changes to a skin may be made after purchase. For example, a user may purchase thermostat 600 from a dealer who is then bought out. The new dealer may decide to rebrand thermostat 600 so that end users have updated contact information on hand for when they need assistance. The updated information also brings more awareness to the new owners, possibly generating more revenue.

Figure 31:
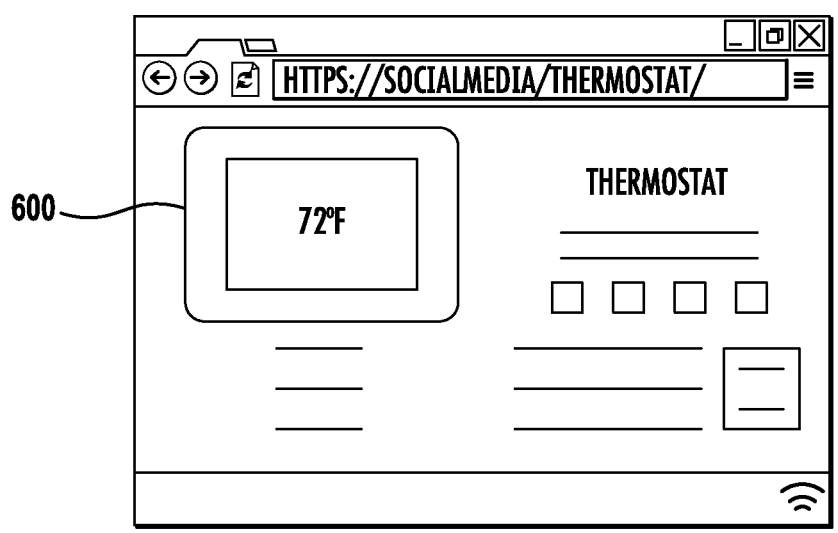
FIG. 31 is a drawing of the social media presence of a thermostat according to an exemplary embodiment.

Referring now to FIG. 31, thermostat 600 is shown to have a social media presence. Thermostat 600 may have social media profiles on different social media networks. In some embodiments, users may choose to post reviews, comments, skins, and settings for thermostat 600.

Thermostat 600 may include the Johnson Controls Inc. logo in all skins, settings, and configurations. The new slogan of Johnson Controls Inc. may be incorporated and featured in order to highlight changes and refresh impressions of the brand in a user's mind.

Thermostat 600 may communicate valuable data and feedback to a dealer. Thermostat may record and report how many service calls were provided or how many home visits were saved as a result of thermostat 600's features. Thermostat 600 may provide a dealer with analysis of increased revenue and business as a result of thermostat 600. For example, each thermostat installed reports data which is aggregated by a revenue analyzer connected to the network. At the end of the fiscal year, a report is transmitted to the dealer detailing the revenue generated as a result of thermostat 600. The report may highlight that as a result of advertisements and direct dealer contact information made available by thermostat 600, 1000 more customers have been reached per month—an estimated $100,000 increase in revenue.

In some embodiments, thermostat 600 may automate maintenance scheduling and consumables ordering. For example, filters may be ordered from the dealer automatically and delivered to a user when a filter change is needed. Thermostat 600 may prompt the user to call their dealer and schedule a maintenance appointment if the user wishes. In some embodiments, thermostat 600 may notify a user that it is time to schedule a maintenance appointment or to order consumables, giving users control over whether they wish to make any purchases or appointments.

Thermostat 600 may analyze a dealer's revenue and provide information and feedback targeted to improving performance and generating more business. For example, each thermostat installed by a particular dealer transmits dealer-relevant data to the network to be analyzed by a dealer performance analyzer. The results, showing that his customer base has not expanded in the last year, are sent to the dealer. The performance analyzer has discovered that the dealer has not been entering his contact information or using customized skins advertising his brand.

Algorithms/Analytics

Processing of data is done by memory module analytics service 2504. In some embodiments, thermostat 600 sends the data to be analyzed to the network, which transmits the data to a data analyzer 712 remote from thermostat 600. Thermostat 600 may receive input from a user to determine what analysis or algorithm is applied to the data or to a controller for a connected component.

Figure 32:
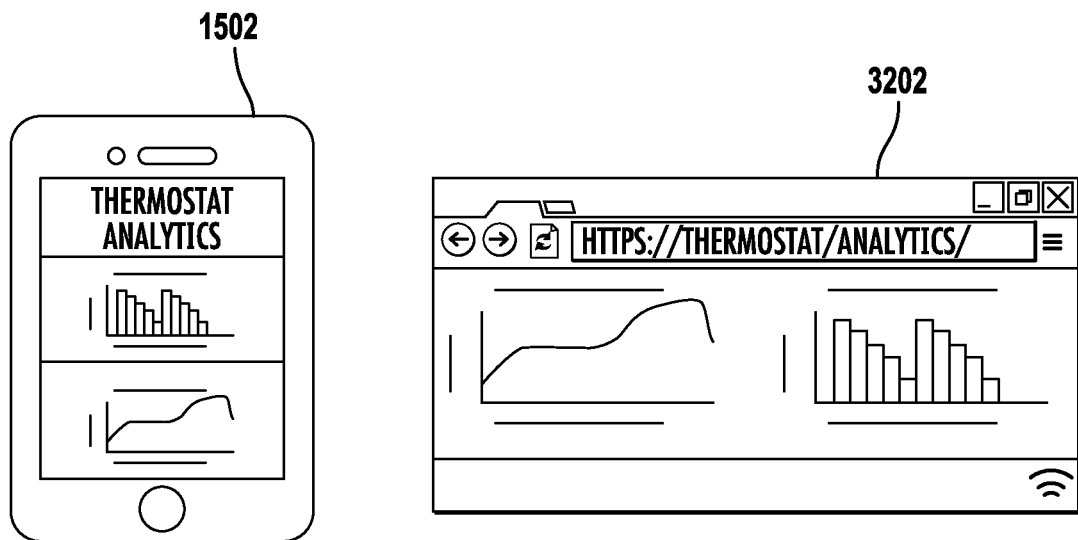
FIG. 32 is a drawing of the analytics a thermostat may provide according to an exemplary embodiment.

Referring now to FIG. 32, thermostat 600 is able to graph power usage of a home. Thermostat 600 may process data periodically in order to display results instantaneously when requested by a user. Thermostat 600 may filter data based on user inputs, or thermostat 600 may offer several predetermined filters. In one embodiment, thermostat 600 is able to determine and display system energy usage per compressor stage, fan speed, or any quantifiable metric, allowing a user to make informed decisions regarding her energy usage habits. For example, thermostat 600 may analyze data from the past month and report that Jill has been using 20% more energy by setting the compressor to run in stage 3 instead of stage 2. This increase in energy over the 10 days the system has been at stage 3 has resulted in a net increase of $5 over Jill's standard energy bill. With this information, Jill may decide whether she prefers efficiency or comfort, and adjust (or not) her usage accordingly.

Referring again to FIG. 32, thermostat 600 is able to compare one home's energy usage with another home of similar size and setup. For example, thermostat 600 may identify homes of similar square footage and equipment configuration which are located in a similar climate for comparison with the home it belongs to. In some embodiments, users may elect to view comparisons of their usage with that of a dissimilar home. For example, users may wish to estimate their energy usage with an addition to their current home or in a new home they plan to buy.

Figure 33:
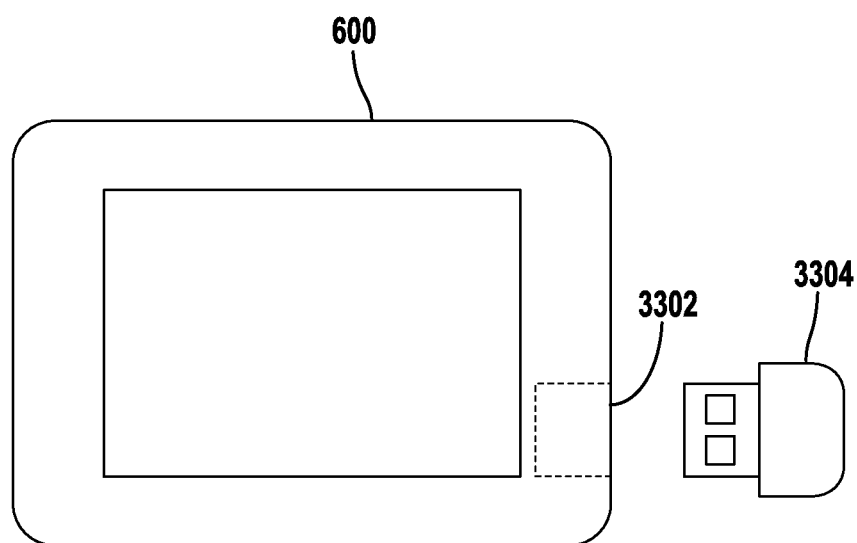
FIG. 33 is a drawing of a thermostat and an external accessory according to an exemplary embodiment.

Referring now to FIG. 33, thermostat 600 may be compatible with external accessories. Thermostat 600 is shown to include port 3302. Thermostat 600 may contain multiple ports. Port 3302 may be compatible with USB, Thunderbolt, HDMI, Ethernet, 3.5 mm, or any other communications standards, and may be used to communicate tabulated, visual, audio, or any other type of data. FIG. 33 is shown to include external accessory 3304. In one embodiment, external accessory 3304 is exclusively compatible with thermostat 600. In some embodiments, external accessory 3304 is compatible with a variable of devices, and can transfer data between thermostat 600 and another device compatible with external accessory 3304. For example, external accessory is a USB dongle which can store data to be analyzed from thermostat 600 and transfer the data to a laptop. The results of the analysis, including any visual representations, may be transferred to thermostat 600 for display. In some embodiments, external accessory 3304 is able to communicate with user device 1502 and may be used during installation for troubleshooting. For example, external accessory 3304 may be a phone dongle which assists a technician in troubleshooting wiring installation such as a Cat5e tester.

In some embodiments, thermostat 600 is able to analyze data transferred from another source through external accessory 3304 and generate a report for display. For example, thermostat 600 may receive billing data from external accessory 3304 and integrate billing data with usage and operational data to generate a report correlating a user's usage habits and behavior with their energy cost. External accessory 3304 may provide additional capabilities to thermostat 600. External accessory 3304 may contain a data analyzer 712 or a data mapping module. In some embodiments, external accessory 3304 contains communications means which thermostat 600 does not otherwise have. For example, thermostat 600 may only have communications electronics which are configured for Bluetooth communications. External accessory 3304 contains communications electronics which allow thermostat 600 to communicate over WiFi, expanding the network of devices and applications with which thermostat 600 can interact. In one embodiment, a previous model of thermostat may be retrofit with external accessory 3304 to gain functionality of features of thermostat 600.

Thermostat 600 may analyze system performance to determine and monitor system health. Thermostat 600 may compare current performance with historical data to determine whether each piece of equipment or component of the system is fully functional. For example, thermostat 600 can log the energy usage of HVAC equipment. Thermostat 600 can identify the current energy usage of the HVAC equipment and compare the current energy usage of the HVAC equipment to the historical energy usage of the HVAC equipment. In another example, thermostat 600 may find that the compressor has been on the same stage for a week, but system performance has decreased in the past two hours. Thermostat 600 may determine that the compressor is no longer functioning correctly, and prompt the user to call the dealer to schedule an appointment. Thermostat 600 may be able to provide an estimate of the lifetime of consumables based on historical service and operating condition data. For example, thermostat 600 may estimate that the air filter will need to be replaced in 10 days due to records that it had last been replaced 40 days ago during a service call, and that the system is operating at high capacity because it is summer. Thermostat 600 may prompt the user to order a new filter, automatically order a new filter, or ask the user if he would like to schedule a maintenance appointment.

Thermostat 600 is able to provide tips and suggestions to users based on analysis of their usage and habits. Thermostat 600 may allow users to input preferences with regards to efficiency or comfort. Thermostat 600 may allow users to input a target energy bill amount. With these guidelines, thermostat 600 may be able to suggest setpoints within a reasonable range of a user's current setpoint which may help the user to achieve their goal payment. For example: Jack wishes to reduce his monthly electricity bill from $300 to $250. It is August, and Jack currently sets his thermostat to 66° F. Thermostat 600 may analyze billing data and system performance from the past two Augusts to determine and propose a new setpoint. Thermostat 600 may suggest to Jack that moving the setpoint up by just two degrees to 68° F. may lower his electricity bill to $275, and that moving the setpoint up to 70° F. may allow him to reduce his electricity bill to $250. This situation gives Jack options and provides a middle ground choice if he wants to make a compromise.

Thermostat 600 may give users tips based generally on their indication of preference for either comfort or efficiency. In some embodiments, thermostat 600 may be able to draw from a preformed pool of general tips relating to either increased user comfort or increased energy efficiency. This prepopulated source of tips allow thermostat 600 to quickly provide simple tips to a user. For example, if Jill has indicated that she prefers efficiency to comfort, thermostat 600 may periodically display tips for reducing energy usage, such as raising the setpoint on a hot day, closing the windows when running the conditioning system, or choosing conservative stage progressions for a compressor. It is understood that many other tips may be given, and that tips of similar weight are given for users who indicate a preference for comfort. In some embodiments, general tips may be correlated with actions a user is currently taking. For example, if a user, who has indicated a preference for efficiency, is lowering the setpoint on a hot day, thermostat 600 may display a prompt informing the user that their current course of action will result in a decrease in energy efficiency.

Thermostat 600 may offer suggestions to a user based on his history of energy consumption and system settings. For example, thermostat 600 may analyze Jack's energy consumption from the past year, as well as his operational settings. He has increased fan speed, increasing energy usage, but has not seen any changes in performance. Thermostat 600 may alert Jack that he can reduce his energy usage without sacrificing comfort.

Thermostat 600 settings may be shared with other users. In one embodiment, thermostat 600 may communicate with other thermostats connected to the network to find similar homes with similar settings. When system with settings that match closely to that with which thermostat 600 is associated is found, and that system is performing better in the area of a user's preference, either efficiency or comfort, thermostat 600 may suggest changing current settings to match those of the other system exactly.

Thermostat 600 may be able to provide a user with a suggested operation procedure or stage progression based on the cost determined per stage as well as the estimated time to reach a setpoint. In one embodiment, a user indicates her preference for comfort, and thermostat 600 offers staging suggestions based on her calculated cost per stage to increase efficiency. Staging suggestions include which stages to proceed to or to skip, and how long it will take for the system to reach the setpoint. Several options with varying total times and energy consumption may be offered.

Thermostat 600 may analyze the performance of a system and make recommendations to assist a user in meeting their goals and maintaining functionality of their system. In some embodiments, thermostat 600 may offer a suggestion on whether a home should run on gas or electricity. In other embodiments, thermostat 600 may communicate with a user maintenance portal. The maintenance portal may be a web-based application or a stand-alone application. The maintenance portal allows users to schedule seasonal check-ups and make appointments for house calls. Memory 704 of thermostat 600 may contain a schedule analyzer. The schedule analyzer may select time slots during which a user is not scheduled for any events and suggest those time slots as appointment times in the maintenance portal. In some embodiments, the maintenance portal automatically creates reminders for necessary maintenance based on service records. In other embodiments, users create reminders to schedule maintenance and review service records. Thermostat 600 may determine that a piece of equipment is running for a longer amount of time than usual to achieve the same results. In some embodiments, thermostat 600 may suggest to a user that the equipment may need repairs in order to increase efficiency and comfort, and offer to call the dealer.

Thermostat 600 provides many opportunities for partnerships over social media platforms. Thermostat 600 may allow users to command changes from social media posts. For example: Jill tweets privately at thermostat 600: @thermostat10072, and thermostat 600 tweets back: @jillandjack Command received. Thermostat 600 may have a unique Twitter handle. It is understood that any social media platform may be used to post changes to thermostat 600. In some embodiments, thermostat 600 may allow actions specific to a social media platform to command changes. For example: Jack likes system settings for a thermostat which Jill has posted on Facebook. Thermostat 600 detects this action and applies the settings. In some embodiments, companies or dealers may promote well-tested and popular settings for users to try in order to increase traffic to their website or related products. In some embodiments, partnered companies may create skins for users to download or purchase and apply. For example: a fitness tracker manufacturer may create a health-centric skin which collects data from a connected fitness tracker and provides tips and suggestions for healthy living.

Figure 34:
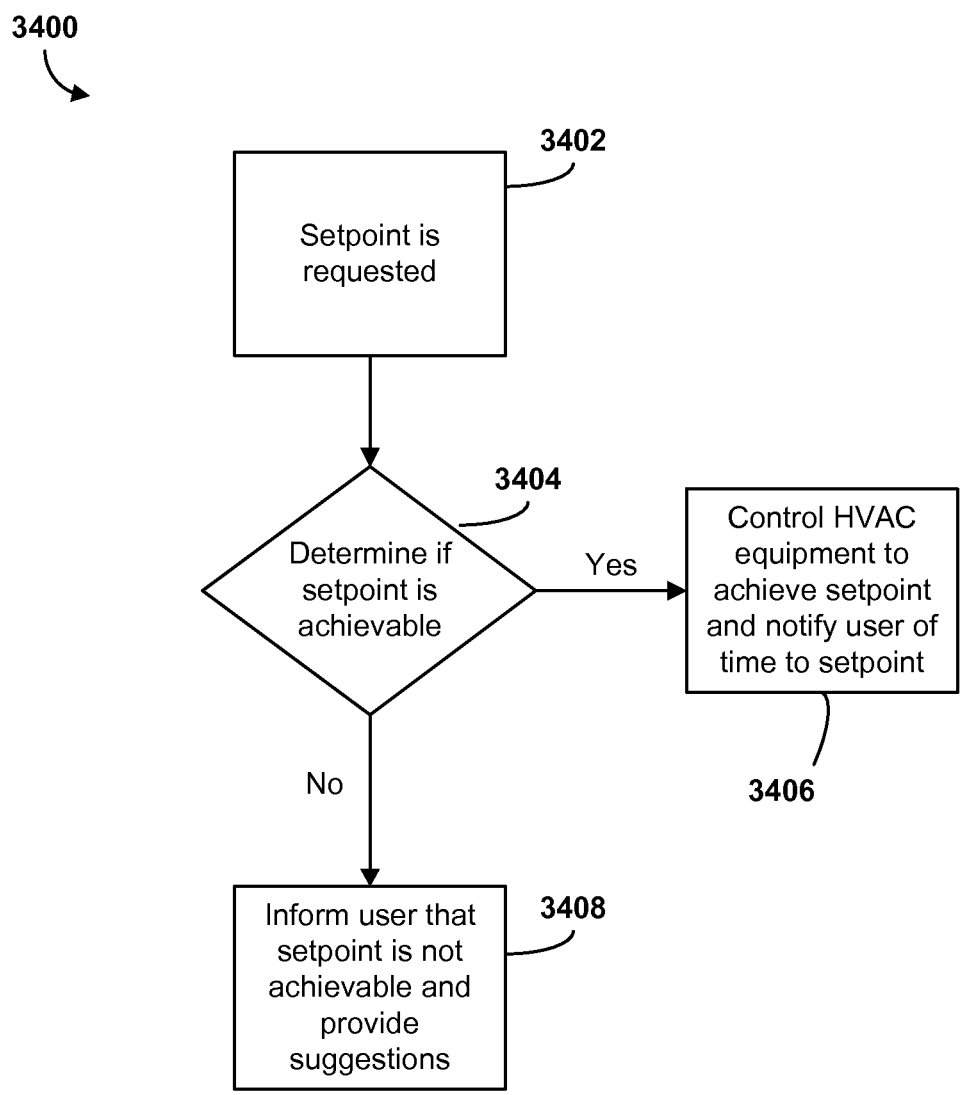
FIG. 34 is a flowchart of a process for determining if a setpoint is achievable, determining the time to setpoint for an achievable setpoint, and serving notifications to a user according to an exemplary embodiment.

Referring now to FIG. 34, a process 3400 for determining a time to setpoint for HVAC equipment 2420 and making recommendations with thermostat 600 is shown, according to an exemplary embodiment. The time to setpoint can be an amount of time required to reach the setpoint based on current or predicted environmental conditions and the capability of the HVAC system operated by the thermostat. In FIG. 34, thermostat 600 is configured to receive a requested setpoint (step 3402). In some embodiments, the setpoint is a temperature setpoint or a humidification/dehumidification setpoint. In some embodiments, the setpoint request is made through user interface 612 of thermostat 600. In some embodiments, the setpoint request is made through social media activity. In some embodiments, the setpoint request is made through NFC when a user checks into thermostat 600. Thermostat 600 is configured to determine if the setpoint requested in step 3402 is achievable (step 3404). Thermostat 600 makes the determination that the setpoint is achievable based on a plurality of factors. The factors can include a thermal load, a time of day, a connected electrical grid status, weather conditions, historical data, equipment status and functionality and any other factor that affects the ability of the HVAC equipment 2420 to reach the requested setpoint. In some embodiments, a level of occupancy can be inferred from the thermal load derived time to setpoint data.

In some embodiments, thermostat 600 is configured to determine if a setpoint is unachievable based on a comparison of zones in a home. In some embodiments, there may be a plurality of zones in a home. Each home may be heated and conditioned to a different temperature. In some embodiments, thermostat 600 compares multiple zones. For example, thermostat 600 may be cooling zones Zone A and Zone B to 65 degrees Fahrenheit. Thermostat 600 may identify that Zone A reaches 65 degrees Fahrenheit from a room temperature of 80 degrees Fahrenheit in 10 minutes. Thermostat 600 may identify that Zone B has taken 25 minutes to reach 75 degrees Fahrenheit from a room temperature of 80 degrees Fahrenheit. In some embodiments, thermostat 600 may be configured to determine that Zone B cannot reach 65 degrees Fahrenheit.

In some embodiments, when a zone cannot reach a setpoint based on a zone comparison, thermostat 600 identifies possible reasons why the zone cannot reach the setpoint. In some embodiments, the thermostat 600 may identify the time of day and the location of the zones. For example, at 6:30 P.M., thermostat 600 may identify that one zone on the west side of the home is not reaching its setpoint as compared to another zone on the east side of the home. Thermostat 600 may provide recommendations to the user (step 3408) that are the result of the zone comparison. For example, thermostat 600 may notify a user that he or she should wait until the sun goes down before attempting to a low setpoint and/or may tell a user to close his shades. For example, thermostat 600 may be configured to tell a user "In three hours it will be dark outside, you should wait three hours before attempting this setpoint."

In some embodiments, thermostat 600 may be configured to monitor and/or operate dampers and fans. In some embodiments, thermostat 600 may make a comparison between the two zones based on the differences between the zones such as a ceiling fan running, dampers being open or closed, a stove generating heat, and any other piece of equipment thermostat 600 may be able to monitor and compare between two zones. For example, thermostat 600 may determine that Zone A is reaching a temperature of 65 degrees Fahrenheit from a room temperature of 80 degrees Fahrenheit but Zone B reaches a temperature of 75 degrees Fahrenheit from a room temperature of 80 degrees Fahrenheit over the course of an hour. Thermostat 600 may identify that Zone A has a fan running and Zone B is a kitchen and has a stove turned on and a fan turned off. Thermostat 600 can provide recommendations to the user (step 3408) such as, "You have a stove running, you won't be able to reach the setpoint" and/or "Turn on the fan in Zone B".

Still referring to FIG. 34, when thermostat 600 determines that the setpoint is not achievable (step 3404), thermostat 600 informs the user that the setpoint is not achievable (step 3408). Thermostat 600 can inform the user that the setpoint is not achievable in a number of ways. In some embodiments, the thermostat 600 displays a notification to the user through user interface 612. In some embodiments, the thermostat 600 sends a notification to the user that the setpoint is not achievable when the user checks in with thermostat 600 via NFC. In some embodiments, the thermostat 600 sends a notification to the user that the setpoint is not achievable by generating a social media notification.

Still referring to FIG. 34, thermostat 600 is configured to make suggestions when thermostat 600 determines that the requested setpoint is not achievable (step 3408). In some embodiments, the suggestion includes a plurality of suggestions that can be served to a user through NFC, a social media notification, and thermostat 600's user interface 612. In some embodiments, suggestions include closing drapes, closing windows, closing dampers to unused spaces, and turning on fans. In some embodiments, the suggestions can be implemented by HVAC equipment 2420. In some embodiments, the suggestions include a plurality of recommended setpoints and a time to setpoint for each setpoint. Thermostat 600 can determine the time to setpoint for each time to setpoint by using a plurality of factors. The factors can include thermal load, time of day, electrical grid status, weather, historical equipment data, and equipment functionality.

Still referring to FIG. 34, thermostat 600 is configured to control HVAC equipment 2420 to the requested setpoint when thermostat 600 determines that the requested setpoint is achievable. Thermostat 600 serves a notification to the user of what the time to setpoint is for the requested setpoint. In some embodiments, thermostat 600 displays the time to setpoint on user interface 612. In some embodiments, thermostat 600 sends a notification to a user device via NFC when a user checks in with thermostat 600. In some embodiments, thermostat 600 sends a notification to a user through a social media notification.

In some embodiments, thermostat 600 determines the time to setpoint for a requested setpoint and preemptively adjusts the setpoints based on expected occupancy for a building. In some embodiments, thermostat 600 identifies an expected occupancy of a building from scheduler 726, social media server 2506, calendar server 2508, and mobile application server 2507. For example, a building may be unoccupied at 1:00 P.M. Thermostat 600 identifies that Tom will be in the building at 2:00 P.M. based on a social media message he sent to Joe. The social media message may read, "I will be at the building at 2:00 P.M.". The thermostat 600 knows know that Tom likes a setpoint of 70 degrees Fahrenheit. Thermostat 600 determines that it will take 10 minutes to reach a setpoint of 70 degrees Fahrenheit. Thermostat 600 waits until 1:50 P.M. and then adjusts the set point to 70 degrees Fahrenheit. The building reaches a temperature of 70 degrees Fahrenheit at 2:00 P.M. when Tom reaches the building.

Figure 35:
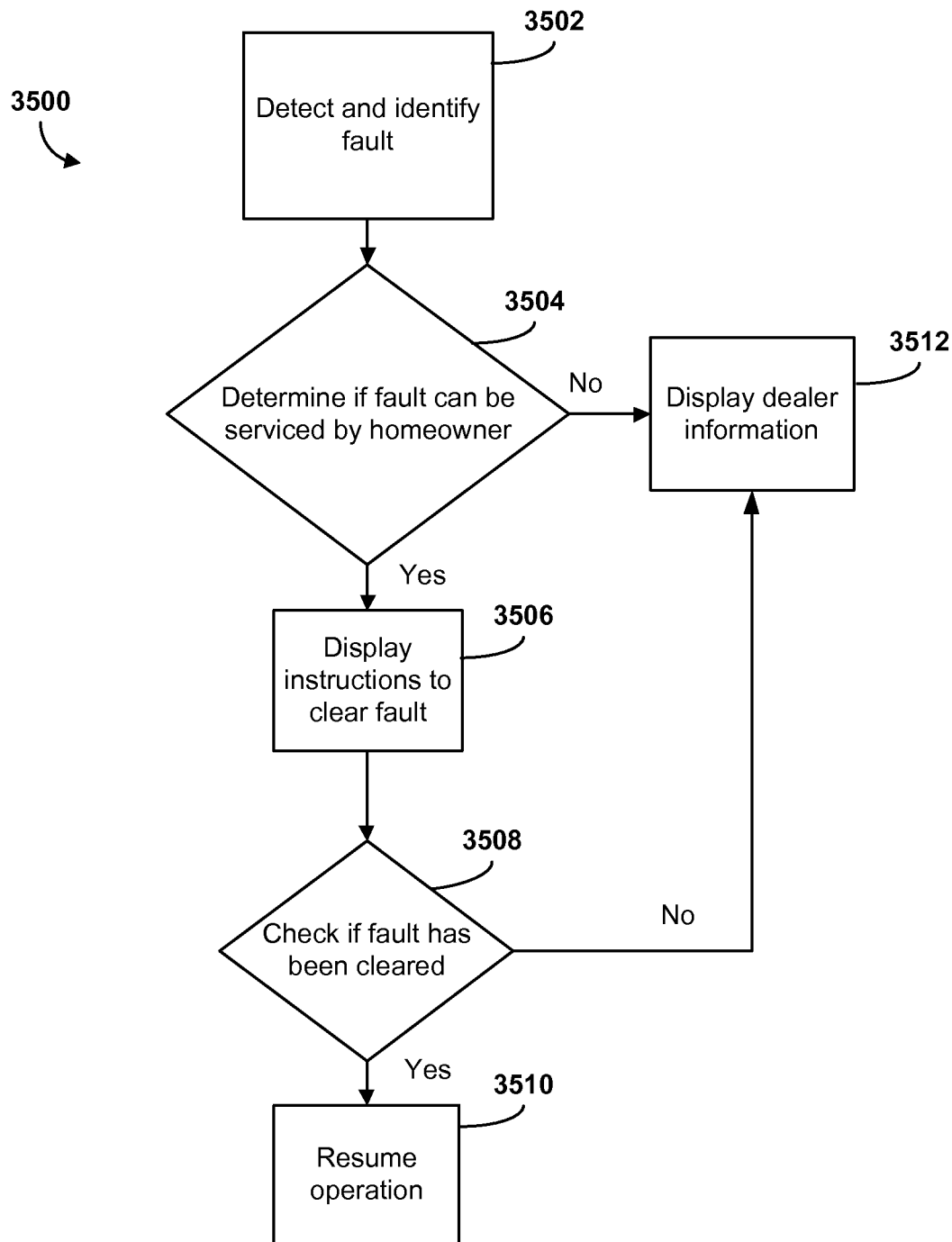
FIG. 35 is a flowchart of a process for determining if a system fault can be fixed by a homeowner according to an exemplary embodiment.

Referring now to FIG. 35, a process 3500 for identifying if a fault can be serviced by a homeowner and suggestions to clear the fault are shown, according to an exemplary embodiment. In FIG. 35, thermostat 600 is configured to detect and identify faults (step 3502). Thermostat 600 may receive fault information from HVAC equipment through bidirectional communication as described in FIG. 21. Thermostat 600 may use the fault codes of the identified faults to determine possible solutions to the fault. If thermostat 600 identifies that the faults identified can be serviced and fixed by a homeowner (step 3504), thermostat 600 can display fault information and instructions to fix the fault on the user interface 612 of thermostat 600 (step 3506).

In some embodiments, thermostat 600 may ask the user if the user would like to perform the instructions to fix the fault or if the user would like to immediately call a dealer. The instructions may be to power cycle a breaker, check filters for derbies, check registers for blockage, or any other instruction that a homeowner could perform. Thermostat 600 can then check if the fault has been cleared (step 3508). If the fault has been cleared, the thermostat 600 can resume the operation of the HVAC equipment (step 3510). If the thermostat determines that the fault has not been cleared, the thermostat is configured to display dealer information on the user interface 612 of thermostat 600. The dealer information may include an address of contact information for the dealer. In some embodiments, the thermostat 600 prompts the user to directly contact the dealer from thermostat 600.

Figure 36:
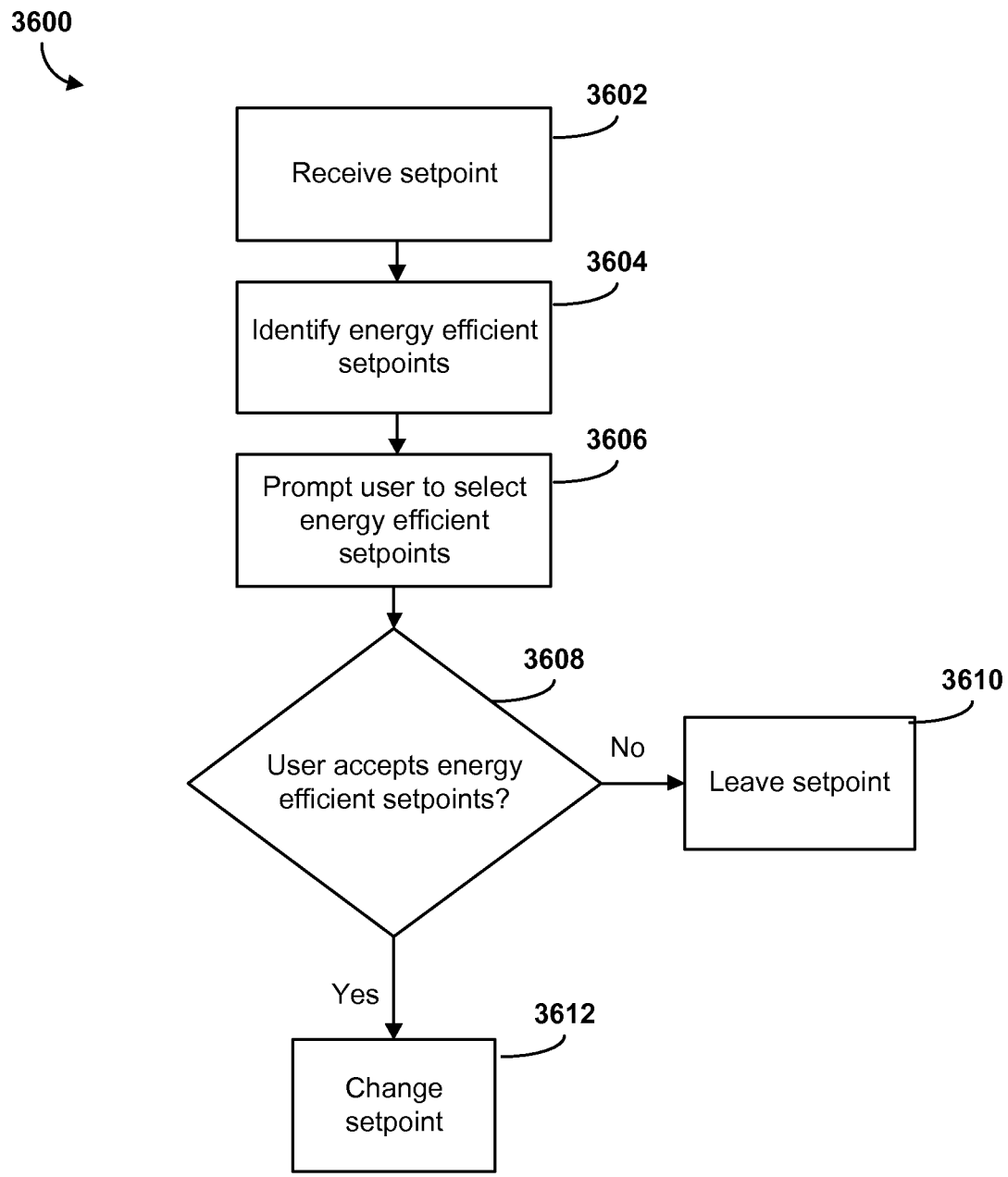
FIG. 36 is a flowchart of a process for determining if setpoints selected by a user are efficient and suggesting energy efficient setpoints to the user according to an exemplary embodiment.

Referring now to FIG. 36, a process 3600 for determining if setpoints selected by a user are energy efficient and suggesting energy efficient setpoints to the user is shown according to an exemplary embodiment. Thermostat 600 can be configured to receive setpoints from a user (step 3602). Thermostat 600 can be configured to identify energy efficient setpoints that are within an offset value from the received setpoint (step 3604). The energy efficient setpoints are setpoints that thermostat 600 determines will use less energy. In some embodiments, thermostat 600 uses historical data gathered and logged from HVAC equipment connected to thermostat 600 to determine energy efficient setpoints. In some embodiments, the historical data is gathered through bidirectional communication between thermostat 600 and the connected HVAC equipment. In some embodiments, the historical data includes information regarding the connected HVAC equipment. The information can include equipment tonnage, runtime of the HVAC equipment, compressor speed, and any other relevant information about the connected HVAC equipment. In some embodiments, thermostat 600 gathers the current equipment performance from the connected HVAC equipment through bidirectional communication and uses the current information to determine energy efficient setpoints. In some embodiments, the thermostat 600 identifies energy efficient setpoints further based on indoor/outdoor temperature.

In some embodiments, thermostat 600 displays the energy efficient setpoints to the user along with a calculated cost of each setpoint (step 3606). In some embodiments, thermostat 600 uses past energy bills to determine the cost of running each energy efficient setpoint. Thermostat 600 is configured to receive a command from a user to either accept one of the energy efficient setpoints or reject the energy efficient setpoints (step 3608). If the user accepts one of the energy efficient setpoints, thermostat 600 implements the energy efficient setpoint selected (step 3612). If the user rejects the energy efficient setpoint, thermostat 600 does not change the setpoint (step 3610).

Referring again to FIG. 24, thermostat 600 is capable of communicating with a variety of devices, and entities, including utility providers. In some embodiments, thermostat 600 may control connected systems. Thermostat 600 may analyze energy usage and billing data from the utility provider and make decisions on which connected appliances or pieces of equipment can be controlled to control load. In some embodiments, thermostat 600 may communicate with a smart meter and adjust load according to time-of-use rates or demand-response feedback. Thermostat 600 may analyze all data from the system and integrate energy usage to build efficient control algorithms, make more informed decisions, or provide more effective suggestions and tips. In some embodiments, thermostat 600 tailors all derived content to a user's preferences and past actions and decisions.

Thermostat 600 may adjust existing and create new control algorithms based on parameters such as time constraints, user preferences, and occupancy detected. In some embodiments, thermostat 600 may skip compressor stages in staging progressions when there is a limited amount of time available for the system to reach the setpoint. For example: Jill is hosting a party, which begins at 1800, today. There is only an hour until the party begins, but the system is expected to transition from 72° F. to 68° F. Thermostat 600 may determine that there is not enough time for the standard staging progression, and skip from a low stage to a high stage in order to meet the deadline for reaching the setpoint.

Thermostat 600 may adjust control algorithms based on a user's indicated preference for comfort or efficiency. In some embodiments, thermostat 600 participates in demand-response based on occupancy levels, appropriately restricting or permitting energy usage depending on detected occupancy. Thermostat 600 may determine occupancy from inputs received and command more efficient scheduling when no occupancy is detected. In some embodiments, thermostat 600 may lengthen run times when a home is unoccupied. Thermostat 600 may adjust scheduling and operations based on detected activity levels within the home. Thermostat 600 may detect that a user is not home if she has been tagged in an event hosted in a location different from home. For example, if Jill has been tagged in an event at George's house, thermostat 600 may determine that Jill is not home, and that the home is unoccupied. In some embodiments, thermostat 600 may determine that a user is not home if any social media platform has indicated that they are in a location other than home.

Thermostat 600 may receive weather input upon which a portion of system controls decisions are based. Thermostat 600 may communicate with a weather station, a weather service, or a network from which weather data can be retrieved. In some embodiments, thermostat 600 may adjust scheduling based on weather forecasts in order to better prepare for the upcoming operating conditions. Thermostat 600 may adjust defrosting operations based on the forecast. In some embodiments, thermostat 600 may detect the minimum temperature which will keep pipes from freezing while a home is unoccupied in the winter. Thermostat 600 may receive data from local sensors outside of the home and adjust conditions based on outdoor conditions. For example: a desert environment experiences a large range of temperatures every day; thermostat 600 may preempt steep temperature changes by anticipating the schedule of the changes and adjusting operation accordingly. Thermostat 600 may detect outdoor conditions and command the condenser to adjust the volume of air drawn from the outside to increase efficiency.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A thermostat for a building space, the thermostat comprising:
   an electronic display;
   a frame;
   a touch-sensitive interface having a first portion that overlays the electronic display and a second portion that overlays the frame, wherein the touch-sensitive interface is configured to receive touch-based input via both the first portion and the second portion; and
   a processing circuit configured to:
      operate, based on a first predefined configuration while the thermostat is oriented in a particular orientation, one or more first areas of the second portion as one or more touch-sensitive temperature selection buttons, wherein the first predefined configuration comprises a first indication to operate the one or more first areas as the one or more touch-sensitive temperature selection buttons;
      receive a user selection of a second predefined configuration while the thermostat is oriented in the particular orientation, wherein the second predefined configuration comprises a second indication to operate one or more second areas of the second portion as the one or more touch-sensitive temperature selection buttons, wherein the one or more second areas are different than the one or more first areas; and
      operate, based on the second predefined configuration while the thermostat is oriented in the particular orientation, the one or more second areas of the second portion as the one or more touch-sensitive temperature selection buttons instead of the one or more first areas in response to a reception of the user selection.

2. The thermostat of claim 1, further comprising a skin that covers at least part of the second portion and visually marks locations of the one or more touch-sensitive temperature selection buttons.

3. The thermostat of claim 2, wherein the user selection is received from at least one of a web-based application or a mobile application, wherein the web-based application and the mobile application are communicatively coupled to the processing circuit.

4. The thermostat of claim 3, wherein a circuit implementing at least one of the web-based application or the mobile application is configured to generate, via the web-based application or the mobile application, a digital file comprising a design for the skin that marks the locations of the one or more touch-sensitive temperature selection buttons.

5. The thermostat of claim 2, wherein the processing circuit is further configured to generate a digital file comprising a design of the skin.

6. The thermostat of claim 1, wherein the processing circuit is further configured to associate the touch-based input to the one or more first areas or the one or more second areas when the one or more touch-sensitive temperature selection buttons receive the touch-based input.

7. The thermostat of claim 1, wherein the second portion, via the one or more touch-sensitive temperature selection buttons, is configured to receive at least one of a direct touch or a touch movement.

8. The thermostat of claim 7, wherein the touch movement comprises at least one of:
   a swipe up;
   a swipe down;
   a swipe right; or
   a swipe left.

9. The thermostat of claim 2, wherein the skin comprises symbols, wherein at least some of the symbols mark the locations of the one or more touch-sensitive temperature selection buttons, the symbols comprising at least one of:

a button symbol;
a user defined symbol; and
a manufacturer defined logo.

10. The thermostat of claim 1, wherein the processing circuit is configured to:
receive the first configuration and the second configuration, wherein the first configuration and the second configuration are configurations of a home screen of the thermostat configured to display an ambient temperature of the building space, the first configuration defined based on first input of a user of the thermostat and the second configuration defined based on second input of the user; and
store the first configuration and the second configuration in a memory device of the thermostat.

11. The thermostat of claim 1, wherein the processing circuit is configured to:
receive a first selection of a first area of the second portion for a first touch-sensitive temperature selection button from the user;
receive a second selection of a second area of the second portion for a second touch-sensitive temperature selection button from the user;
generate a custom configuration based on the first selection of the first area and the second selection of the second area;
receive a custom configuration selection of the custom configuration from the user; and
operate the first area as the first touch-sensitive temperature selection button and the second area as the second touch-sensitive temperatures selection button in response to receiving the custom configuration selection of the custom configuration.

12. A method for sensing touch-based input with a thermostat, the method comprising:
receiving touch-based input via both a first portion of a touch-sensitive interface and a second portion of the touch-sensitive interface while the thermostat is oriented in a particular orientation, wherein the first portion overlays an electronic display of the touch-sensitive interface and the second portion overlays a frame of the touch-sensitive interface;
operating, based on a first predefined configuration, one or more first areas of the second portion as one or more touch-sensitive temperature selection buttons while the thermostat is oriented in the particular orientation, wherein the first predefined configuration comprises a first indication to operate the one or more first areas as the one or more touch-sensitive temperature selection buttons;
receiving a user selection of a second predefined configuration while the thermostat is oriented in the particular orientation, wherein the second predefined configuration comprises a second indication to operate one or more second areas of the second portion as the one or more touch-sensitive temperature selection buttons, wherein the one or more second areas are different than the one or more first areas; and
operating, based on the second predefined configuration while the thermostat is oriented in the particular orientation, the one or more second areas of the second portion as the one or more touch-sensitive temperature selection buttons instead of the one or more first areas in response to a reception of the user selection.

13. The method of claim 12, wherein receiving the user selection comprises at least one of:
receiving the user selection from the touch-sensitive interface;
receiving the user selection from a mobile application; and
receiving the user selection from a web-based application.

14. The method of claim 12, wherein receiving the touch-based input via the second portion of the touch-sensitive interface comprises associating the touch-based input to the one or more touch-sensitive temperature selection buttons.

15. The method of claim 12, wherein the second portion, via the one or more touch-sensitive temperature selection buttons, is configured to detect at least one of a direct touch and a touch movement.

16. The method of claim 12, wherein the method further comprises detecting a touch movement, the touch movement comprising at least one of:
a swipe up;
a swipe down;
a swipe right; or
a swipe left.

17. A thermostat for a building space, the thermostat comprising:
an electronic display;
a frame;
a touch-sensitive interface having a first portion that overlays the electronic display and a second portion that overlays the frame, wherein the touch-sensitive interface is configured to receive touch-based input via both the first portion and the second portion;
a skin that covers at least part of the second portion and visually marks one or more first areas of the second portion as one or more touch-sensitive temperature selection buttons; and
a processing circuit configured to:
operate, based on a first predefined configuration, the one or more first areas of the second portion as the one or more touch-sensitive temperature selection buttons while the thermostat is oriented in a particular orientation, wherein the first predefined configuration comprises a first indication to operate the one or more first areas as the one or more touch-sensitive temperature selection buttons;
receive a user selection of a second predefined configuration while the thermostat is oriented in the particular orientation, wherein the second predefined configuration comprises a second indication to operate one or more second areas of the second portion as the one or more touch-sensitive temperature selection buttons, wherein the one or more second areas are different than the one or more first areas; and
operate, based on the second predefined configuration while the thermostat is oriented in the particular orientation, the one or more second areas of the second portion as the one or more touch-sensitive temperature selection buttons instead of the one or more first areas in response to a reception of the user selection, wherein the processing circuit is configured to operate the one or more second areas by detecting at least one of a direct touch or a touch movement based on user input provided via the second portion of the touch-sensitive interface.

18. The thermostat of claim 17, wherein the processing circuit is further configured to associate the touch-based input of the one or more first areas or the one or more second areas to the one or more touch-sensitive temperature selection buttons.

19. The thermostat of claim 17, wherein the touch movement comprises at least one of:
- a swipe up;
- a swipe down;
- a swipe right; or
- a swipe left.

20. The thermostat of claim 17, wherein the processing circuit is configured to receive the user selection from at least one of:
- the touch-sensitive interface;
- a mobile application; or
- a web-based application.

21. The thermostat of claim 20, wherein a circuit associated with at least one of the web-based application or the mobile application is configured to generate, via at least one of the web-based application or the mobile application, a digital file comprising a design for the skin.

22. The thermostat of claim 17, wherein the skin comprises symbols, wherein at least some of the symbols visually mark the one or more first areas associated with the one or more touch-sensitive temperature selection buttons, wherein the symbols comprise at least one of:
- a button symbol;
- a user defined symbol; and
- a manufacturer defined logo.

\* \* \* \* \*